United States Patent
Liu et al.

(10) Patent No.: US 10,715,304 B2
(45) Date of Patent: Jul. 14, 2020

(54) MODULATION METHOD AND APPARATUS APPLICABLE TO OVXDM SYSTEM, AND OVXDM SYSTEM

(71) Applicant: Shenzhen Super Data Link Technology Ltd., Longgang Dist Shenzhen, Guangdong (CN)

(72) Inventors: Ruopeng Liu, Guangdong (CN); Chunlin Ji, Guangdong (CN); XingAn Xu, Guangdong (CN); Shasha Zhang, Guangdong (CN)

(73) Assignee: SHENZHEN SHEN ZHEN KUANG-SHI HEZHONG TECHNOLOGY LTD., Shenshen (CN)

( * ) Notice: Subject to any disclaimer, the term of this patent is extended or adjusted under 35 U.S.C. 154(b) by 0 days.

(21) Appl. No.: 16/254,553

(22) Filed: Jan. 22, 2019

(65) Prior Publication Data
US 2019/0245675 A1 Aug. 8, 2019

Related U.S. Application Data

(63) Continuation of application No. PCT/CN2017/091962, filed on Jul. 6, 2017.

(30) Foreign Application Priority Data

Jul. 22, 2016 (CN) .......................... 2016 1 0587316

(51) Int. Cl.
*H04L 27/00* (2006.01)
*H04L 5/22* (2006.01)
(Continued)

(52) U.S. Cl.
CPC .............. *H04L 5/22* (2013.01); *H04L 25/497* (2013.01); *H04L 27/00* (2013.01); *H04L 27/2602* (2013.01); *H04L 27/3405* (2013.01)

(58) Field of Classification Search
CPC ... H04L 5/22; H04L 27/2602; H04L 27/3405; H04L 25/497
See application file for complete search history.

(56) References Cited

U.S. PATENT DOCUMENTS

| | | | |
|---|---|---|---|
| 2011/0141918 A1* | 6/2011 | Li | H04J 3/00 370/252 |
| 2019/0238255 A1* | 8/2019 | Liu | H04J 15/00 |

FOREIGN PATENT DOCUMENTS

| | | |
|---|---|---|
| CN | 1941755 A | 4/2007 |
| WO | 2008006246 A1 | 1/2008 |
| WO | 2008092301 A1 | 8/2008 |

* cited by examiner

*Primary Examiner* — Dhaval V Patel
(74) *Attorney, Agent, or Firm* — Cantor Colburn LLP

(57) ABSTRACT

The present invention discloses a modulation method and a modulation apparatus applicable to an OvXDM system, and an OvXDM system. On the one hand, an initial envelope waveform is virtually cut off, and a modulation-domain shift interval is calculated by using a virtual cutoff width of the initial envelope waveform, such that a symbol width obtained after modulation becomes smaller, and a transmission rate is improved; on the other hand, because the initial envelope waveform is virtually cut off but not really cut off, shifting and superimposition are still performed on an initial envelope waveform with tailing, such that the waveform still retains a good performance, such as a relatively narrow width and relatively fast side lobe attenuation, in a corresponding domain. Therefore, in the present invention, the good performance of the waveform is retained in the corresponding domain while the transmission rate is increased.

20 Claims, 53 Drawing Sheets

(51) Int. Cl.
*H04L 25/497* (2006.01)
*H04L 27/26* (2006.01)
*H04L 27/34* (2006.01)

Flat top window

R = 0.9

MODULATION METHOD AND APPARATUS APPLICABLE TO OVXDM SYSTEM, AND OVXDM SYSTEM

CROSS-REFERENCE TO RELATED APPLICATIONS

This application is a continuation of International Application No. PCT/CN2017/091962, filed Jul. 6, 2017, which claims priority to Chinese Patent Application No. 201610587316.4 filed Jul. 22, 2016, each of which is incorporated by reference herein in its entirety.

TECHNICAL FIELD

Embodiments of the present invention relates to the signal processing field, and in particular, to a modulation method and a modulation apparatus applicable to an OvXDM system, and an OvXDM system.

BACKGROUND

In an overlapped multiplexing system, regardless of an Overlapped Time Division Multiplexing (OvTDM, Overlapped Time Division Multiplexing) system, an Overlapped Frequency Division Multiplexing (OvFDM, Overlapped Frequency Division Multiplexing) system, an Overlapped Code Division Multiplexing (OvCDM, Overlapped Code Division Multiplexing) system, an Overlapped Space Division Multiplexing (OvSDM, Overlapped Space Division Multiplexing) system, an Overlapped Hybrid Division Multiplexing (OvHDM, Overlapped Hybrid Division Multiplexing) system, or the like, most multiplexing waveforms used for system modulation are basically subject to a "tailing" phenomenon, that is, in the modulation domain, an amplitude or energy of a multiplexing waveform is relatively low, approaches zero, and changes slowly. Because the energy of the multiplexing waveform in this segment of the modulation domain is relatively low, a very small amount of information can be actually carried in this segment of the modulation domain in a signal transmission process. When a quantity of times of overlapping is the same and multiplexing waveforms in the modulation domain have a same width and length, an actual transmission rate of a multiplexing waveform having "tailing" phenomenon is lower. However, on the other hand, if a multiplexing waveform is subject to "tailing" in the modulation domain, the waveform has a relatively good performance in a corresponding domain of the modulation domain (for example, the corresponding domain is time domain if the modulation domain is frequency domain; or the corresponding domain is frequency domain if the modulation domain is time domain). The waveform has a relatively small width and relatively fast side lobe attenuation in the corresponding domain. Therefore, for a multiplexing waveform having "tailing" phenomenon, a transmission rate and a good performance in a corresponding domain are contradictory.

SUMMARY

The present invention provides a modulation method and a modulation apparatus applicable to an OvXDM system, and an OvXDM system.

According to a first aspect of the present invention, the present invention provides a modulation method applicable to an OvXDM system, and comprising the following steps:

generating an initial envelope waveform in a modulation domain based on design parameters;

subtracting a tail length of the initial envelope waveform from a width of the initial envelope waveform in the modulation domain, to obtain a virtual cutoff width of the initial envelope waveform;

dividing the virtual cutoff width of the initial envelope waveform by a first quantity of times of overlapped multiplexing, to obtain a modulation-domain shift interval;

shifting the initial envelope waveform by the modulation-domain shift interval in the modulation domain based on the first quantity of times of overlapped multiplexing, to obtain offset envelope waveforms in the modulation domain;

multiplying symbols in a to-be-modulated sequence by the offset envelope waveforms that are respectively corresponding to the symbols, to obtain modulated envelope waveforms in the modulation domain; and superimposing the modulated envelope waveforms in the modulation domain, to obtain a complex modulated envelope waveform in the modulation domain.

According to a second aspect of the present invention, the present invention provides A modulation apparatus applicable to an OvXDM system, and comprising:

a waveform generation module, configured for generating an initial envelope waveform in a modulation domain based on design parameters;

a virtual cutoff module, configured for subtracting a tail length of the initial envelope waveform from a width of the initial envelope waveform in the modulation domain, to obtain a virtual cutoff width of the initial envelope waveform;

a modulation-domain shift interval calculating module, configured for dividing the virtual cutoff width of the initial envelope waveform by a first quantity of times of overlapped multiplexing, to obtain a modulation-domain shift interval;

a first shift module, configured for shifting the initial envelope waveform by the modulation-domain shift interval in the modulation domain based on the first quantity of times of overlapped multiplexing, to obtain offset envelope waveforms in the modulation domain;

a multiplication module, configured for multiplying symbols in a to-be-modulated sequence by offset envelope waveforms that are respectively corresponding to the symbols, to obtain modulated envelope waveforms in the modulation domain; and a first superimposition module, configured for superimposing the modulated envelope waveforms in the modulation domain, to obtain a complex modulated envelope waveform in the modulation domain.

According to a third aspect of the present invention, the present invention provides an OvXDM system, including the aforementioned modulation apparatus applied to an OvXDM system.

Beneficial effects of the present invention are as follows:

According to the modulation method and apparatus applied to an OvXDM system, and the OvXDM system. On the one hand, the initial envelope waveform is virtually cut off, and the modulation-domain shift interval is calculated by using the virtual cutoff width of the initial envelope waveform, such that a symbol width obtained after modulation becomes smaller, and a transmission rate is improved; on the other hand, because the initial envelope waveform is virtually cut off but not really cut off, shifting and superimposition are still performed on an initial envelope waveform with tailing, such that the waveform still retains a good performance, such as a relatively small width and relatively fast side lobe attenuation, in a corresponding domain. Therefore, in the present invention, the good waveform performance is retained in the corresponding domain while the transmission rate is increased.

DESCRIPTION OF EMBODIMENTS

The following further describes the present invention in detail with reference to specific embodiments and accompanying drawings.

For the tailing phenomenon mentioned in the BACKGROUND, a method used in the prior art is usually a real cutoff. Specifically, tailing of a multiplexing waveform is cut off, and then the multiplexing waveform having the tailing that is cut off is used as a new multiplexing waveform to perform a subsequent shifting and superimposition process.

Because a width of the new multiplexing waveform becomes smaller, a modulation-domain shift interval obtained by calculation also becomes smaller. Therefore, a symbol transmission rate can be effectively improved. However, because the tailing of two ends of the multiplexing waveform is cut off, the two ends of the multiplexing waveform are no longer smooth in the modulation domain. Therefore, the multiplexing waveform in a corresponding domain has a relatively poor performance, that is, a side lobe power in the corresponding domain is relatively high. This causes relatively large interference on a main lobe signal, affects system performance, and increases an error bit rate of a system.

To resolve this problem, that is, a good performance of the waveform is maintained in a corresponding domain of the modulation domain while a transmission rate is improved, the present invention proposes an idea of virtual cutoff. Specifically, a width of the initial envelope waveform having the tailing that is cut off is used to calculate a modulation-domain shift interval, such that a symbol width obtained by modulation becomes smaller, and the transmission rate is increased. However, a waveform participating in shifting and superimposition is still the original initial envelope waveform whose tailing is not removed, such that the waveform whose tailing is retained in the corresponding domain has a good performance. The following provides detailed description.

Figure 1:
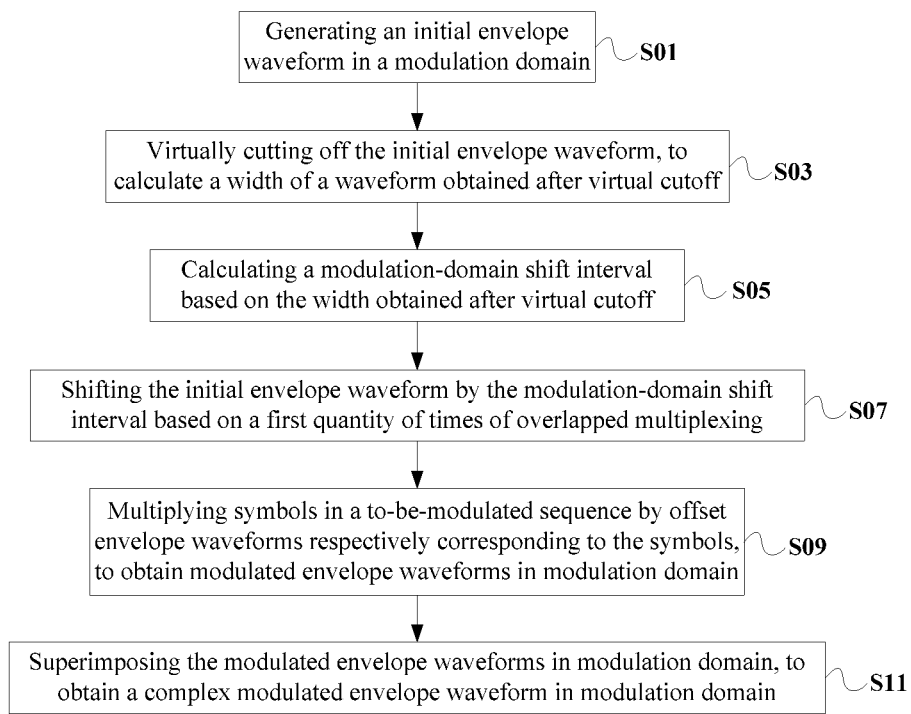
FIG. 1 is a schematic flowchart of a modulation method applied to an OvXDM system according to an embodiment of the present invention.

The present invention firstly provides a modulation method applicable to an OvXDM system (hereinafter referred to as a modulation method). Referring to FIG. 1, the modulation method includes steps S01 to S11.

Step S01: generating an initial envelope waveform in the modulation domain based on design parameters. In one embodiment, the design parameter at least includes width L of the initial envelope waveform. In a preferred embodiment, the initial envelope waveform is smooth in the modulation domain, such that the waveform has a relatively small width and a relatively good performance in a corresponding domain. Preferably, the initial envelope waveform may be any one of the following waveforms: an envelope waveform of a Parzen window function or an envelope waveform of a derived window function of the Parzen window function; or an envelope waveform of a Bartlett window function or an envelope waveform of a derived window function of the Bartlett window function; or an envelope waveform of a Bartlett-Hanning window function or an envelope waveform of a derived window function of the Bartlett-Hanning window function; or an envelope waveform of a Bohman window function or an envelope waveform of a derived window function of the Bohman window function; or an envelope waveform of a Blackman window function or an envelope waveform of a derived window function of the Blackman window function; or an envelope waveform of a Blackman-Harris window function or an envelope waveform of a derived window function of the Blackman-Harris window function; or an envelope waveform of a Gaussian window function or an envelope waveform of a derived window function of the Gaussian window function; or an envelope waveform of a Hamming window function or an envelope waveform of a derived window function of the Hamming window function; or an envelope waveform of a Hanning window function or an envelope waveform of a derived window function of the Hanning window function; or an envelope waveform of a Kaiser window function or an envelope waveform of a derived window function of the Kaiser window function; or an envelope waveform of a Nuttall window function or an envelope waveform of a derived window function of the Nuttall window function; or an envelope waveform of a flat top window function or an envelope waveform of a derived window function of the flat top window function; or an envelope waveform of a Chebyshev window function or an envelope waveform of a derived window function of the Chebyshev window function; or an envelope waveform of a triangular window function or an envelope waveform of a derived window function of the triangular window function; or an envelope waveform of a Taylor window function or an envelope waveform of a derived window function of the Taylor window function; or an envelope waveform of a Tukey window function or an envelope waveform of a derived window function of the Tukey window function. It should be noted that, the derived window function described herein may be a series of function forms related to the original waveform, such as a continuous multiplication function, various-order derivatives, and a sum of various-order derivatives which are related to pulse of the original waveform. For example, the derived window function of the Chebyshev envelope waveform may be a series of functions related to pulse of Chebyshev waveform, such as a continuous multiplication function, various-order derivatives, and a sum of various-order derivatives. Step S03: subtracting a tail length of the initial envelope waveform from a width of the initial envelope waveform in the modulation domain, to obtain a virtual cutoff width of the initial envelope waveform. For example, the width of the initial envelope waveform in the modulation domain is L, and the tail length of the initial envelope waveform is Lad; therefore, the virtual cutoff width L' of the initial envelope waveform is calculated as follows: $L'=L-L_{tail}$.

In one embodiment, the modulation method in the present invention further includes a step of determining the tail length of the initial envelope waveform. Specifically, an amplitude of the initial envelope waveform is converted to a power in the modulation domain, the power is compared with a signal-to-noise ratio threshold of the system, and a modulation-domain part of the waveform corresponding to the power that is smaller than the signal-to-noise ratio threshold is determined as tailing.

Step S05: dividing the virtual cutoff width of the initial envelope waveform by a first quantity of times of overlapped multiplexing, to obtain a modulation-domain shift interval. For example, K indicates the first quantity of times of overlapped multiplexing, and Δ indicates the modulation-domain shift interval; therefore, in the present invention, $\Delta=L'/K=(L-L_{tail})/K$.

Step S07: shifting the initial envelope waveform in the modulation domain by the modulation-domain shift interval based on the first quantity of times of overlapped multiplexing, to obtain offset envelope waveforms in the modulation domain. Herein, the initial envelope waveform which is performed by the shifting operation is a waveform whose tailing is not cut off and is retained.

Step S09: multiplying symbols in a to-be-modulated sequence by the offset envelope waveforms respectively corresponding to the symbols, to obtain modulated envelope waveforms in the modulation domain.

Step S11: superimposing the modulated envelope waveforms in the modulation domain, to obtain a complex modulated envelope waveform in the modulation domain.

In the embodiment, the OvXDM system may be an OvFDM system, an OvTDM system, an OvHDM system, an OvCDM system, or an OvSDM system. The following provides detailed description.

In one embodiment, when the OvXDM system is the OvFDM system, the modulation domain is a frequency domain, and after a complex modulated envelope waveform in the frequency domain is obtained in step S11, the method may further include a conversion step. For example, the complex modulated envelope waveform in the frequency domain is converted to the complex modulated envelope waveform in the time domain, to perform subsequent transmission.

In one embodiment, when the OvXDM system is the OvTDM system, the modulation domain is a time domain, and a complex modulated envelope waveform in the time domain is obtained in step S11. In one embodiment, the complex modulated envelope waveform in the time domain may be directly transmitted.

Figure 2:
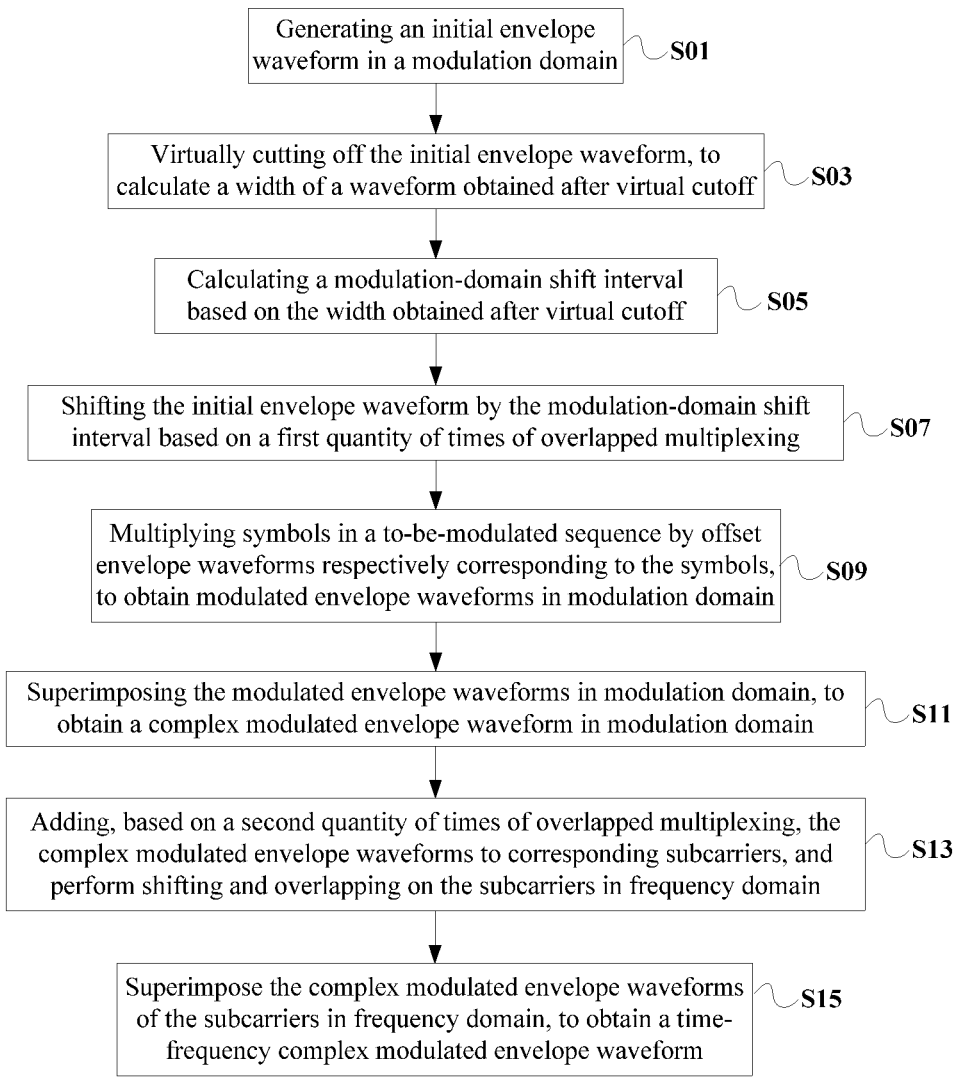
FIG. 2 is a schematic flowchart of a modulation method applied to an OvXDM system according to another embodiment of the present invention.

In one embodiment, when the OvXDM system is the OvHDM system, the modulation domain is a time domain, and a complex modulated envelope waveform in the time domain is obtained in step S11. Referring to FIG. 2, when the OvXDM system is the OvHDM system, the modulation method in the present invention further includes steps S13 and S15. A plurality of complex modulated envelope waveforms in the time domain are obtained in step S11.

Step S13: adding, based on a second quantity of times of overlapped multiplexing, the complex modulated envelope waveforms in the time domain to corresponding subcarriers, and performing shifting and overlapping operations on the subcarriers in a frequency domain, to obtain complex modulated envelope waveforms of the subcarriers.

Step S15: superimposing the complex modulated envelope waveforms of the subcarriers in the frequency domain, to obtain a time-frequency complex modulated envelope waveform.

In one embodiment, after step S15, the method may further include a step of transmitting the time-frequency complex modulated envelope waveform in the time domain.

Figure 3:
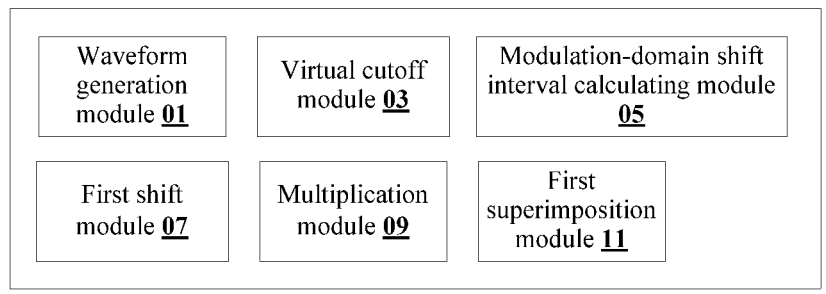
FIG. 3 is a schematic structural diagram of a modulation apparatus applied to an OvXDM system according to an embodiment of the present invention.

Correspondingly, referring to FIG. 3, the present invention further provides a modulation apparatus applied to an OvXDM system (hereinafter referred to as a modulation apparatus). The modulation apparatus includes a waveform generation module 01, a virtual cutoff module 03, a modulation-domain shift interval calculating module 05, a first shift module 07, a multiplication module 09, and a first superimposition module 11.

The waveform generation module 01 is configured for generating an initial envelope waveform in the modulation domain based on design parameters. In one embodiment, the waveform generation module 01 generates the initial envelope waveform in the modulation domain at least based on a width L of the initial envelope waveform. In a preferred embodiment, the initial envelope waveform generated by the waveform generation module 01 is smooth in the modulation domain, such that the waveform has a relatively small width and a relatively good performance in a corresponding domain. Preferably, the initial envelope waveform may be any one of the following waveforms: an envelope waveform of a Parzen window function or an envelope waveform of a derived window function of the Parzen window function; or an envelope waveform of a Bartlett window function or an envelope waveform of a derived window function of the Bartlett window function; or an envelope waveform of a Bartlett-Hanning window function or an envelope waveform of a derived window function of the Bartlett-Hanning window function; or an envelope waveform of a Bohman window function or an envelope waveform of a derived window function of the Bohman window function; or an envelope waveform of a Blackman window function or an envelope waveform of a derived window function of the Blackman window function; or an envelope waveform of a Blackman-Harris window function or an envelope waveform of a derived window function of the Blackman-Harris window function; or an envelope waveform of a Gaussian window function or an envelope waveform of a derived window function of the Gaussian window function; or an envelope waveform of a Hamming window function or an envelope waveform of a derived window function of the Hamming window function; or an envelope waveform of a Hanning window function or an envelope waveform of a derived window function of the Hanning window function; or an envelope waveform of a Kaiser window function or an envelope waveform of a derived window function of the Kaiser window function; or an envelope waveform of a Nuttall window function or an envelope waveform of a derived window function of the Nuttall window function; or an envelope waveform of a flat top window function or an envelope waveform of a derived window function of the flat top window function; or an envelope waveform of a Chebyshev window function or an envelope waveform of a derived window function of the Chebyshev window function; or an envelope waveform of a triangular window function or an envelope waveform of a derived window function of the triangular window function; or an envelope waveform of a Taylor window function or an envelope waveform of a derived window function of the Taylor window function; or an envelope waveform of a Tukey window function or an envelope waveform of a derived window function of the Tukey window function. Herein, a derived window function herein may be a series of function forms related to shaping of an original waveform, such as a continuous multiplication function, various-order derivatives, and a sum of various-order derivatives of pulse shaping of the original waveform. For example, the derived window function of the Chebyshev envelope waveform may be a series of functions related to Chebyshev pulse shaping, such as a continuous multiplication function, various-order derivatives, and a sum of various-order derivatives of Chebyshev pulse shaping.

The virtual cutoff module 03 is configured for subtracting a tail length of the initial envelope waveform from the width of the initial envelope waveform in the modulation domain, to obtain a virtual cutoff width of the initial envelope waveform. For example, the width of the initial envelope waveform in the modulation domain is L, and the tail length of the initial envelope waveform is $L_{tail}$; therefore, the width L' obtained after virtual cutoff of the initial envelope waveform is calculated as follows: $L'=L-L_{tail}$. In a preferred embodiment, the modulation apparatus in the present invention may further include a tailing determining module, configured for: converting an amplitude of the initial envelope waveform to a power in the modulation domain, comparing the power with a signal-to-noise ratio threshold of the system, and determining a modulation-domain part of the waveform corresponding to the power that is smaller than the signal-to-noise ratio threshold as tailing.

The modulation-domain shift interval calculating module 05 is configured for dividing the virtual cutoff width of the initial envelope waveform by a first quantity of times of overlapped multiplexing, to obtain a modulation-domain shift interval. For example, K indicates the first quantity of times of overlapped multiplexing, and Δ indicates the modulation-domain shift interval; therefore, in the present invention, $\Delta=L'/K=(L-L_{tail})/K$.

The first shift module 07 is configured for shifting the initial envelope waveform in the modulation domain based on the first quantity of times of overlapped multiplexing and the modulation-domain shift interval, to obtain offset envelope waveforms in the modulation domain.

The multiplication module 09 is configured for multiplying symbols in a to-be-modulated sequence by offset envelope waveforms respectively corresponding to the symbols, to obtain modulated envelope waveforms in the modulation domain.

The first superimposition module 11 is configured for superimposing the modulated envelope waveforms in the modulation domain, to obtain a complex modulated envelope waveform in the modulation domain.

The present invention further discloses an OvXDM system, including the aforementioned modulation apparatus. The OvXDM system in the present invention may be an OvFDM system, an OvTDM system, an OvHDM system, an OvSDM system, or an OvCDM system.

In one embodiment when the OvXDM system is the OvFDM system, the modulation domain is frequency domain, and correspondingly, the first superimposition module 11 obtains a complex modulated envelope waveform in the frequency domain. Therefore, In one embodiment, the modulation apparatus in the present invention may further include a module configured for converting the complex modulated envelope waveform in the frequency domain to a complex modulated envelope waveform in the time domain to perform transmission.

In one embodiment, when the OvXDM system is the OvTDM system, the modulation domain is time domain, and correspondingly, the first superimposition module 11 obtains a complex modulated envelope waveform in the time domain. In one embodiment, the complex modulated envelope waveform in the time domain may be directly transmitted.

Figure 4:
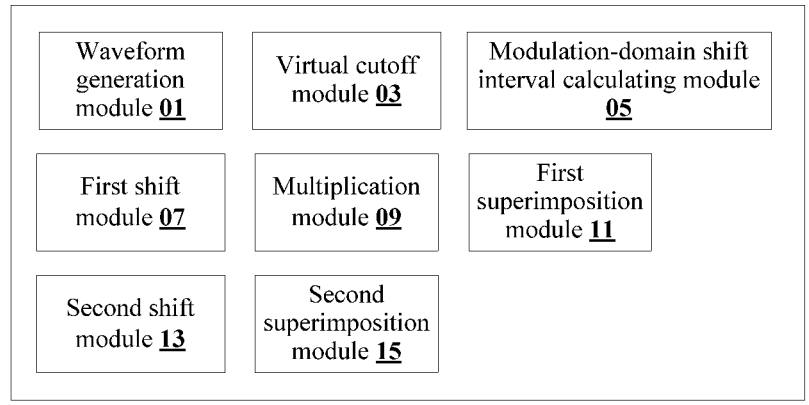
FIG. 4 is a schematic structural diagram of a modulation apparatus applied to an OvXDM system according to another embodiment of the present invention.

In one embodiment, when the OvXDM system is the OvHDM system, the modulation domain is time domain, and the first superimposition module 11 obtains a complex modulated envelope waveform in the time domain. Referring to FIG. 4, when the OvXDM system is the OvHDM system, the modulation apparatus in the present invention may further include a second shift module 13 and a second superimposition module 15.

The second shift module 13 is configured for: adding, based on a second quantity of times of overlapped multiplexing, a plurality of complex modulated envelope waveforms in the time domain obtained by the first superimposition module 11 to corresponding subcarriers, and perform shifting and overlapping on the subcarriers in the frequency domain, to obtain complex modulated envelope waveforms of the subcarriers.

The second superimposition module 15 is configured for superimposing the complex modulated envelope waveforms of the subcarriers in the frequency domain, to obtain a time-frequency complex modulated envelope waveform.

In one embodiment, the modulation apparatus in the present invention may further include a module configured for transmitting the time-frequency complex modulated envelope waveform in the time domain.

The following further describes the present invention by using several examples.

Embodiment 1

This embodiment is described by using an OvFDM system as an example.

In the OvFDM system, a corresponding multiplexing waveform, namely, the aforementioned initial envelope waveform, needs to be firstly generated by a transmitting end. Frequency division multiplexing is performed in the OvFDM system, and modulation is mainly performed in the frequency domain. Therefore, the generated initial envelope waveform is an initial envelope waveform H(f) in the frequency domain. Preferably, during the selection of the initial envelope waveform H(f), it is expected that the initial envelope waveform H(f) is relatively smooth in the frequency domain. Correspondingly, energy of the initial envelope waveform H(f) in corresponding time domain is centralized, and occupation time of the signal is relatively short. Therefore, the complex modulated envelope waveform generated after superimposition is smooth in the frequency domain. After the waveform is converted to a time-domain waveform, energy of the signal is centralized, attenuation is relatively fast, an occupation time is relatively short, interference of inter-system symbols is relatively small, and the signal has a good performance, thereby reducing a bit error rate of the system. The smooth initial envelope waveforms mentioned above, such as the Gaussian envelope waveform, the Chebyshev envelope waveform, the Taylor envelope waveform, and the Tukey envelope waveform, meet this requirement.

However, most initial envelope waveforms are subject to a "tailing" phenomenon. Especially, this "tailing" phenomenon is more obvious when the initial envelope waveform is relatively "thin". The "tailing" means that an amplitude (or energy) of the waveform is relatively low within a specific spectrum, approaches zero and changes slowly. Because the energy of the initial envelope waveform in this specific spectrum is relatively low, a relatively small amount of information can be actually carried in the signal transmission process. When initial envelope waveforms have the same bandwidth and the same quantity of times of overlapping, an actual transmission rate of the initial envelope waveform having "tailing" phenomenon is lower. However, the waveform having "tailing" phenomenon has a relatively good performance in the time domain. Energy of a time-domain signal is centralized, attenuation is relatively fast, the occupation time is relatively short, and interference of inter-system symbols is relatively small. Therefore, for a waveform having "tailing" phenomenon, the transmission rate and the time-domain performance are contradictory.

As described above, for this problem, a processing method in the prior art is real cutoff, that is, tailing of the initial envelope waveform is cut off, and then an obtained initial envelope waveform having no tailing phenomenon is used as a new multiplexing waveform to perform a subsequent modulation, such as shifting, multiplication by a symbol, and superimposition. Such a solution of real cutoff can effectively improve a symbol transmission rate. However, because there is no longer tailing phenomenon, the time-domain performance is relatively poor, energy of the time-domain signal is not centralized, attenuation is slow, and interference of inter-system symbols is relatively large, thereby affecting system performance and increasing an error bit rate of the system.

In a research, the inventors find that an actual symbol width calculated based on a width of the initial envelope waveform determines a transmission rate of the waveform, and a smaller symbol width indicates a higher transmission rate of the waveform; and whether an initial envelope waveform has tailing phenomenon in the frequency domain affects the performance of a waveform in the time domain.

Figure 5:
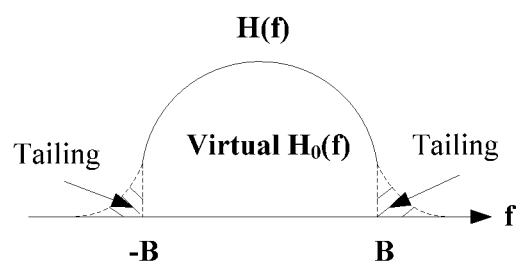
FIG. 5 is a schematic diagram of virtually truncating an initial envelope waveform when an OvXDM system is an OvFDM system according to a first embodiment of the present invention.

Therefore, this embodiment provides a virtual cutoff method. As shown in FIG. 5, the initial envelope waveform is virtually cut off but not really cut off. The initial envelope waveform obtained after virtual cutoff is used to calculate an actual symbol width, that is, the initial envelope waveform having no tailing phenomenon is used to calculate the actual symbol width, such that the symbol width becomes smaller, and a transmission rate thereof is improved. In addition, in an actual modulation process, because the virtual cutoff is performed, the initial envelope waveform actually has tailing phenomenon, such that the waveform has a good performance in the time domain. The initial envelope waveform that is not really cut off is shifted, multiplied by a symbol, superimposed, and the like, such that the complex modulated envelope waveform obtained after modulation also has the good performance in the time domain. Specifically, energy of the time-domain signal is centralized, attenuation is relatively fast, and the occupation time thereof is relatively short, such that interference of inter-system symbols is relatively small, and system performance is ensured without increasing decoding complexity.

The following describes the modulation method applied to an OvXDM system in the present invention with reference to the OvFDM system.

(1) generating an initial envelope waveform H(f) in the frequency domain based on design parameters.

The width of the initial envelope waveform H(f) is B, a quantity of times of overlapped multiplexing of the system is K, and a symbol width is B. Therefore, the width of the initial envelope waveform H(f) is $B=K*B_s$.

(2) searching "tailing" of the initial envelope waveform H(f).

Specifically, an amplitude of the initial envelope waveform is converted to a power in the frequency domain, the power is compared with a signal-to-noise ratio threshold of the system, and a frequency-domain part of the waveform corresponding to the power that is smaller than the signal-to-noise ratio threshold is determined as tailing.

Figure 6A:
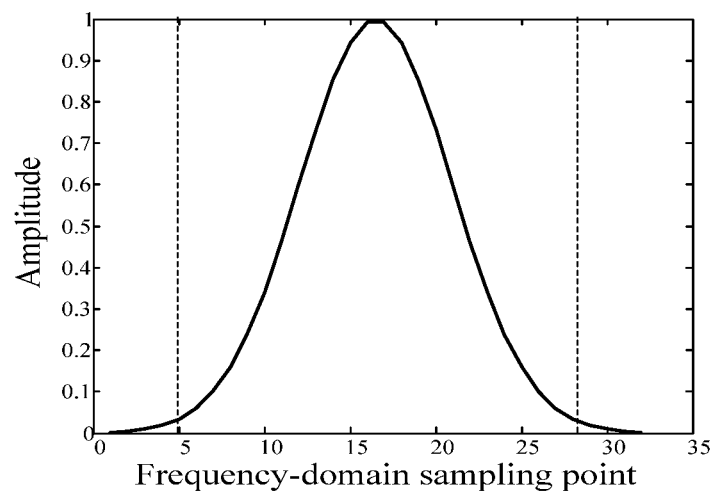
FIG. 6(a) is a schematic diagram of found tailing of an initial envelope waveform when an OvXDM system is an OvFDM system according to a first embodiment of the present invention, where a vertical coordinate is an amplitude.
Figure 6B:
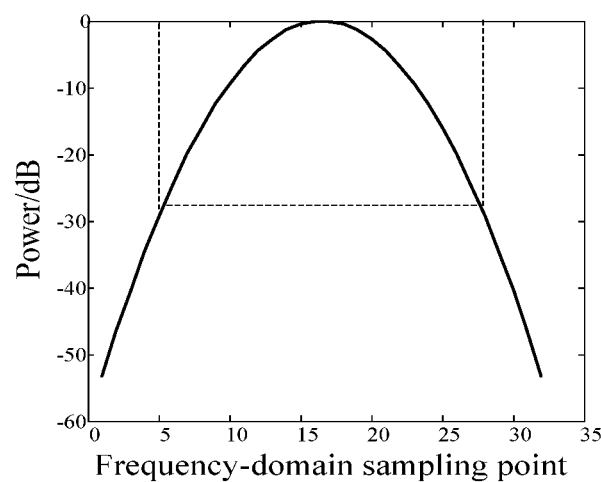
FIG. 6(b) is a schematic diagram of found tailing of an initial envelope waveform when an OvXDM system is an OvFDM system according to a first embodiment of the present invention, where a vertical coordinate is a power.

Using a Gaussian window function, namely, the initial envelope waveform of the Gaussian window function, as an example, assuming that the width B of H(f) is equal to 32, and the signal-to-noise ratio threshold is −30 dB, an amplitude of the multiplexing waveform is firstly converted to a power, then a symbol width corresponding to the power of the multiplexing waveform that is −30 dB is obtained, and the width corresponding to the waveform whose power is smaller than the signal-to-noise ratio threshold is determined as tailing. In this embodiment, a part in a range of 5-27 of the multiplexing waveform is determined as the virtual cutoff width of the waveform, and the remaining part is determined as tailing. As shown in FIG. 6, a part of the waveform on the left of a left dashed line and a part of the waveform on the right of a right dashed line are determined as tailing of the waveform. A vertical coordinate in FIG. 6(a) is an amplitude, and a vertical coordinate in FIG. 6(b) is a power, where a unit is dB.

(3) Virtually cuting off the initial envelope waveform and calculating a frequency-domain shift interval ΔB.

Assuming that the bandwidth of the tailing obtained in (2) is $B_{tail}$, and the virtual initial envelope waveform obtained after virtual cutoff of the initial envelope waveform is represented as $H_0(f)$, a virtual width of the virtual initial envelope waveform $H_0(f)$ is $B'=B-B_{tail}$, and an actual symbol width is $B_s'=B'/K=(B-B_{tail})/K$. It can be learned that the actual symbol width decreases from B/K to $(B-B_{tail})/K$, and thereforethe transmission rate is increased.

The virtual cutoff width B' of the initial envelope waveform is divided by the quantity K of times of overlapped multiplexing, to obtain the frequency-domain shift interval ΔB, that is, ΔB=B'/K.

(4) Modulating an Input Symbol Sequence.

The initial envelope waveform H(f) is shifted by the frequency-domain shift interval ΔB in the frequency domain based on the quantity K of times of overlapped multiplexing, to obtain offset envelope waveforms in the frequency domain. Specifically, for example, for a symbol sequence $X=\{X_0, X_1, \ldots, X_{N-1}\}$ whose length is N, where N is a positive integer, the initial envelope waveform H(f) is shifted by 0 to N−1 frequency-domain shift intervals ΔB respectively, to obtain N offset envelope waveforms. An $i^{th}$ shifted envelope waveform is H(f−i*ΔB), and 0≤i≤N−1.

Then symbols in a to-be-modulated sequence are multiplied by offset envelope waveforms respectively corresponding to the symbols, to obtain modulated envelope waveforms in the frequency domain. For example, In one embodiment, specifically, the N symbols in the symbol sequence are multiplied by offset envelope waveforms respectively corresponding to the symbols, to obtain N modulated envelope waveforms. An $i^{th}$ modulated envelope waveform is $X_i*H(f-i*\Delta B)$, and 0≤i≤N−1.

Then the modulated envelope waveforms are superimposed in the frequency domain, to obtain a complex modulated envelope waveform in the frequency domain. For example, an adder operation is performed on $X_i*H(f-i*\Delta B)$, when i ranges from 0 to N−1, to obtain a complex modulated envelope waveform $$S(f) = \sum_i X_i * H(f - i*\Delta B).$$

Figure 7:
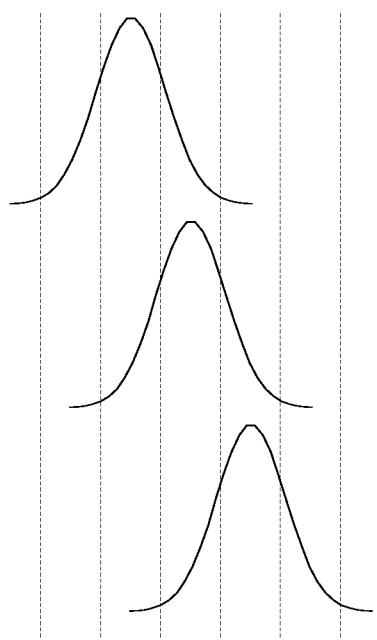
FIG. 7 is a schematic diagram of a superimposition process of virtually cut off initial envelope waveforms when an OvXDM system is an OvFDM system according to a first embodiment of the present invention.
Figure 8:
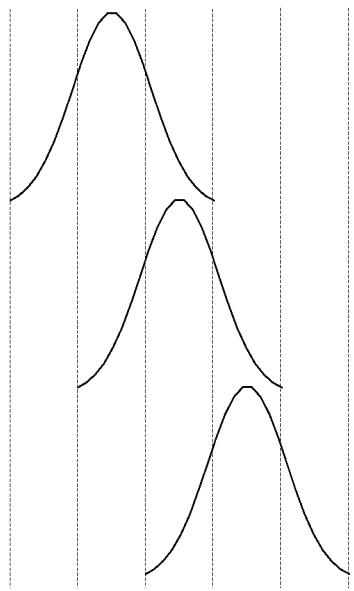
FIG. 8 is a schematic diagram of a superimposition process of really cut off initial envelope waveforms when an OvXDM system is an OvFDM system according to a first embodiment of the present invention.

Referring to FIG. 7, FIG. 7 shows a process of superimposing modulated envelope waveforms that are virtually cut off when K is equal to 3. It can be learned that the modulated envelope waveforms having tailings also participate in the superimposition. Referring to FIG. 8, FIG. 8 shows a process of superimposing modulated envelope waveforms that are really cut off when K is equal to 3. It can be learned that tailings of the modulated envelope waveforms are removed, that is, the modulated envelope waveforms having no tailings participate in the superimposition.

In one embodiment, the complex modulated envelope waveform S(f) in the frequency domain may be further converted to a complex modulated envelope waveform S(t)

in the time domain, and then the complex modulated envelope waveform S(t) is transmitted.

Figure 9:
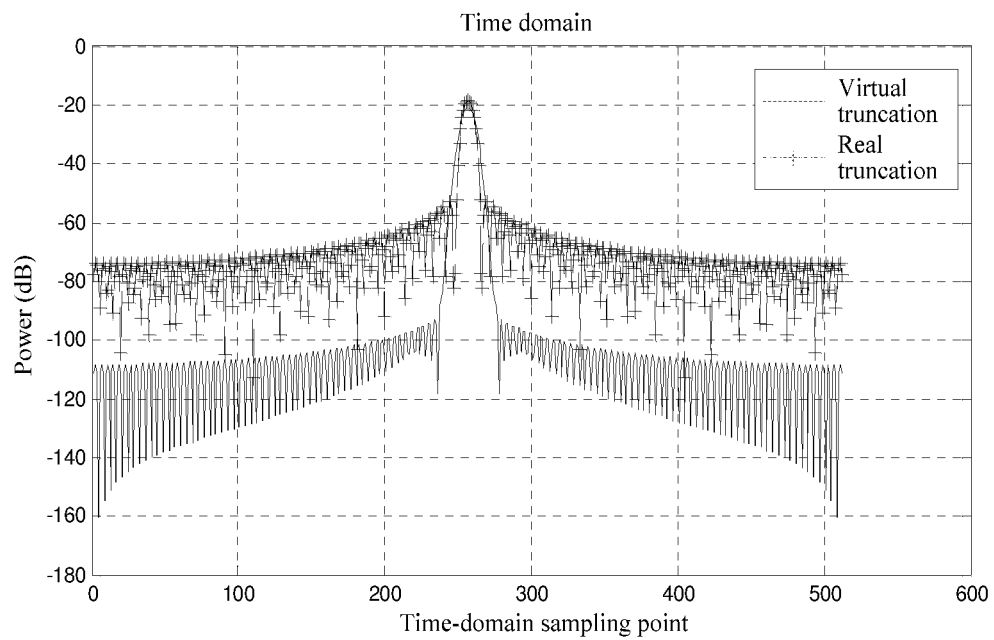
FIG. 9 is a diagram of comparing, in the time domain, a performance of a complex modulated envelope waveform obtained by using a virtual cutoff modulating method in Embodiment 1 and a performance of a complex modulated envelope waveform obtained by using a real cutoff modulation method in the prior art when an OvXDM system is an OvFDM system according to a first embodiment of the present invention.

Using the initial envelope waveform of Gaussian window function as an example, a time-domain performance of the complex modulated envelope waveform obtained by using the real cutoff solution in the prior art and a time-domain performance of the complex modulated envelope waveform obtained by using the virtual cutoff solution in the present invention are compared in FIG. 9. It can be learned from the figure that energy of the complex modulated envelope waveform obtained by using the virtual cutoff solution in the present invention is more centralized in the time domain, and attenuation is faster, thereby reducing interference of inter-system symbols.

Embodiment 2

This embodiment is described by using an OvTDM system as an example.

In the OvTDM system, a corresponding multiplexing waveform, namely, the aforementioned initial envelope waveform, needs to be firstly generated by a transmitting end. Time division multiplexing is performed in the OvTDM system, and modulation is mainly performed in the time domain. Therefore, the generated initial envelope waveform is an initial envelope waveform h(t) in the time domain. Preferably, during the selection of the initial envelope waveform h(t), it is expected that the initial envelope waveform h(t) is relatively smooth in the time domain. Correspondingly, bandwidth of the initial envelope waveform h(t) in corresponding frequency domain is relatively low, and side lobe attenuation is relatively fast. Therefore, the complex modulated envelope waveform generated after superimposition also has relatively narrow bandwidth and relatively fast side lobe attenuation in the frequency domain, thereby reducing a bit error rate of the system. The plurality of smooth initial envelope waveforms mentioned above, such as the Gaussian envelope waveform, the Chebyshev envelope waveform, the Taylor envelope waveform, and the Tukey envelope waveform, meet this requirement.

However, most initial envelope waveforms are subject to a "tailing" phenomenon. This "tailing" phenomenon is more obvious especially when the initial envelope waveform is relatively "thin". The "tailing" means that an amplitude (or energy) of the waveform is relatively low within a specific period of time, approaches zero, and changes slowly. Because the energy of the initial envelope waveform is relatively low in this specific period of time, a relatively small amount of information can be actually carried in a signal transmission process. When initial envelope waveforms have the same quantity of times of overlapping and the same bandwidth, an actual transmission rate of the initial envelope waveform having "tailing" phenomenon is lower. However, a waveform having "tailing" phenomenon has a relatively good performance in the frequency domain, relatively low bandwidth, and relatively fast side lobe attenuation. Therefore, for a waveform having "tailing" phenomenon, the transmission rate and the frequency-domain performance are contradictory.

As described above, for this problem, a processing method in the prior art is real cutoff, that is, tailing of the initial envelope waveform is cut off, and then the obtained initial envelope waveform having no tailing is used as a new multiplexing waveform to perform a subsequent modulation, such as shifting, multiplication by a symbol, and superimposition. The real cutoff solution can effectively improve a symbol transmission rate. However, because there is no longer tailing, the frequency-domain performance is relatively poor, the bandwidth is relatively wide, the side lobe power is relatively high, and the interference to the main lobe signal is relatively large, thereby affecting system performance and increasing an error bit rate of the system.

In a research, the inventors find that an actual symbol width calculated based on a width of the initial envelope waveform determines a transmission rate of the waveform, and a smaller symbol width indicates a higher transmission rate of the waveform; and whether the initial envelope waveform has tailing in the time domain affects a performance of the waveform in the frequency domain.

Figure 10:
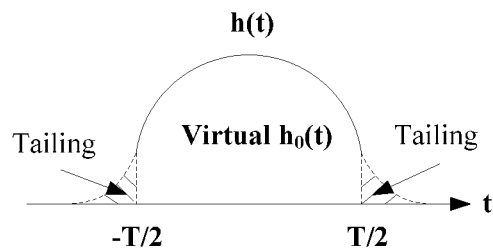
FIG. 10 is a schematic diagram of virtually truncating an initial envelope waveform when an OvXDM system is an OvTDM system according to a second embodiment of the present invention.

Therefore, this embodiment provides a virtual cutoff method. As shown in FIG. 10, an initial envelope waveform is virtually cut off but not really cut off. An initial envelope waveform obtained after virtual cutoff is used to calculate an actual symbol width, that is, the initial envelope waveform having no tailing is used to calculate the actual symbol width, such that the symbol width becomes smaller, and a transmission rate thereof is improved. In addition, in an actual modulation process, because the virtual cutoff is performed, the initial envelope waveform actually has tailing, such that the waveform has a good performance in the frequency domain. The initial envelope waveform that is not really cut off is shifted, multiplied by a symbol, superimposed, and the like, such that the complex modulated envelope waveform obtained after modulation also has a good performance in the frequency domain. Specifically, bandwidth of a frequency-domain signal waveform is relatively narrow, and side lobe attenuation is relatively fast; system performance is ensured without increasing decoding complexity.

The following describes the modulation method applied to an OvXDM system in the present invention with reference to the OvTDM system.

(1) generating an initial envelope waveform h(t) in the time domain based on design parameters.

The width of the initial envelope waveform h(t) is T, a quantity of times of overlapped multiplexing of the system is K, and a symbol width is $T_s$. Therefore, the width of the initial envelope waveform h(t) is $T=K*T_s$.

(2) searching "tailing" of the initial envelope waveform h(t).

Specifically, an amplitude of the initial envelope waveform is converted to a power in the time domain, the power is compared with a signal-to-noise ratio threshold of the system, and a time-domain part of the waveform corresponding to the power that is smaller than the signal-to-noise ratio threshold is determined as tailing.

Figure 11:
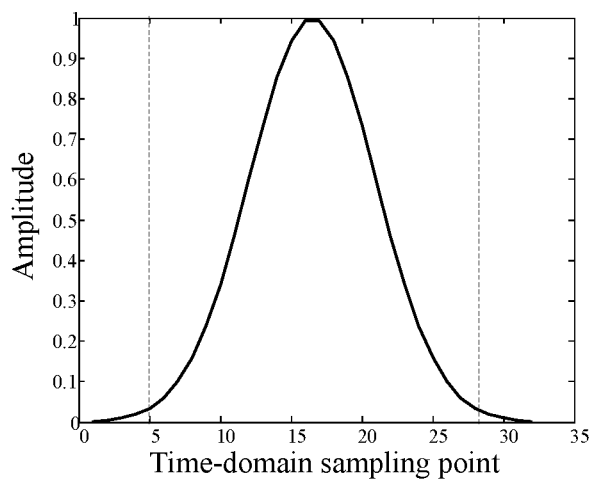
FIG. 11(a) is a schematic diagram of found tailing of an initial envelope waveform when an OvXDM system is an OvTDM system according to a second embodiment of the present invention, where a vertical coordinate is an amplitude.
FIG. 11(b) is a schematic diagram of found tailing of an initial envelope waveform when an OvXDM system is an OvTDM system according to a second embodiment of the present invention, where a vertical coordinate is a power.
Figure 11:
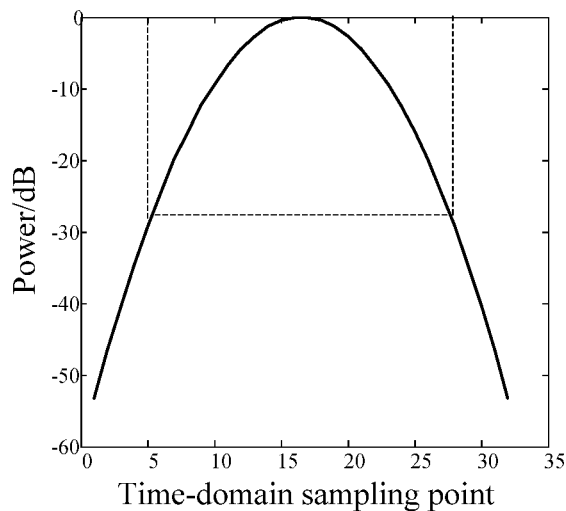

Using a Gaussian window function, namely, the initial envelope waveform of the Gaussian window function, as an example, assuming that the width T of h(t) is equal to 32, and the signal-to-noise ratio threshold is −30 dB, an amplitude of the multiplexing waveform is firstly converted to a power, then a symbol width corresponding to the power of the multiplexing waveform that is −30 dB is obtained, and the width corresponding to the waveform whose power is smaller than the signal-to-noise ratio threshold is used as tailing. In this embodiment, a part in a range of 5-27 of the multiplexing waveform is determined as the virtual cutoff width of the waveform, and the remaining part is determined as tailing. As shown in FIG. 11, a part of the waveform on the left of a left dashed line and a part of the waveform on the right of a right dashed line are determined as tailing of the waveform. A vertical coordinate in FIG. 11(*a*) is an amplitude, and a vertical coordinate in FIG. 11(*b*) is a power, where a unit is dB.

(3) Virtually cuting off the initial envelope waveform and calculating a time-domain shift interval ΔT.

Assuming that the bandwidth of the tailing obtained in (2) is $T_{tail}$, and the virtual initial envelope waveform obtained after virtual cutoff of the initial envelope waveform is represented as $h_0(t)$, a virtual width of the virtual initial envelope waveform $h_0(t)$ is T'=T and an actual symbol width is $T_s'$=T'/K=(T−$T_{tail}$)/K. It can be learned that the actual symbol width decreases from T/K to (T−$T_{tail}$)/K, and therefore a transmission rate is improved.

The virtual cutoff width T' of the initial envelope waveform is divided by the quantity K of times of overlapped multiplexing, to obtain the time-domain shift interval ΔT, that is, ΔT=T'/K.

(4) Modulating an Input Symbol Sequence.

The initial envelope waveform h(t) is shifted by the time-domain shift interval ΔT in the time domain based on the quantity K of times of overlapped multiplexing, to obtain offset envelope waveforms in the time domain. Specifically, for example, for a symbol sequence X={$X_0$, $X_1$, ..., $X_{N-1}$} whose length is N, where N is a positive integer, the initial envelope waveform h(t) is shifted by 0 to N−1 time-domain shift intervals ΔT respectively, to obtain N offset envelope waveforms. An $i^{th}$ shifted envelope waveform is h(t−i×ΔT), and 0≤i≤N−1.

Then symbols in a to-be-modulated sequence are multiplied by offset envelope waveforms respectively corresponding to the symbols, to obtain modulated envelope waveforms in the time domain. For example, In one embodiment, specifically, the N symbols in the symbol sequence are multiplied by offset envelope waveforms respectively corresponding to the symbols, to obtain N modulated envelope waveforms. An modulated envelope waveform is $x_i$h(t−i×ΔT), and 0≤i≤N−1.

Then the modulated envelope waveforms are superimposed in the time domain, to obtain a complex modulated envelope waveform in the time domain. For example, an adder operation is performed on $x_i$h(t−i×ΔT) when i is ranges from 0 to N−1, to obtain a complex modulated envelope waveform $$s(t) = \sum_i x_i h(t - i \times \Delta T).$$

Figure 12:
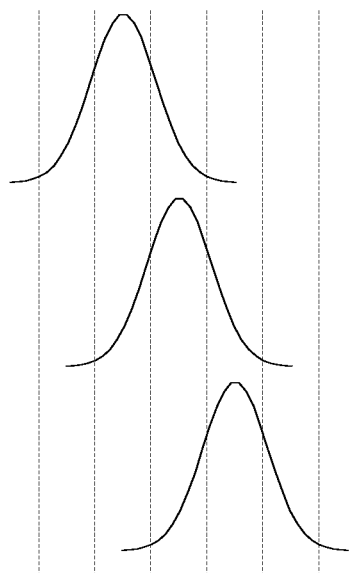
FIG. 12 is a schematic diagram of a superimposition process of virtually cut off initial envelope waveforms when an OvXDM system is an OvTDM system according to a second embodiment of the present invention.
Figure 13:
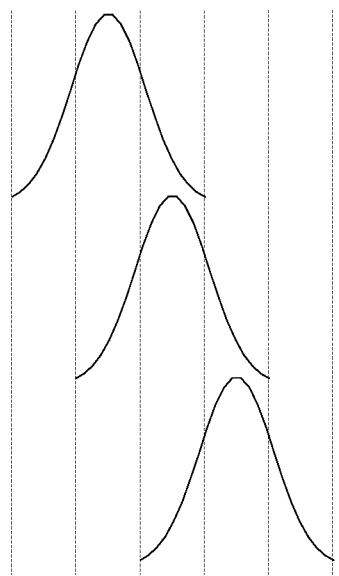
FIG. 13 is a schematic diagram of a superimposition process of really cut off initial envelope waveforms when an OvXDM system is an OvTDM system according to a second embodiment of the present invention.

Referring to FIG. 12, FIG. 12 shows a process of superimposing modulated envelope waveforms that are virtually cut off when K is equal to 3. It can be learned that the modulated envelope waveforms having tailings also participate in the superimposition. Referring to FIG. 13, FIG. 13 shows a process of superimposing modulated envelope waveforms that are really cut off when K is equal to 3. It can be learned that tailings of the modulated envelope waveforms are removed, that is, the modulated envelope waveforms having no tailings participate in the superimposition.

Figure 14:
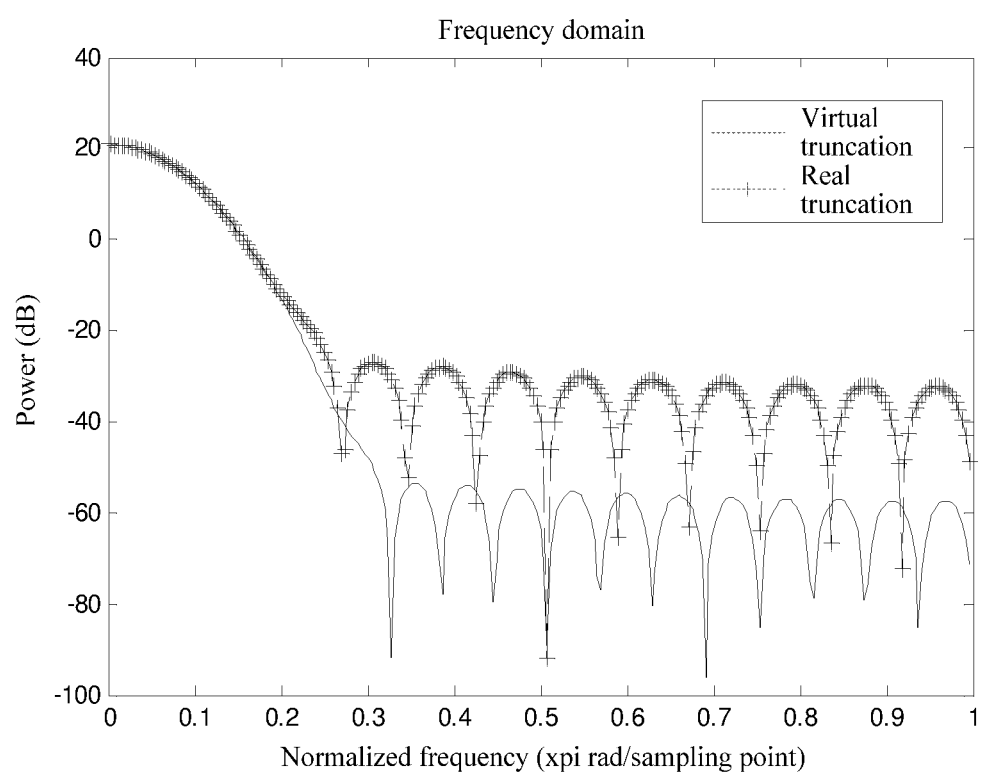
FIG. 14 is a diagram of comparing, in the frequency domain, a performance of a complex modulated envelope waveform obtained by using a virtual cutoff modulating method in Embodiment 1 and a performance of a complex modulated envelope waveform obtained by using a real cutoff modulation method in the prior art when an OvXDM system is an OvTDM system according to a second embodiment of the present invention.

Using the initial envelope waveform of Gaussian window function as an example, a frequency-domain performance of the complex modulated envelope waveform obtained by using the real cutoff solution in the prior art and a frequency-domain performance of the complex modulated envelope waveform obtained by using the virtual cutoff solution in the present invention are compared in FIG. 14. It can be learned from the figure that bandwidth of the complex modulated envelope waveform obtained by using the virtual cutoff solution in the present invention is narrower in the frequency domain, and side lobe attenuation is faster.

Embodiment 3

This embodiment is described by using an OvHDM system as an example.

In the OvHDM system, namely, a time-frequency overlapped multiplexing system, frame symbols are overlapped with each other in the time domain, and subcarriers are also overlapped with each other in the frequency domain, thereby implementing overlapping in both time and frequency domains.

A complex baseband signal model in the OvHDM system is:

$$s(t) = \sum_{n=0}^{N-1} \sum_{l=0}^{L-1} u_n(l) w(t - l\Delta T) e^{j2\pi n \Delta B(t - l\Delta T)}, t \in [0, T_a)$$

Meanings of parameters are as follows.

Time-Domain parameters:

w(t) is an impulse response of a pulse shaped filter;

u(l) is an $l^{th}$ symbol transmitted in the system;

T is a period of each symbol;

ΔT is an interval for transmitting symbols, where ΔT=T/K and K is a quantity of times of overlapped multiplexing in the time domain;

L is a total number of symbols transmitted in each frame; and $T_a$T is a frame length of each frame, where $T_a$=(L+K−1)*ΔT.

Frequency-Domain Parameters:

N is a quantity of subcarriers;

ΔB is a subcarrier spacing;

D is a quantity of times of overlapped multiplexing in the frequency domain;

zero bandwidth of main lobe $B_a$=(N+D−1)*ΔB; and zero bandwidth of main lobe of each subcarrier B=D*ΔB.

Spectral Efficiency:

Spectral efficiency of the OvHDM system is $$\eta = \frac{DK\log_2 Q}{\lambda} * \frac{N}{N+D-1} * \frac{L}{L+K-1},$$

where Q is a quantity of modulation levels, and λ is a time-bandwidth product of the pulse shaped filter, that is, λ=BT.

If L tends to be infinite, $$\lim_{L \to \infty} \eta = \frac{DK\log_2 Q}{\lambda} * \frac{N}{N+D-1} = \eta_0.$$

If the quantity N of subcarriers also tends to be infinite, $$\lim_{N \to \infty} \eta_0 = \frac{DK\log_2 Q}{\lambda} = \eta_{max},$$

the limit of the spectral efficiency can be achieved in the OvHDM system.

The following describes in detail a modulation process and a demodulation process in the OvHDM system.

Figure 15:
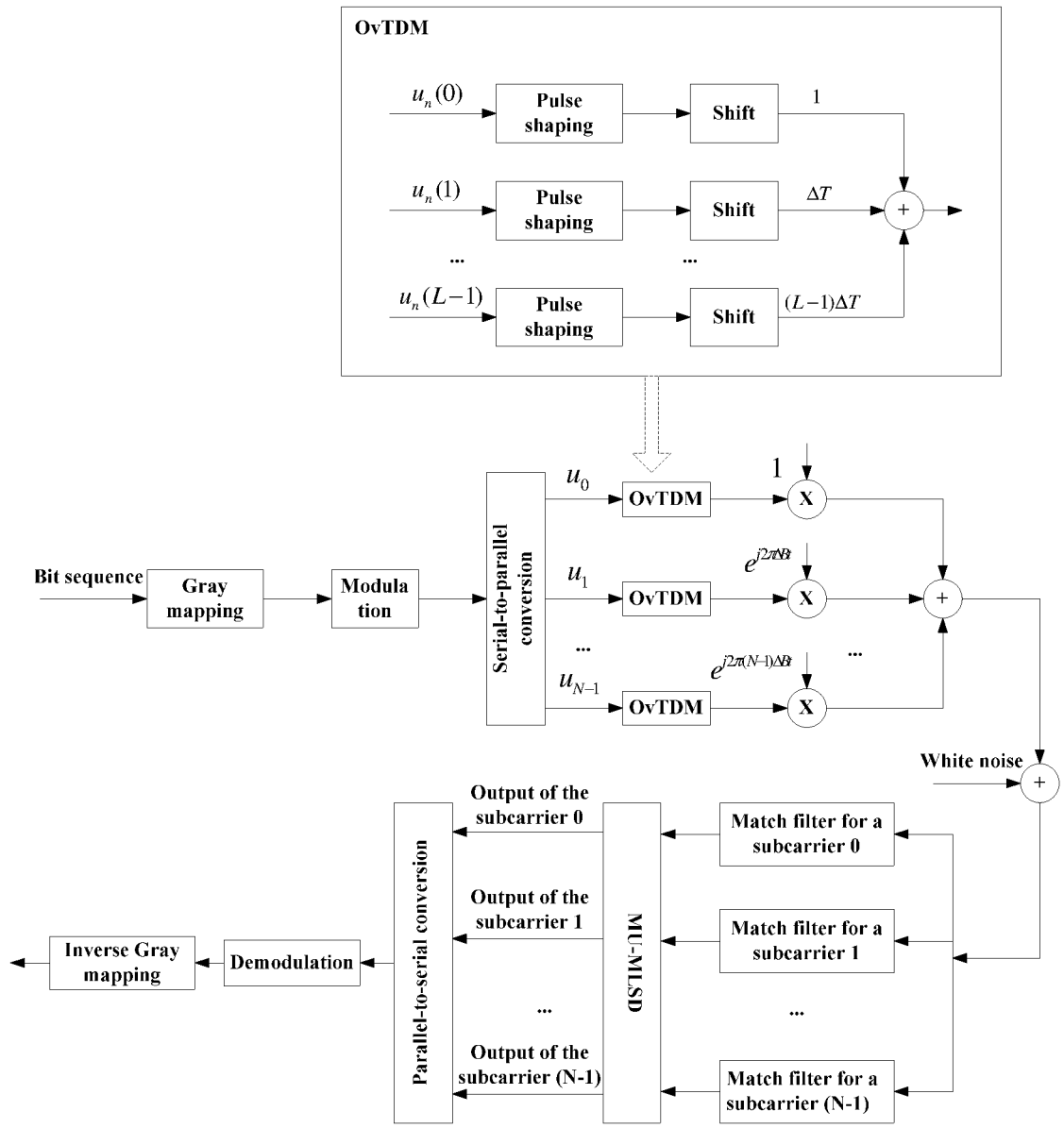
FIG. 15 is a schematic structural diagram of an OvHDM system according to a third embodiment of the present invention.

As shown in FIG. 15, in the OvHDM system, overlapped multiplexing is firstly implemented on input symbols in the time domain, and then data obtained after the overlapped multiplexing is added to overlapped subcarriers. In this way, an OvHDM process is finally implemented through time-frequency overlapping. In one embodiment, the modulation may be performed through BPSK. A corresponding relationship between a bit sequence and a symbol is {0, 1}→{+1, −1}, that is, a bit 0 is converted to a symbol +1, and a bit 1 is converted to a symbol −1.

(1) Generating an initial envelope waveform w(t) in the time domain based on design parameters.

(2) Shifting the initial envelope waveform w(t) generated in (1) by a specific time-domain shift interval $\Delta T$, to form offset envelope waveforms w(t−i×$\Delta T$) at various moments, where 0≤i≤N−1.

(3) Multiplying symbols in a to-be-modulated sequence by offset envelope waveforms respectively corresponding to the symbols, to obtain modulated envelope waveforms $u_i$w (t−x×$\Delta T$) in the time domain.

(4) Superimposing the modulated envelope waveforms in the time domain, to obtain a complex modulated envelope waveform $$s_{OvTDM}(t) = \sum_i u_i w(t - i \times \Delta T)$$

in the time domain.

(5) Adding OvTDM signals to overlapped subcarriers, to implement OvFDM.

Overlapped multiplexing in the frequency domain refers to a general OvFDM system. A corresponding multiplexing waveform is selected to perform superimposition on subcarriers in the frequency domain, a superimposition method thereof is similar to the superimposition process in OvTDM, details are not described herein again. Types of multiplexing waveforms in the frequency domain are the same as those of multiplexing waveforms in the time domain, any type may be selected as the multiplexing waveform in the frequency domain. In this solution, for ease of description, a rectangular wave is used as an example to describe the overlapped multiplexing in the frequency domain.

It can be learned from a Fourier convolution property that convolution in the frequency domain is equivalent to multiplication in the time domain. Therefore, if a spectrum offset $\Delta B$ needs to be implemented in the frequency domain, it is equivalent to multiplying data by $e^{j2\pi n \Delta B t}$ in the time domain. Finally, the OvHDM process is represented by the following formula:

$$s(t) = \sum_{n=0}^{N-1} s_{OvTDM}(t) e^{j2\pi n \Delta B t}, t \in [0, T_a)$$

The aforementioned description is a modulation process in the OvHDM system. A demodulation process in the OvHDM is as follows:

(6) Filtering a received signal in the frequency domain, and filtering subcarriers by using corresponding matched filters.

(7) Performing MU-MLSD decoding on data carried on each subcarrier.

(8) Performing parallel-to-serial conversion on data of each subcarrier obtained after the MU-MLSD decoding, and combining multi-channel data into one-channel data.

(9) Performing demodulation and inverse Gray mapping on the combined data, and outputting the data.

In this embodiment, in (2), the initial envelope waveform w(t) is shifted by the specific time-domain shift interval, where the initial envelope waveform w(t) may be the waveform that is not cut off and has tailing, and the time-domain shift interval may be calculated based on a width of the initial envelope waveform w(t) obtained after virtual cutoff. A process and a principle are similar to those in Embodiment 2. Details are not described herein again.

Embodiment 4

In the entire modulation and demodulation process of the OvHDM system in Embodiment 3, when the initial envelope waveform generated in (1) is smooth in the time domain, correspondingly, the initial envelope waveform in the frequency domain has relatively narrow bandwidth and relatively fast side lobe attenuation; that is, for the same amount of data that is sent, the same time is occupied in the time domain but a relatively narrow frequency band needs to be occupied so as to implement transmission. This saves frequency band resources and increases a transmission rate.

In one embodiment, the initial envelope waveform in the time domain generated in the OvHDM system may be any one of the following waveforms: an envelope waveform of a Parzen window function or an envelope waveform of a derived window function of the Parzen window function; or an envelope waveform of a Bartlett window function or an envelope waveform of a derived window function of the Bartlett window function; or an envelope waveform of a Bartlett-Hanning window function or an envelope waveform of a derived window function of the Bartlett-Hanning window function; or an envelope waveform of a Bohman window function or an envelope waveform of a derived window function of the Bohman window function; or an envelope waveform of a Blackman window function or an envelope waveform of a derived window function of the Blackman window function; or an envelope waveform of a Blackman-Harris window function or an envelope waveform of a derived window function of the Blackman-Harris window function; or an envelope waveform of a Gaussian window function or an envelope waveform of a derived window function of the Gaussian window function; or an envelope waveform of a Hamming window function or an envelope waveform of a derived window function of the Hamming window function; or an envelope waveform of a Hanning window function or an envelope waveform of a derived window function of the Hanning window function; or an envelope waveform of a Kaiser window function or an envelope waveform of a derived window function of the Kaiser window function; or an envelope waveform of a Nuttall window function or an envelope waveform of a derived window function of the Nuttall window function; or an envelope waveform of a flat top window function or an envelope waveform of a derived window function of the flat top window function; or an envelope waveform of a Chebyshev window function or an envelope waveform of a derived window function of the Chebyshev window function; or an envelope waveform of a triangular window function or an envelope waveform of a derived window function of the triangular window function; or an envelope waveform of a Taylor window function or an envelope waveform of a derived window function of the Taylor window function; or an envelope waveform of a Tukey window function or an envelope waveform of a derived window function of the Tukey window function. Herein, a derived window function herein may be a series of function forms related to shaping of an original waveform, such as a continuous multiplication function, various-order derivatives, and a sum of various-order derivatives of pulse shaping of the original waveform. For example, the derived window function of the Chebyshev envelope waveform may be a series of functions related to Chebyshev pulse shaping, such as a continuous multiplication function, various-order derivatives, and a sum of various-order derivatives of Chebyshev pulse shaping. All this initial envelope waveforms are relatively smooth.

For example, an OvHDM system with the following parameters is used as an example to describe selection of the initial envelope waveform and an effect thereof: a quantity of times of overlapped multiplexing in the time domain: K=3; a total number of symbols sent in each frame: L=8, a period of each symbol: T=63, an interval for transmitting symbols: $\Delta T=T/K=21$; an input symbol sequence: $u_i=\{+1 +1 -1 -1 -1 +1 -1 +1\}$; a quantity of subcarriers: N=3; a quantity of times of overlapped multiplexing in the frequency domain D=2; zero bandwidth of a main lobe of a subcarrier: B=15; and a subcarrier spacing: $\Delta B=B/D=7.5$.

The following separately provides description by using different types of initial envelope waveforms as examples.

Figure 16:
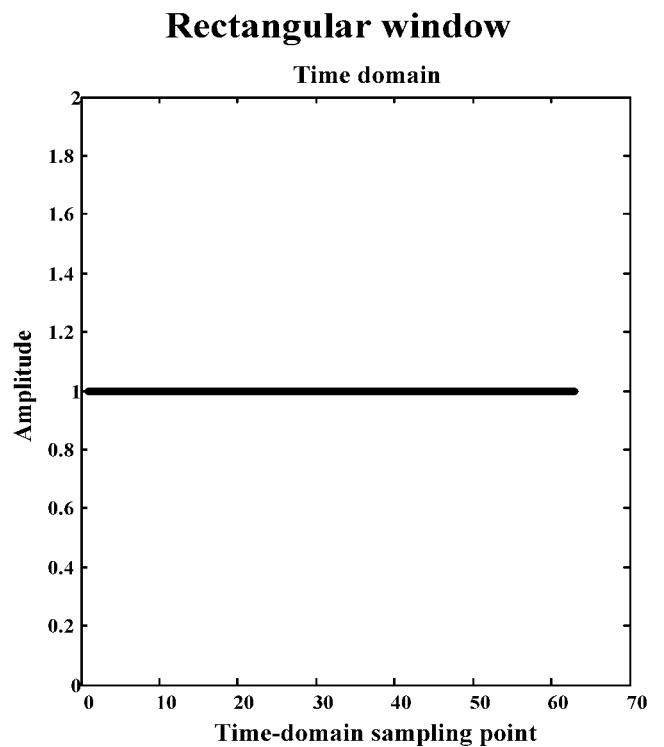
FIG. 16(a) is a diagram of a rectangular window envelope waveform in the time domain according to a fourth embodiment of the present invention.
FIG. 16(b) is a diagram of a rectangular window envelope waveform switched from time domain to frequency domain according to a fourth embodiment of the present invention.
Figure 16:
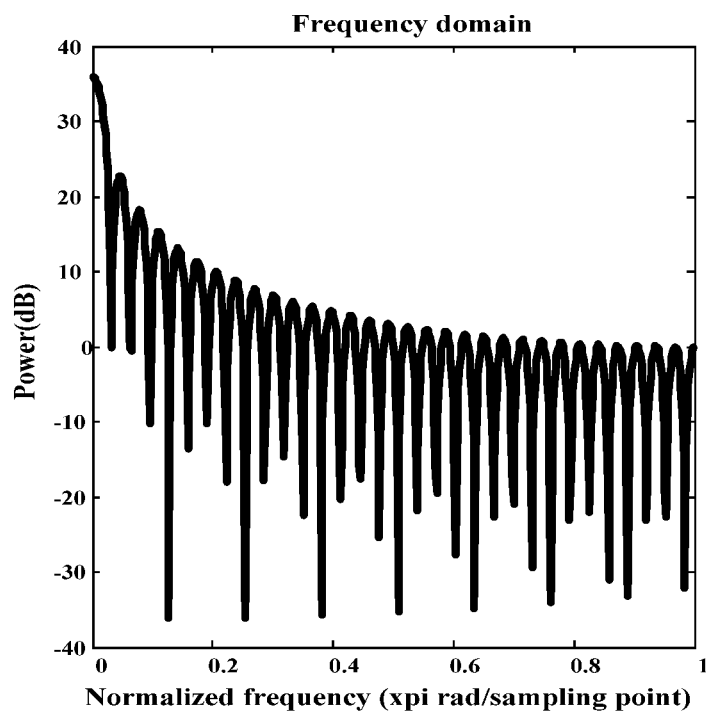
Figure 17:
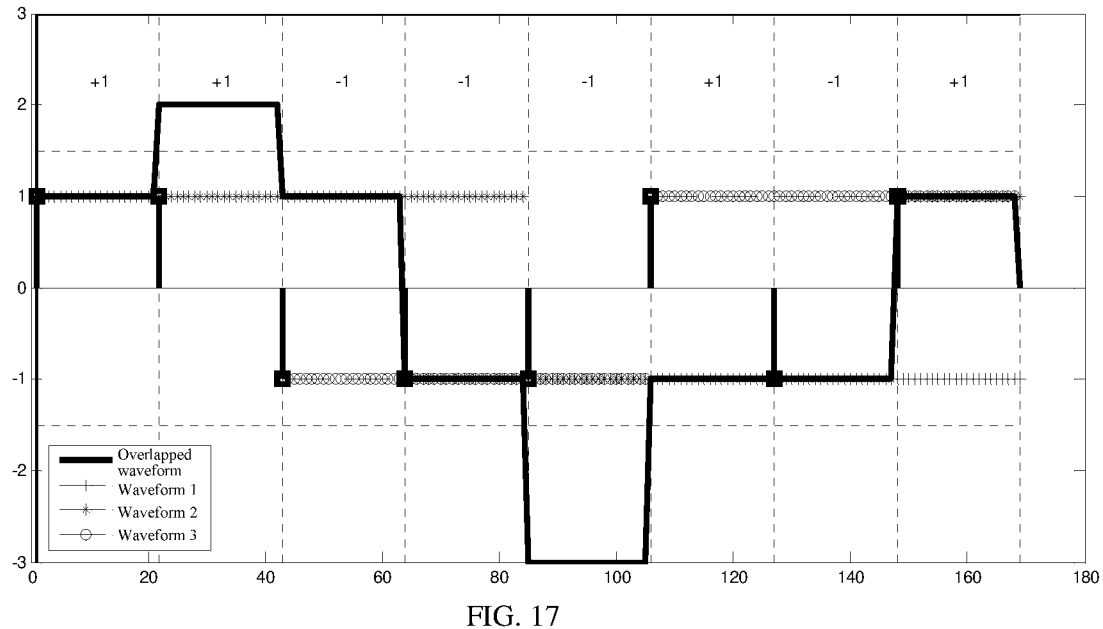
FIG. 17 is a diagram, in the time domain, of modulated envelope waveforms and a complex modulated envelope waveform that are obtained after modulation is performed by using a rectangular window envelope waveform as an initial envelope waveform in an OvHDM system according to a fourth embodiment of the present invention.
Figure 18:
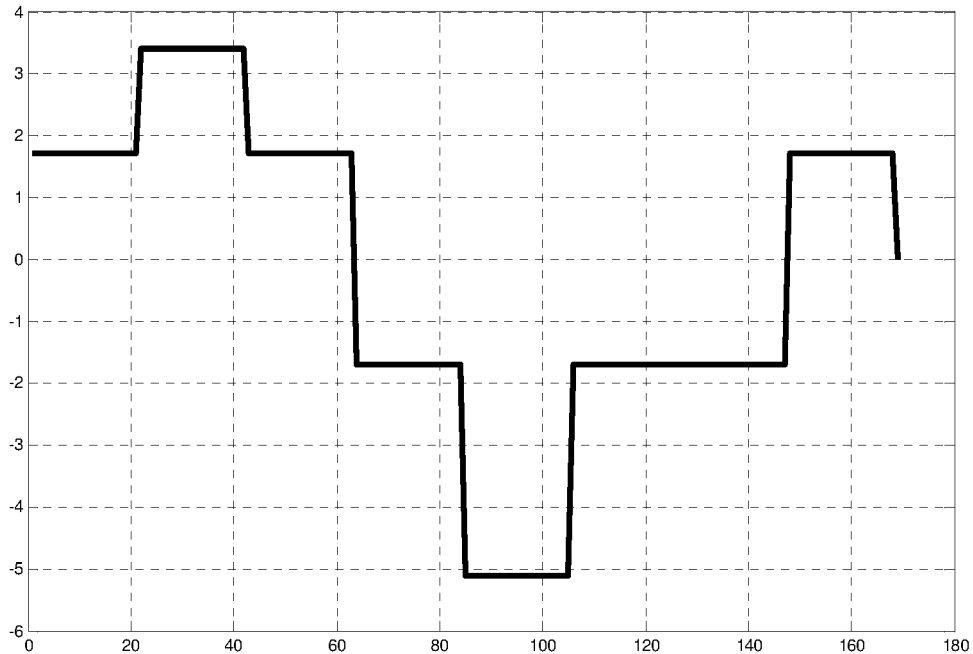
FIG. 18 is a diagram, in the time domain, of a time-frequency complex modulated envelope waveform obtained after modulation is performed by using a rectangular window envelope waveform as an initial envelope waveform in an OvHDM system according to a fourth embodiment of the present invention.

Firstly, a reference rectangular window function is provided. When an initial envelope waveform is the envelope waveform of a rectangular window function, referring to FIG. 16. FIG. 16(a) is a diagram of the envelope waveform of the rectangular window function in the time domain when a window length is 63, and FIG. 16(b) is a diagram of the envelope waveform of a normalized rectangular window function in the frequency domain. It can be learned from the figure that the envelope waveform of the rectangular window function starts from 1 in the time domain and has very wide bandwidth, and has slow side lobe attenuation in the frequency domain. Therefore, the waveform obtained after superimposition is not smooth in the time domain, and has relatively wide bandwidth in the frequency domain, it is difficult to distinguish between valid signals and invalid signals, and waveform cutting accuracy and a encoding/decoding capability decrease. In an actual system, when the transmission rate and spectrum efficiency η are the same, both a required transmitting power and a bit error rate are high. In FIG. 17, dashed lines in different patterns represent several modulated envelope waveforms in the time domain, and a solid line represents a complex modulated envelope waveform. FIG. 18 is a diagram of a time-frequency complex modulated envelope waveform finally obtained after modulation in the OvHDM system.

1. the Initial Envelope Waveform is the Envelope Waveform of a Parzen Window Function.

Figure 19:
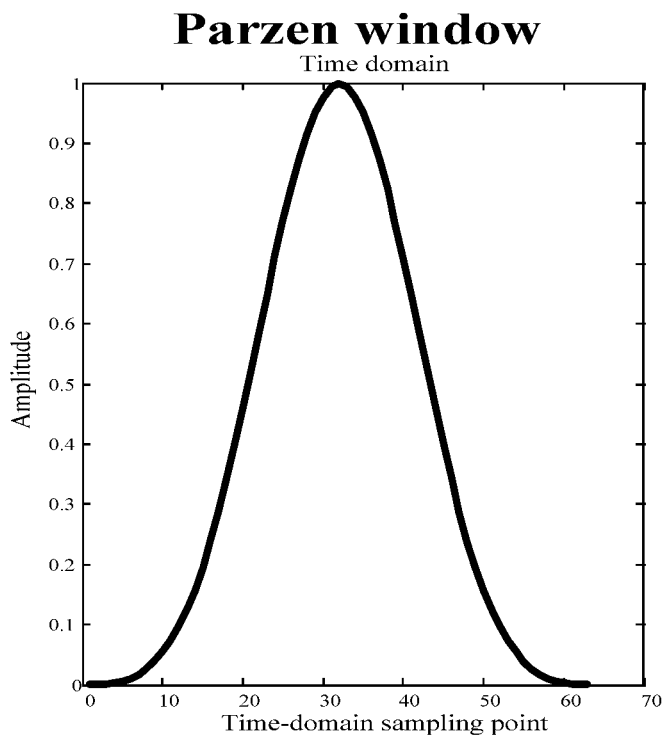
FIG. 19(a) is a diagram of a Parzen envelope waveform in the time domain according to a fourth embodiment of the present invention.
FIG. 19(b) is a diagram of a Parzen envelope waveform switched from time domain to frequency domain according to a fourth embodiment of the present invention.
Figure 19:
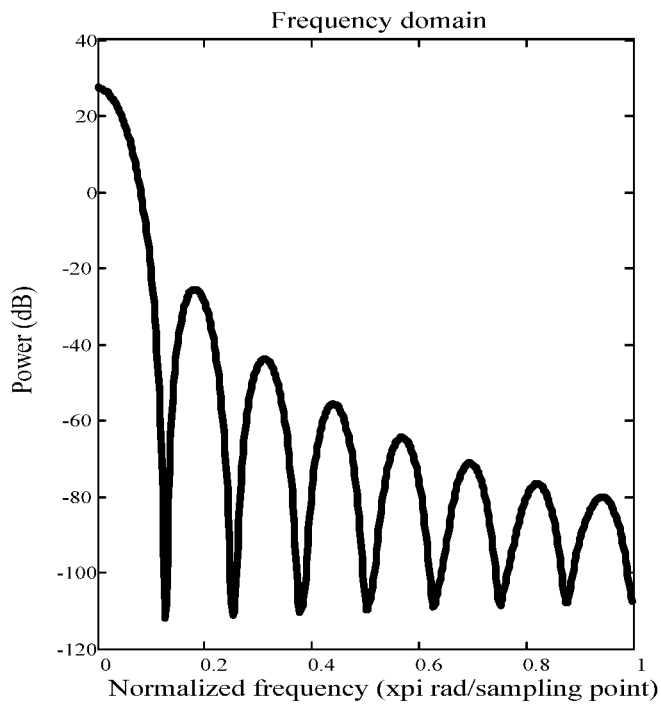
Figure 20:
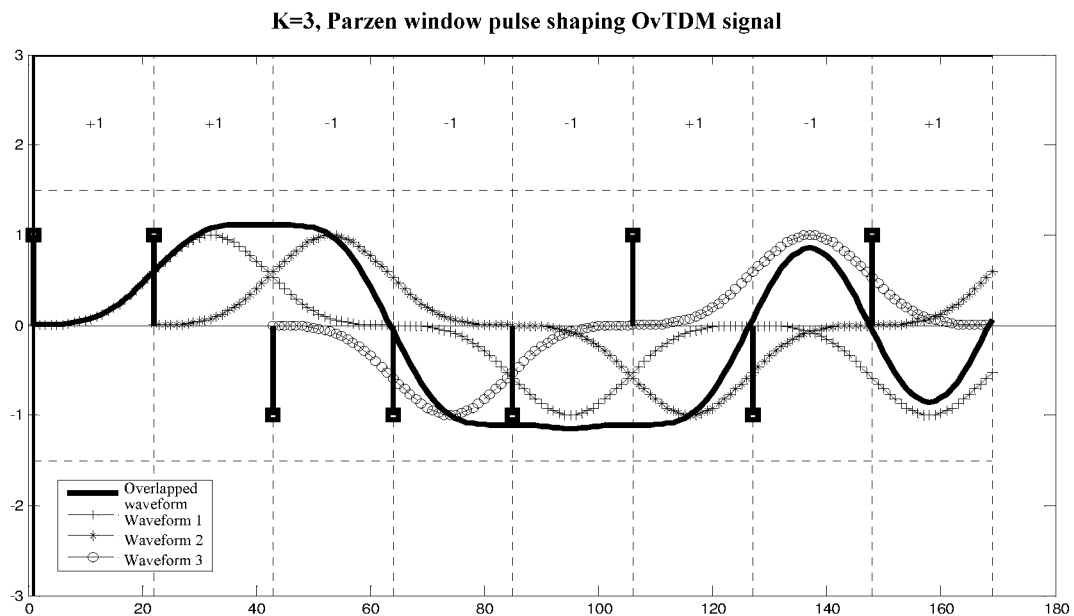
FIG. 20 is a diagram, in the time domain, of modulated envelope waveforms and a complex modulated envelope waveform that are obtained after modulation is performed by using a Parzen envelope waveform as an initial envelope waveform in an OvHDM system according to a fourth embodiment of the present invention.
Figure 21:
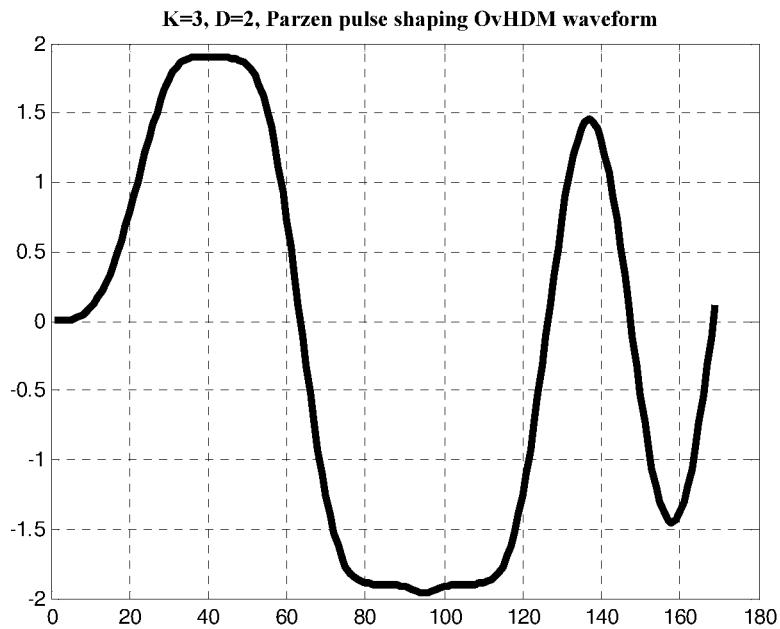
FIG. 21 is a diagram, in the time domain, of a time-frequency complex modulated envelope waveform obtained after modulation is performed by using a Parzen envelope waveform as an initial envelope waveform in an OvHDM system according to a fourth embodiment of the present invention.

Referring to FIG. 19, FIG. 19(a) is a diagram of the envelope waveform of the Parzen window function in the time domain when a window length is 63, and FIG. 19(b) is a diagram of the envelope waveform of a normalized Parzen window function in the frequency domain. It can be learned from the figure that the envelope waveform of the Parzen window function starts from 0 in the time domain, and has side lobe attenuation in the frequency domain that is close to 60 dB. Therefore, the envelope waveform of the Parzen window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 20, dashed lines in different patterns represent several modulated envelope waveforms in the time domain, and a solid line represents a complex modulated envelope waveform. FIG. 21 is a diagram of a time-frequency complex modulated envelope waveform finally obtained after modulation in the OvHDM system.

2. the Initial Envelope Waveform is the Envelope Waveform of a Bartlett Window Function.

Figure 22:
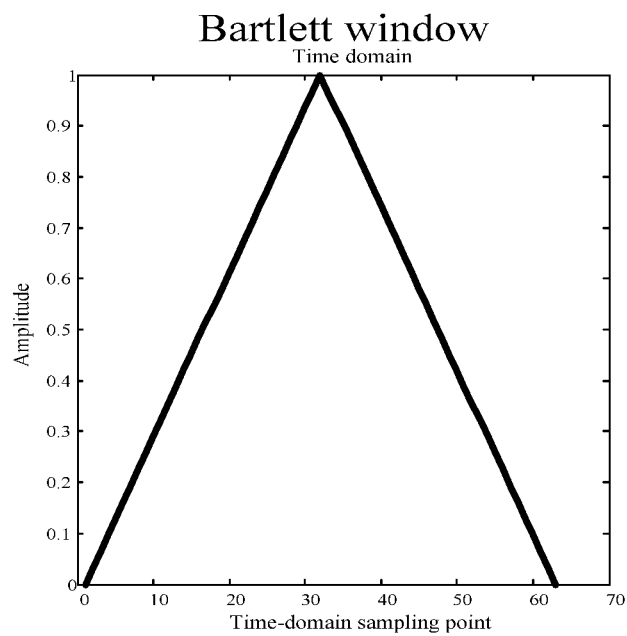
FIG. 22(a) is a diagram of a Bartlett envelope waveform in the time domain according to a fourth embodiment of the present invention.
FIG. 22(b) is a diagram of a Bartlett envelope waveform switched from time domain to frequency domain according to a fourth embodiment of the present invention.
Figure 22:
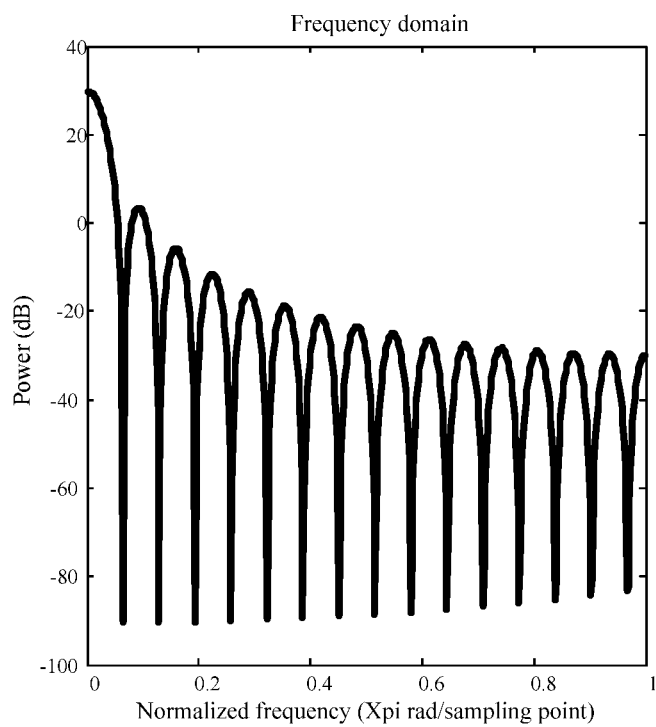
Figure 23:
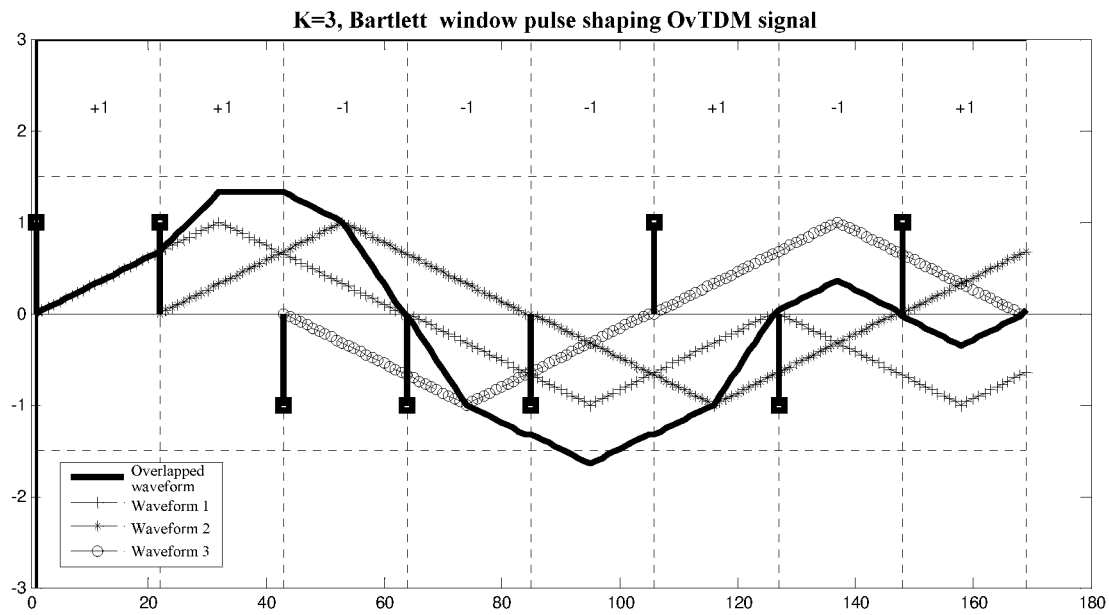
FIG. 23 is a diagram, in the time domain, of modulated envelope waveforms and a complex modulated envelope waveform that are obtained after modulation is performed by using a Bartlett envelope waveform as an initial envelope waveform in an OvHDM system according to a fourth embodiment of the present invention.
Figure 24:
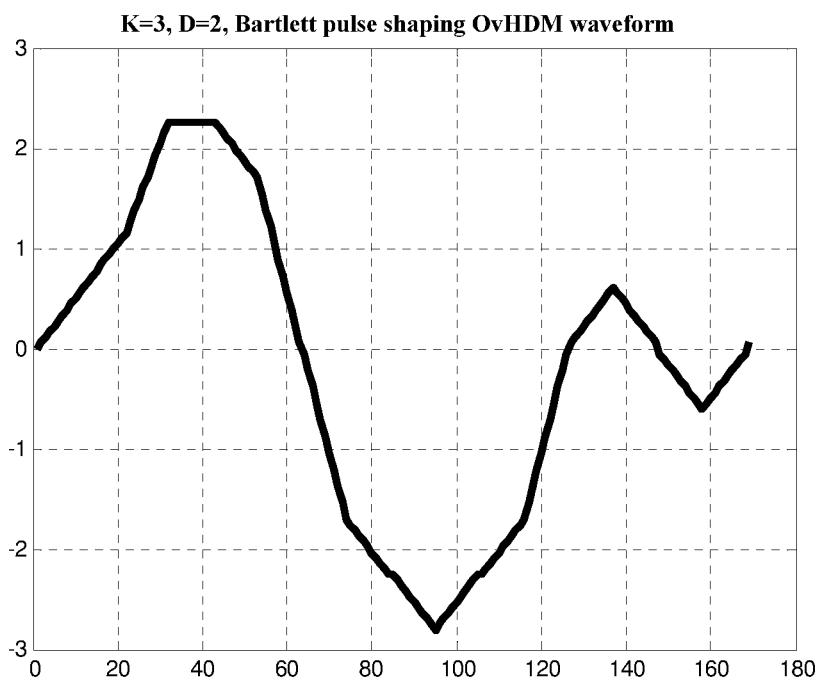
FIG. 24 is a diagram, in the time domain, of a time-frequency complex modulated envelope waveform obtained after modulation is performed by using a Bartlett envelope waveform as an initial envelope waveform in an OvHDM system according to a fourth embodiment of the present invention.

Referring to FIG. 22, FIG. 22(a) is a diagram of the envelope waveform of the Bartlett window function in the time domain when a window length is 63, and FIG. 22(b) is a diagram of the envelope waveform of a normalized Bartlett window function in the frequency domain. It can be learned from the figure that the envelope waveform of the Bartlett window function starts from 0 in the time domain, and has side lobe attenuation in the frequency domain that is close to 30 dB. Therefore, the envelope waveform of the Bartlett window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 23, dashed lines in different patterns represent several modulated envelope waveforms in the time domain, and a solid line represents a complex modulated envelope waveform. FIG. 24 is a diagram of a time-frequency complex modulated envelope waveform finally obtained after modulation in the OvHDM system.

3. the Initial Envelope Waveform is the Envelope Waveform of a Bartlett-Hanning Window Function.

Figure 25:
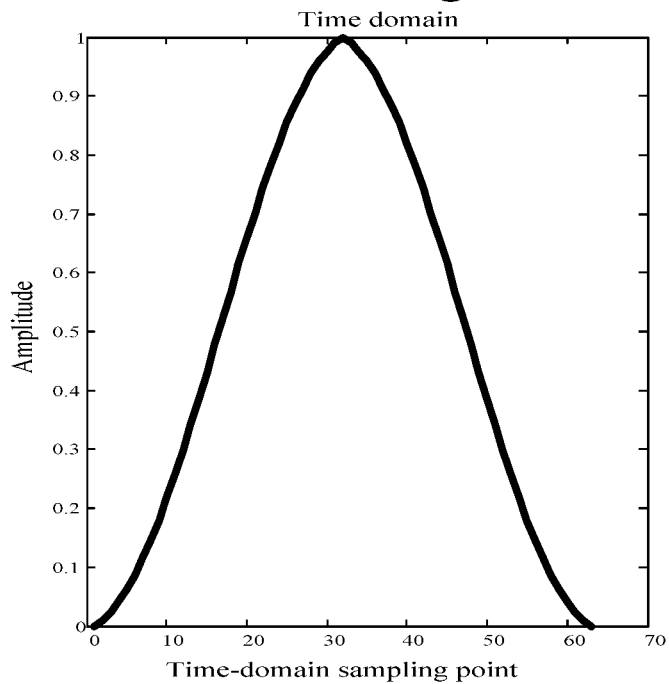
FIG. 25(a) is a diagram of a Bartlett-Hanning envelope waveform in the time domain according to a fourth embodiment of the present invention.
FIG. 25(b) is a diagram of a Bartlett-Hanning envelope waveform switched from time domain to frequency domain according to a fourth embodiment of the present invention.
Figure 25:
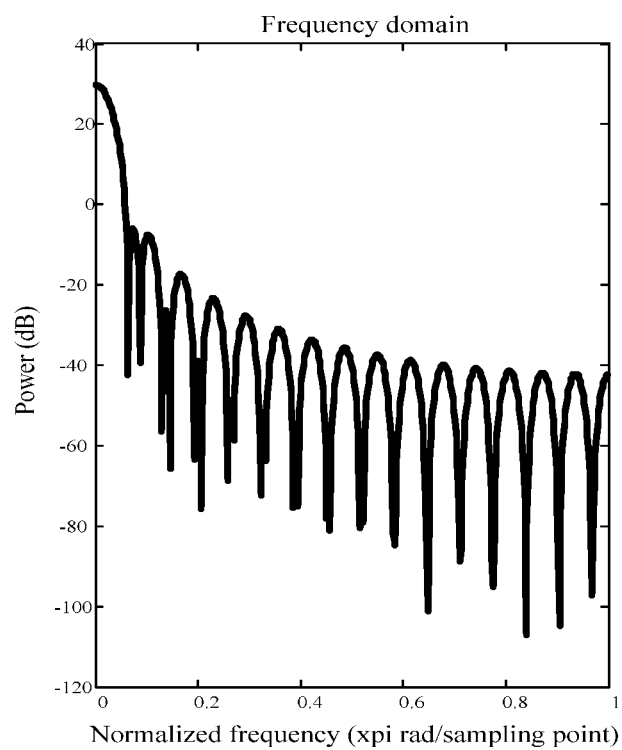
Figure 26:
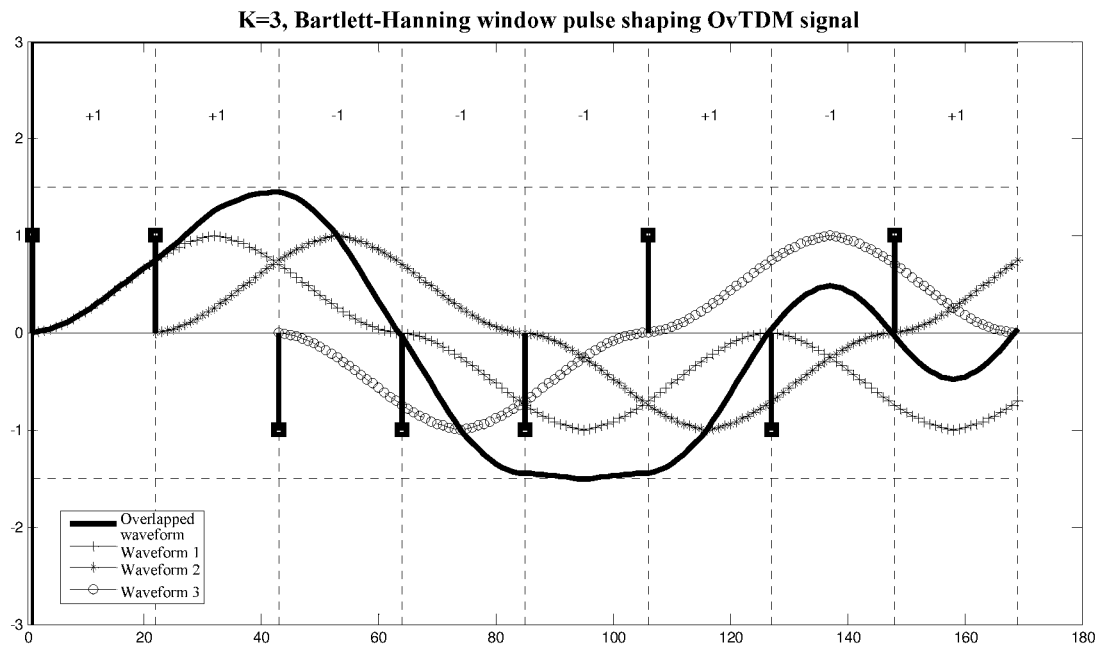
FIG. 26 is a diagram, in the time domain, of modulated envelope waveforms and a complex modulated envelope waveform that are obtained after modulation is performed by using a Bartlett-Hanning envelope waveform as an initial envelope waveform in an OvHDM system according to a fourth embodiment of the present invention.
Figure 27:
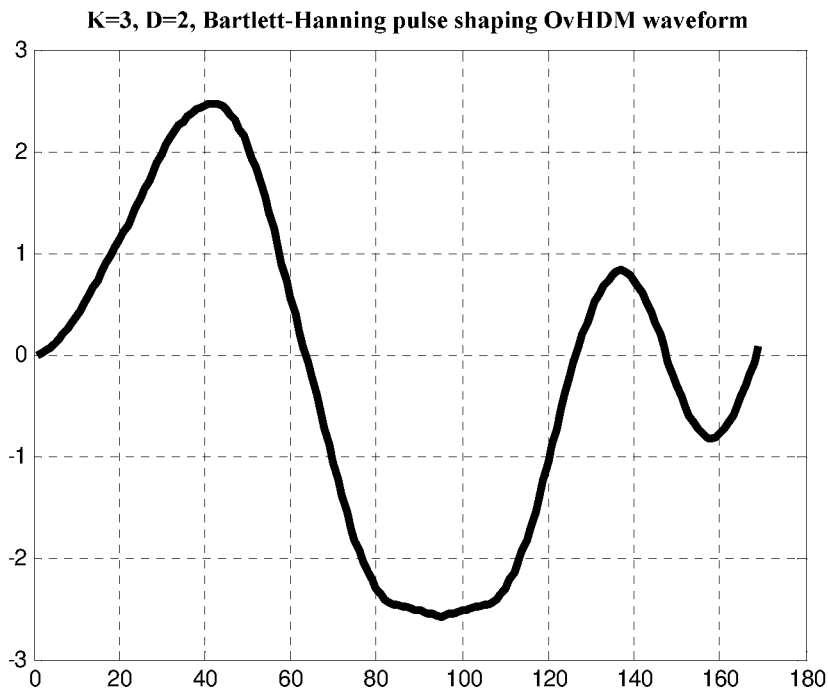
FIG. 27 is a diagram, in the time domain, of a time-frequency complex modulated envelope waveform obtained after modulation is performed by using a Bartlett-Hanning envelope waveform as an initial envelope waveform in an OvHDM system according to a fourth embodiment of the present invention.

Referring to FIG. 25, FIG. 25(a) is a diagram of the envelope waveform of the Bartlett-Hanning window function in the time domain when a window length is 63, and FIG. 25(b) is a diagram of the envelope waveform of a normalized Bartlett-Hanning window function in the frequency domain. It can be learned from the figure that the envelope waveform of the Bartlett-Hanning window function starts from 0 in the time domain, and has side lobe attenuation in the frequency domain that is close to 40 dB. Therefore, the envelope waveform of the Bartlett-Hanning window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 26, dashed lines in different patterns represent several modulated envelope waveforms in the time domain, and a solid line represents a complex modulated envelope waveform. FIG. 27 is a diagram of a time-frequency complex modulated envelope waveform finally obtained after modulation in the OvHDM system.

4. the Initial Envelope Waveform is the Envelope Waveform of a Bohman Window Function.

Figure 28:
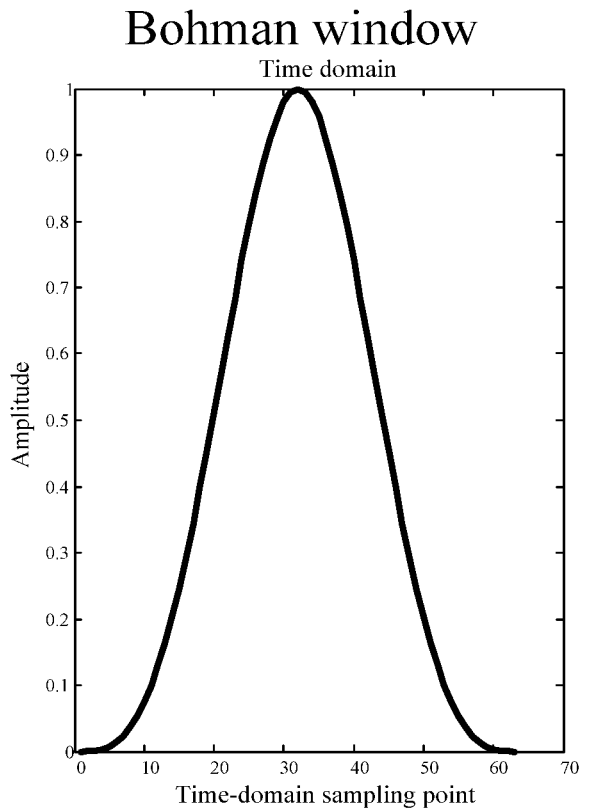
FIG. 28(a) is a diagram of a Bohman envelope waveform in the time domain according to a fourth embodiment of the present invention.
FIG. 28(b) is a diagram of a Bohman envelope waveform switched from time domain to frequency domain according to a fourth embodiment of the present invention.
Figure 28:
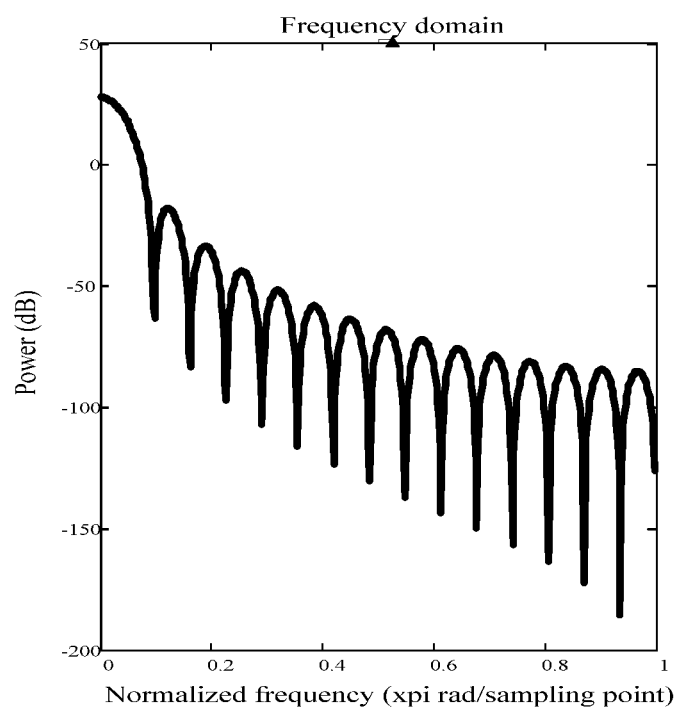
Figure 29:
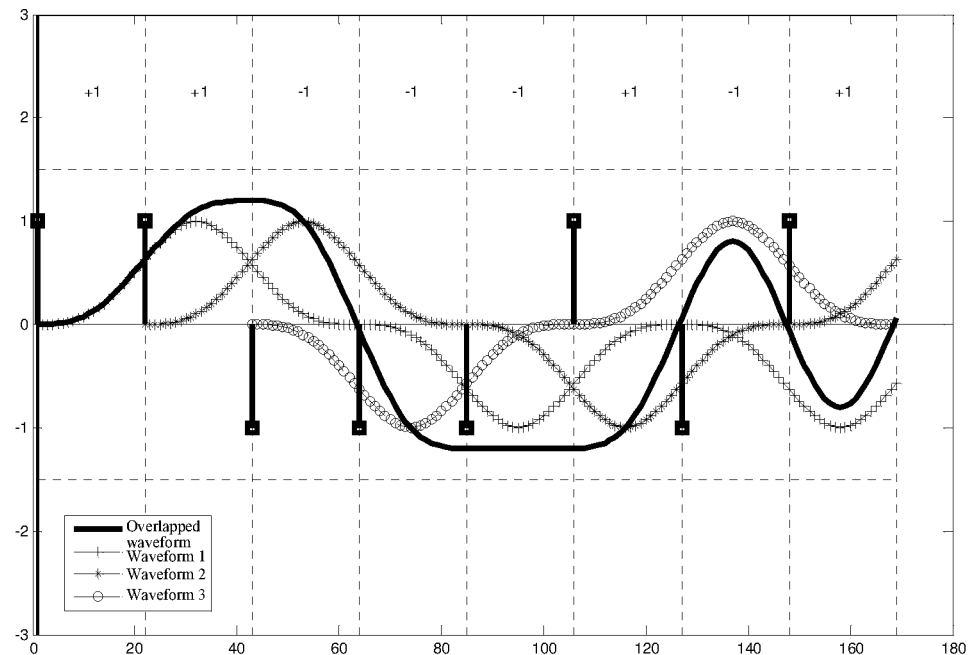
FIG. 29 is a diagram, in the time domain, of modulated envelope waveforms and a complex modulated envelope waveform that are obtained after modulation is performed by using a Bohman envelope waveform as an initial envelope waveform in an OvHDM system according to a fourth embodiment of the present invention.
Figure 30:
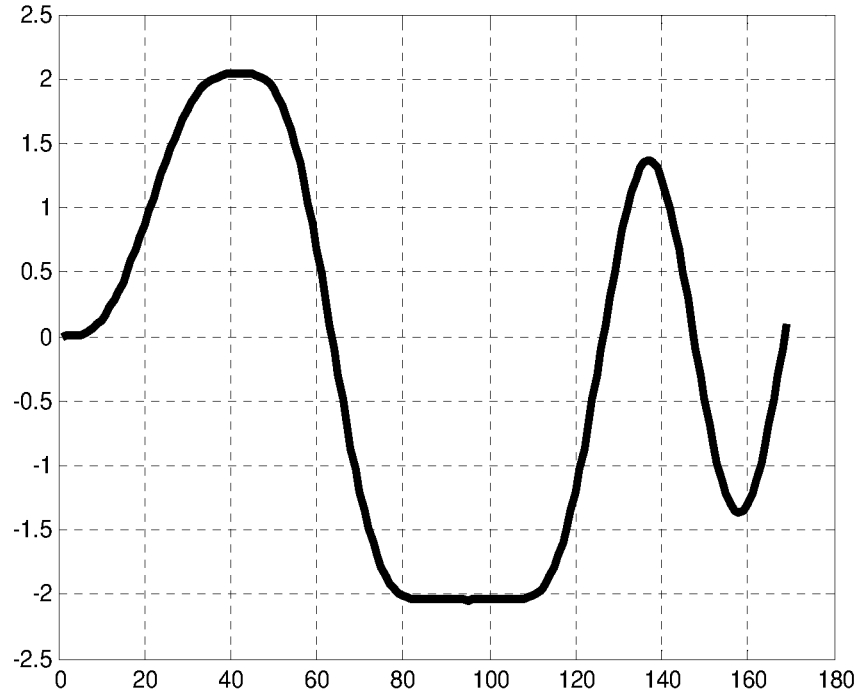
FIG. 30 is a diagram, in the time domain, of a time-frequency complex modulated envelope waveform obtained after modulation is performed by using a Bohman envelope waveform as an initial envelope waveform in an OvHDM system according to a fourth embodiment of the present invention.

Referring to FIG. 28, FIG. 28(a) is the envelope waveform of the Bohman window function in the time domain when a window length is 63, and FIG. 28(b) is a diagram of the envelope waveform of a normalized Bohman window function in the frequency domain. It can be learned from the figure that the envelope waveform of the Bohman window function starts from 0 in the time domain, and has side lobe attenuation in the frequency domain that is close to 60 dB. Therefore, the envelope waveform of the Bohman window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 29, dashed lines represent several modulated envelope waveforms in different patterns in the time domain, and a solid line represents a complex modulated envelope waveform. FIG. 30 is a diagram of a time-frequency complex modulated envelope waveform finally obtained after modulation in the OvHDM system.

5. The initial envelope waveform is the envelope waveform of a Blackman window Function.

Figure 31:
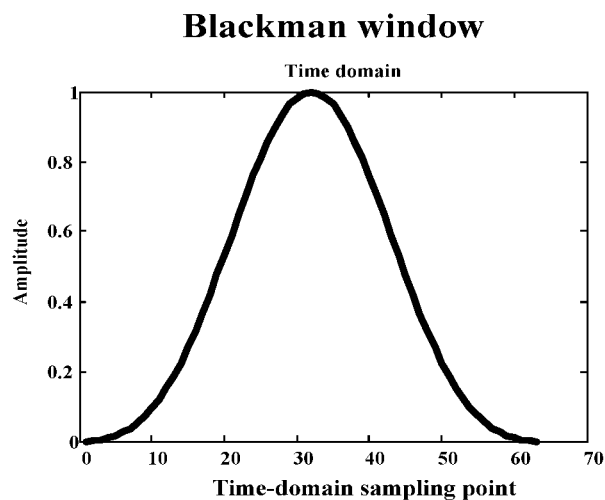
FIG. 31(a) is a diagram of a Blackman envelope waveform in the time domain according to a fourth embodiment of the present invention.
FIG. 31(b) is a diagram of a Blackman envelope waveform switched from time domain to frequency domain according to a fourth embodiment of the present invention.
Figure 31:
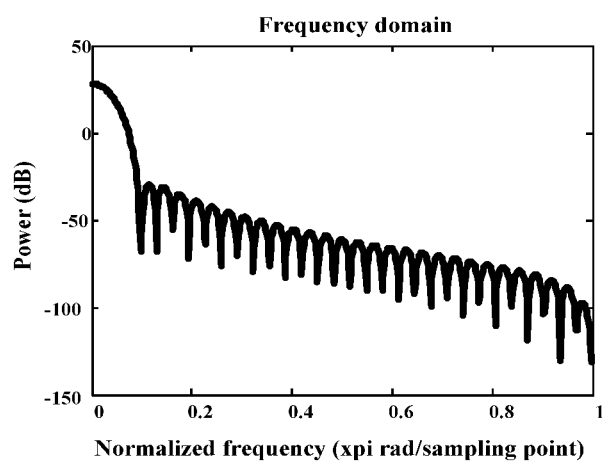
Figure 32:
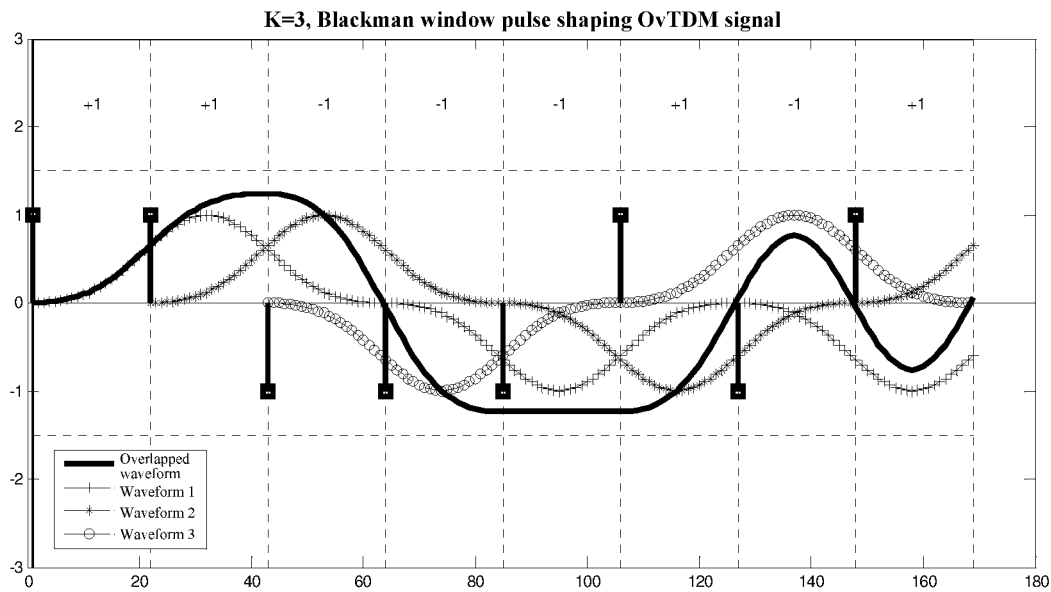
FIG. 32 is a diagram, in the time domain, of modulated envelope waveforms and a complex modulated envelope waveform that are obtained after modulation is performed by using a Blackman envelope waveform as an initial envelope waveform in an OvHDM system according to a fourth embodiment of the present invention.
Figure 33:
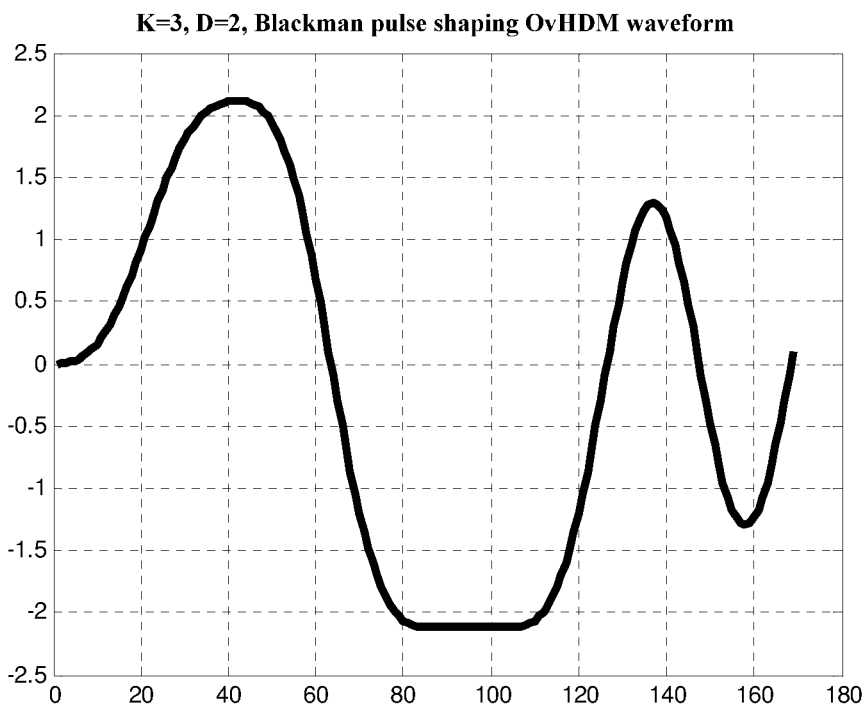
FIG. 33 is a diagram, in the time domain, of a time-frequency complex modulated envelope waveform obtained after modulation is performed by using a Blackman envelope waveform as an initial envelope waveform in an OvHDM system according to a fourth embodiment of the present invention.

Referring to FIG. 31, FIG. 31(a) is a Diagram of the Envelope Waveform of the Blackman window function in the time domain when a window length is 63, and FIG. 31(b) is the envelope waveform of a normalized Blackman window function in the frequency domain. It can be learned from the figure that the envelope waveform of the Blackman window function starts from 0 in the time domain, and has side lobe attenuation in the frequency domain that is close to 70 dB. Therefore, the envelope waveform of the Blackman window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 32, dashed lines in different patterns represent several modulated envelope waveforms in the time domain, and a solid line represents a complex modulated envelope waveform. FIG. 33 is a diagram of a time-frequency complex modulated envelope waveform finally obtained after modulation in the OvHDM system.

6. the Initial Envelope Waveform is the Envelope Waveform of a Blackman-Harris Window Function.

Figure 34:
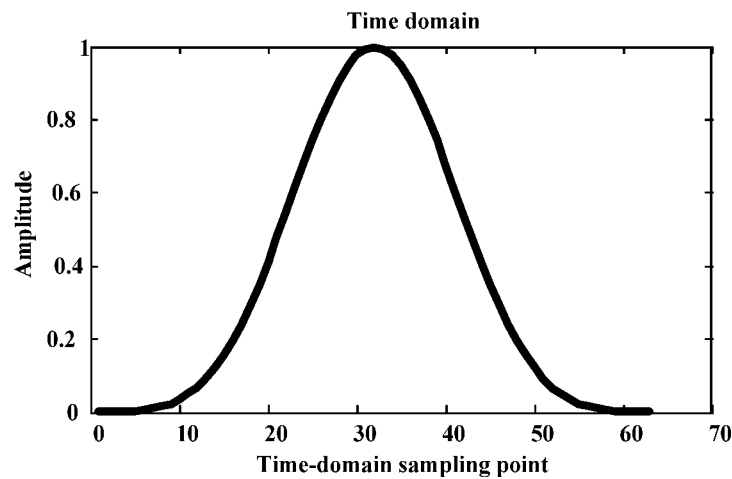
FIG. 34(a) is a diagram of a Blackman-Harris envelope waveform in the time domain according to a fourth embodiment of the present invention.
FIG. 34(b) is a diagram of a Blackman-Harris envelope waveform switched from time domain to frequency domain according to a fourth embodiment of the present invention.
Figure 34:
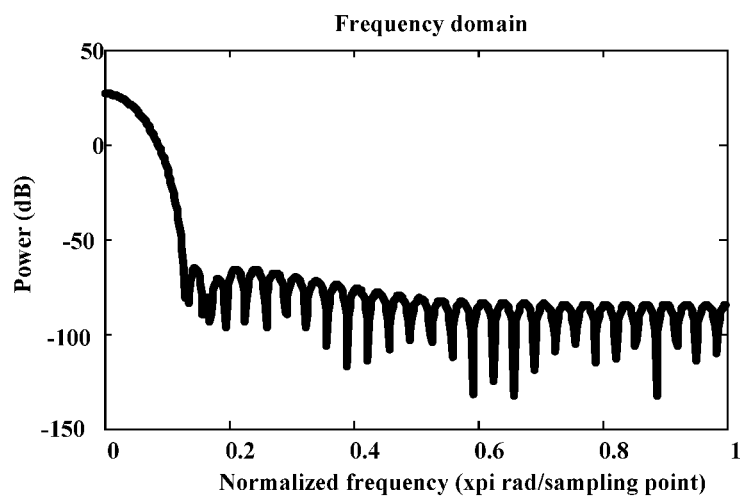
Figure 35:
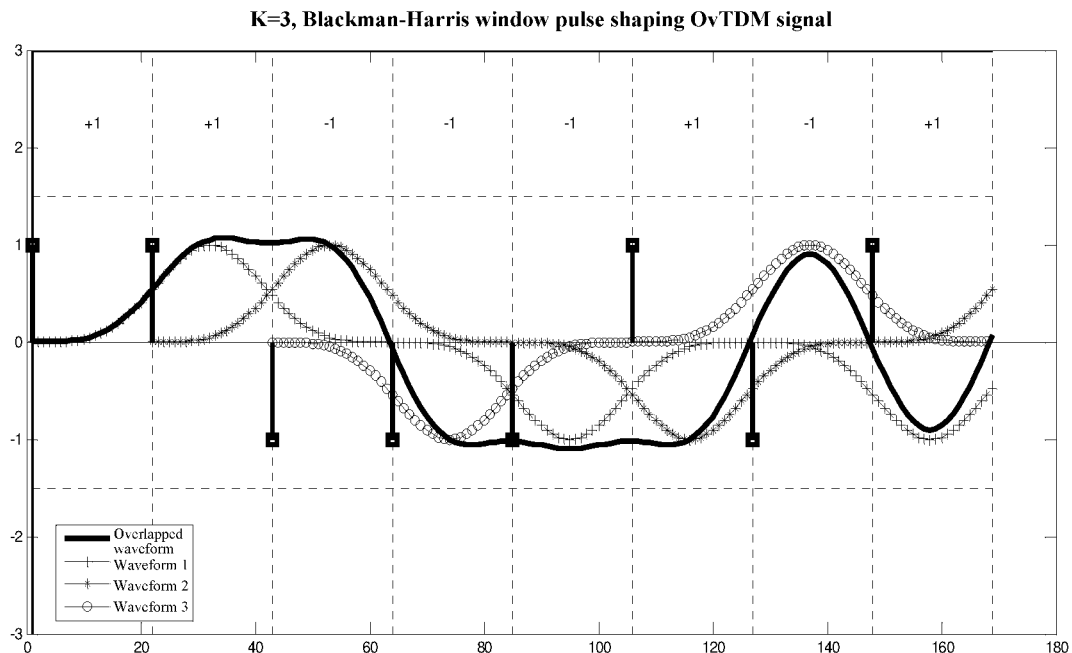
FIG. 35 is a diagram, in the time domain, of modulated envelope waveforms and a complex modulated envelope waveform that are obtained after modulation is performed by using a Blackman-Harris envelope waveform as an initial envelope waveform in an OvHDM system according to a fourth embodiment of the present invention.
Figure 36:
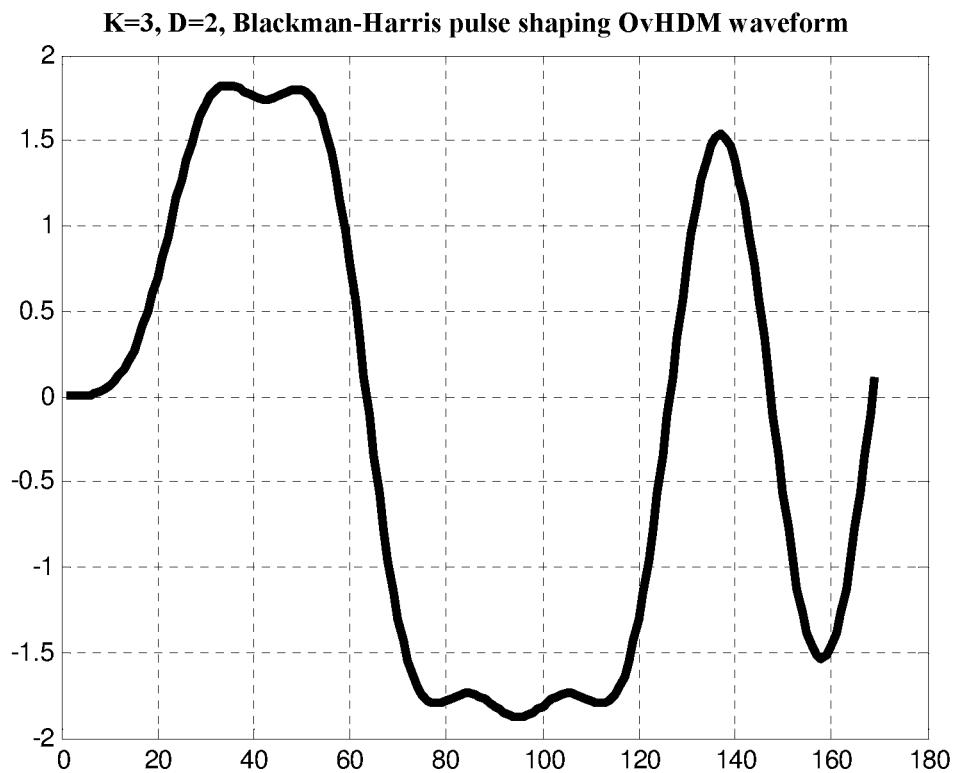
FIG. 36 is a diagram, in the time domain, of a time-frequency complex modulated envelope waveform obtained after modulation is performed by using a Blackman-Harris envelope waveform as an initial envelope waveform in an OvHDM system according to a fourth embodiment of the present invention.

Referring to FIG. 34, FIG. 34(a) is a diagram of the envelope waveform of the Blackman-Harris window function in the time domain when a window length is 63, and FIG. 34(b) is a diagram of the envelope waveform of a normalized Blackman-Harris window function in the frequency domain. It can be learned from the figure that the envelope waveform of the Blackman-Harris window function starts from 0 in the time domain, and has side lobe attenuation in the frequency domain that is close to 80 dB. Therefore, the envelope waveform of the Blackman-Harris window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 35, dashed lines in different patterns represent several modulated envelope waveforms in the time domain, and a solid line represents a complex modulated envelope waveform. FIG. 36 is a diagram of a time-frequency complex modulated envelope waveform finally obtained after modulation in the OvHDM system.

7. the Initial Envelope Waveform is the Envelope Waveform of a Gaussian Window Function.

Figure 37:
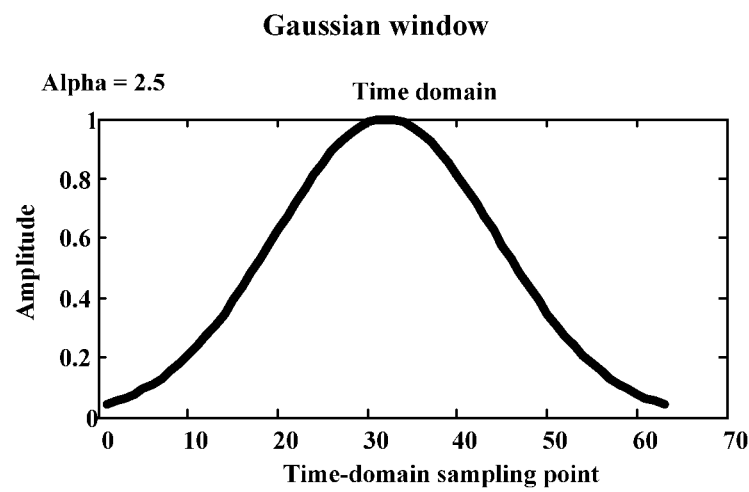
FIG. 37(a) is a diagram of a Gaussian envelope waveform in the time domain according to a fourth embodiment of the present invention.
FIG. 37(b) is a diagram of a Gaussian envelope waveform switched from time domain to frequency domain according to a fourth embodiment of the present invention.
Figure 37:
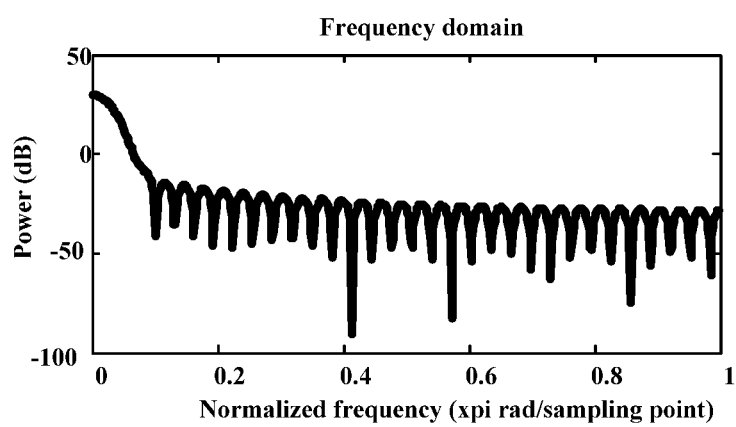
Figure 38:
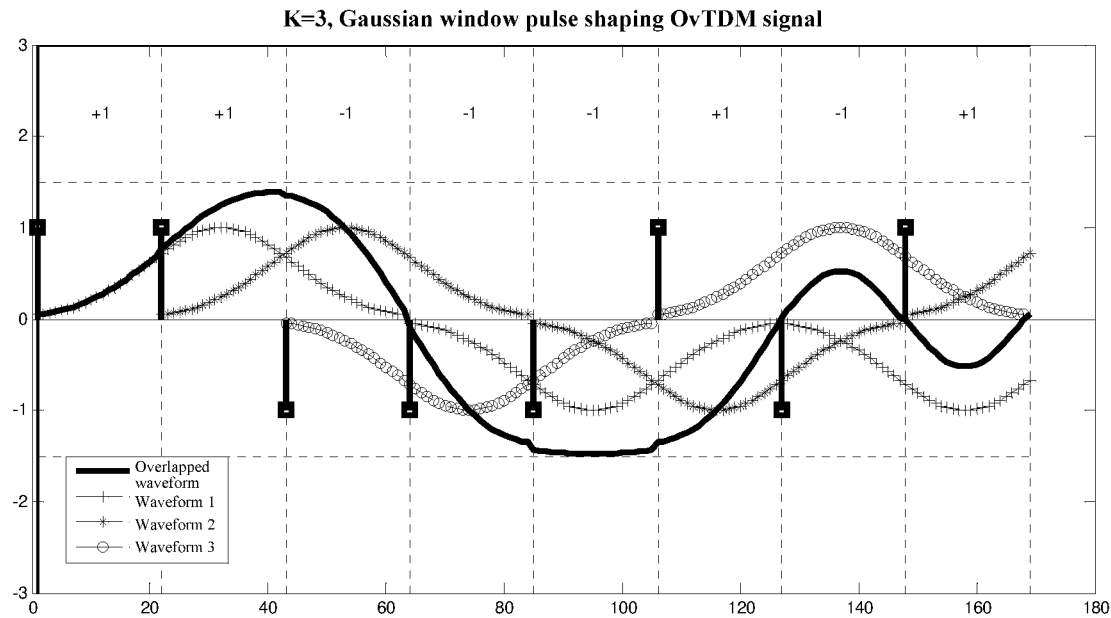
FIG. 38 is a diagram, in the time domain, of modulated envelope waveforms and a complex modulated envelope waveform that are obtained after modulation is performed by using a Gaussian envelope waveform as an initial envelope waveform in an OvHDM system according to a fourth embodiment of the present invention.
Figure 39:
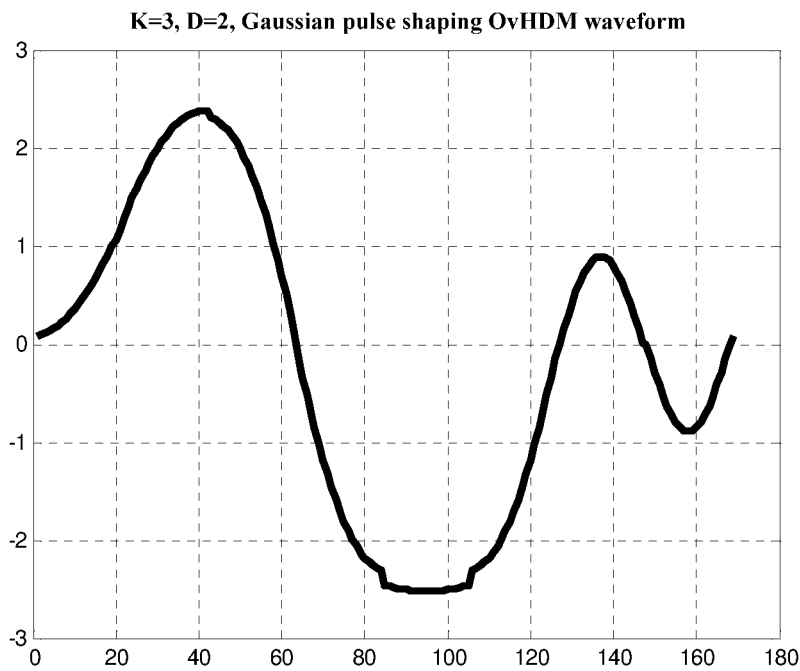
FIG. 39 is a diagram, in the time domain, of a time-frequency complex modulated envelope waveform obtained after modulation is performed by using a Gaussian envelope waveform as an initial envelope waveform in an OvHDM system according to a fourth embodiment of the present invention.

Referring to FIG. 37, FIG. 37(a) is a diagram of the envelope waveform of the Gaussian window function in the time domain when a window length is 63 and a parameter is Alpha=2.5, and FIG. 37(b) is a diagram of the envelope waveform of a normalized Gaussian window function in the frequency domain. It can be learned from the figure that the envelope waveform of the Gaussian window function starts from approximately 0 in the time domain, and has side lobe attenuation in the frequency domain that is close to 50 dB. Therefore, the envelope waveform of the Gaussian window function starts from approximately 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 38, dashed lines in different patterns represent several modulated envelope waveforms in the time domain, and a solid line represents a complex modulated envelope waveform. FIG. 39 is a diagram of a time-frequency complex modulated envelope waveform finally obtained after modulation in the OvHDM system.

8. the Initial Envelope Waveform is the Envelope Waveform of a Hamming Window Function.

Figure 40:
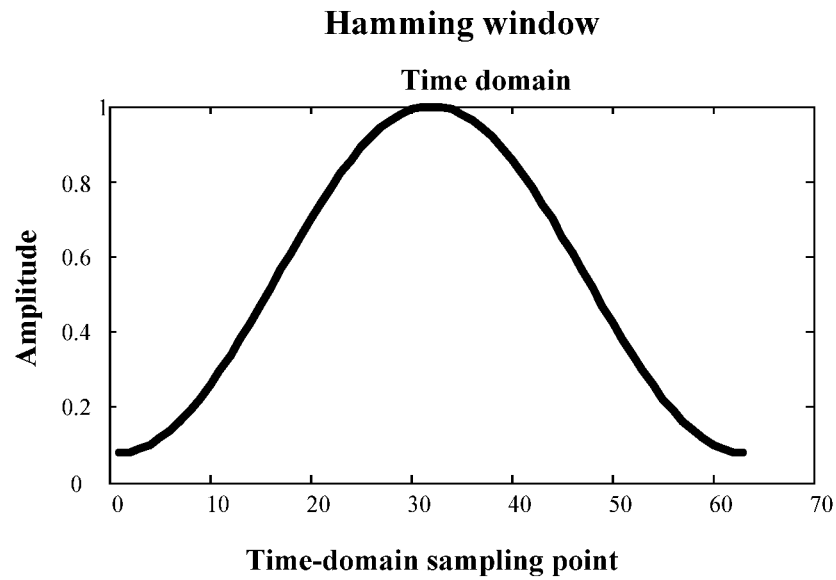
FIG. 40(a) is a diagram of a Hamming envelope waveform in the time domain according to a fourth embodiment of the present invention.
FIG. 40(b) is a diagram of a Hamming envelope waveform switched from time domain to frequency domain according to a fourth embodiment of the present invention.
Figure 40:
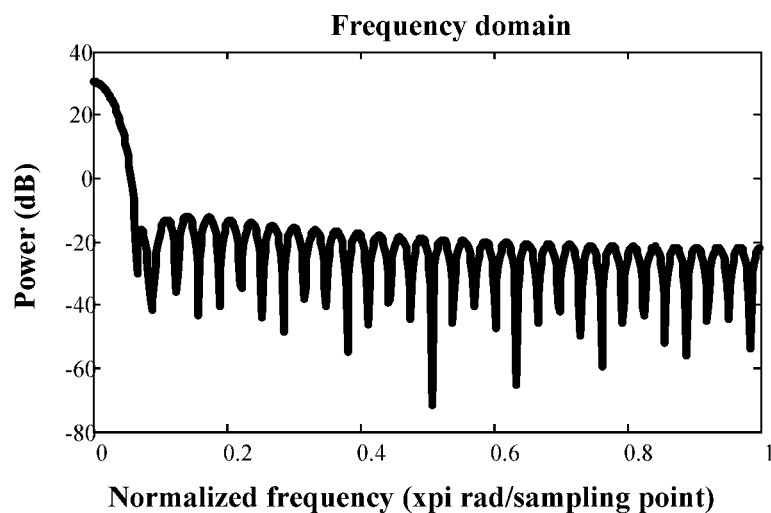
Figure 41:
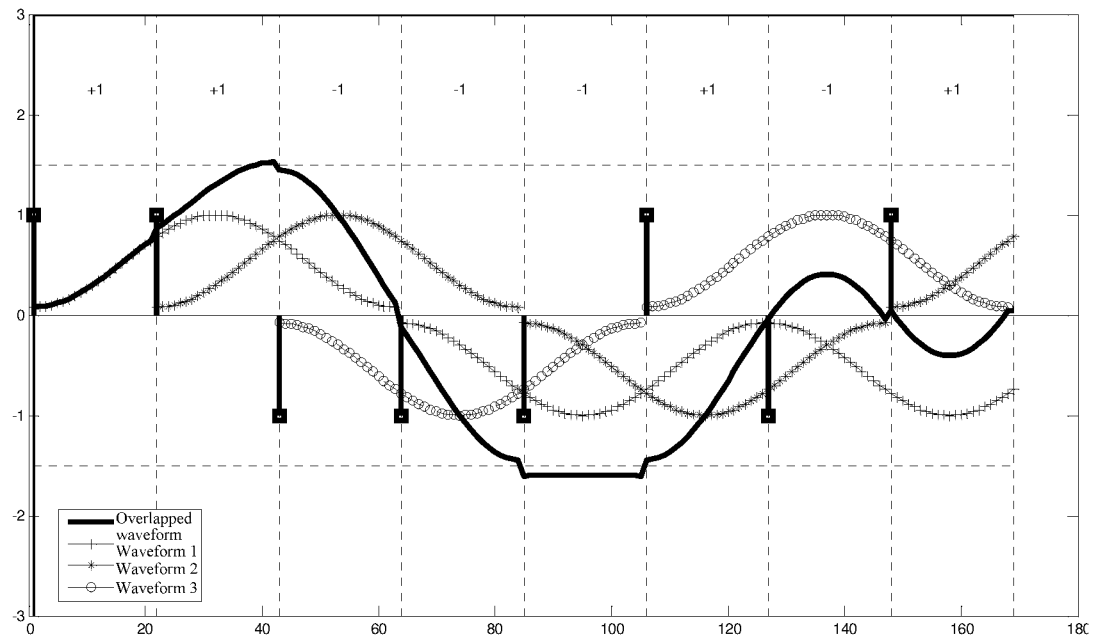
FIG. 41 is a diagram, in the time domain, of modulated envelope waveforms and a complex modulated envelope waveform that are obtained after modulation is performed by using a Hamming envelope waveform as an initial envelope waveform in an OvHDM system according to a fourth embodiment of the present invention.
Figure 42:
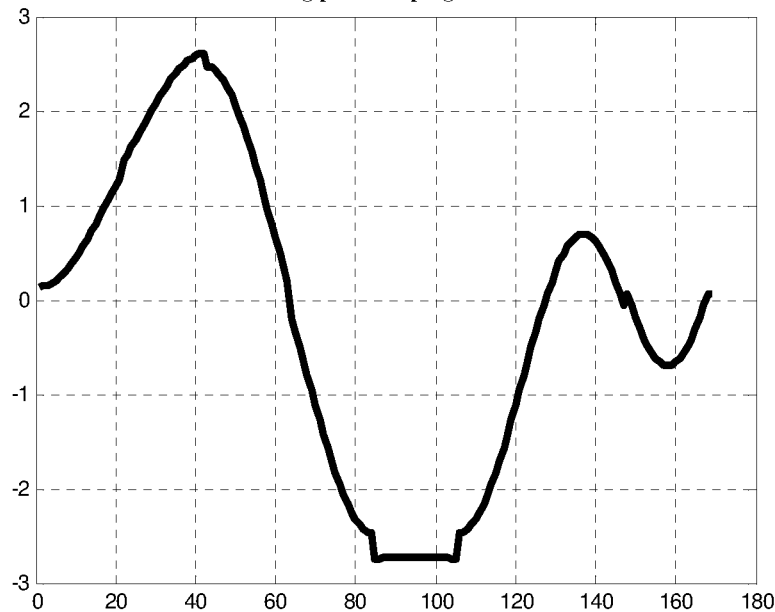
FIG. 42 is a diagram, in the time domain, of a time-frequency complex modulated envelope waveform obtained after modulation is performed by using a Hamming envelope waveform as an initial envelope waveform in an OvHDM system according to a fourth embodiment of the present invention.

Referring to FIG. 40, FIG. 40(a) is a diagram of the envelope waveform of the Hamming window function in the time domain when a window length is 63, and FIG. 40(b) is a diagram of the envelope waveform of a normalized Hamming window function in the frequency domain. It can be learned from the figure that the envelope waveform of the Hamming window function starts from 0 in the time domain, and has side lobe attenuation in the frequency domain that is close to 50 dB. Therefore, the envelope waveform of the Hamming window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 41, dashed lines in different patterns represent several modulated envelope waveforms in the time domain, and a solid line represents a complex modulated envelope waveform. FIG. 42 is a diagram of a time-frequency complex modulated envelope waveform finally obtained after modulation in the OvHDM system.

9. the Initial Envelope Waveform is the Envelope Waveform of a Hann Window Function.

Figure 43:
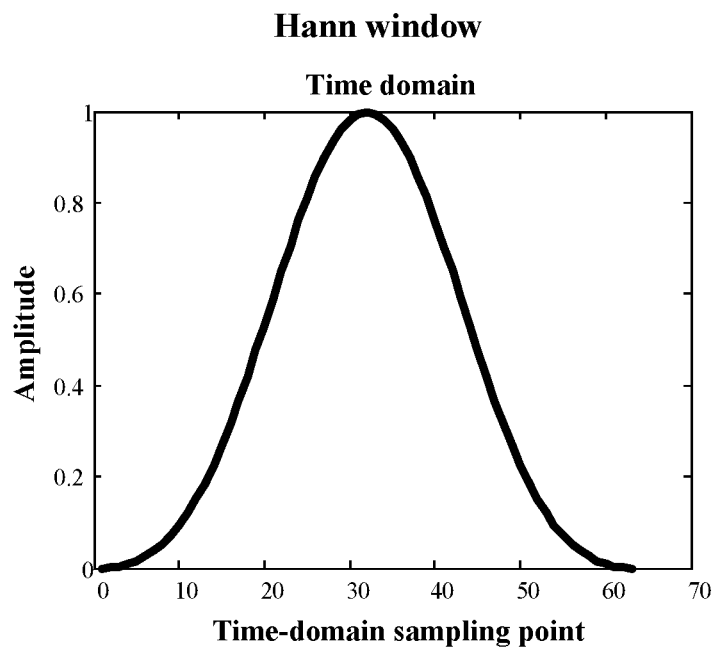
FIG. 43(a) is a diagram of a Hann envelope waveform in the time domain according to a fourth embodiment of the present invention.
FIG. 43(b) is a diagram of a Hann envelope waveform switched from time domain to frequency domain according to a fourth embodiment of the present invention.
Figure 43:
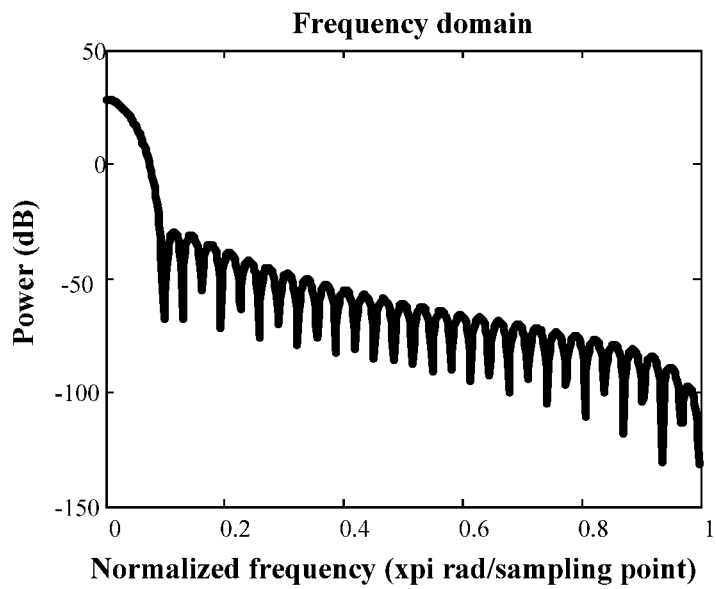
Figure 44:
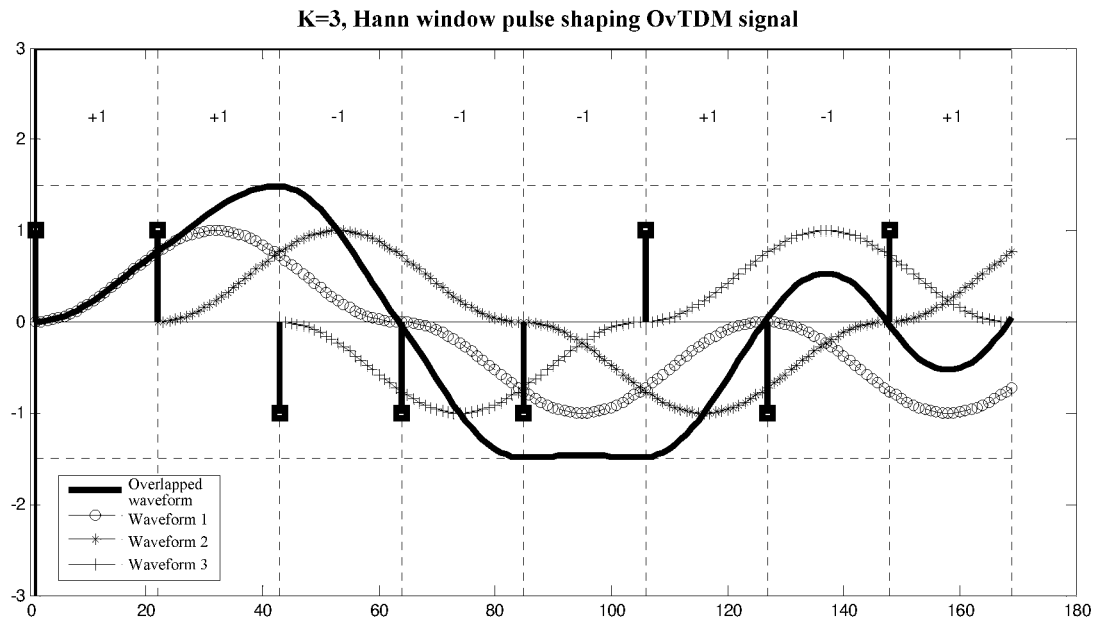
FIG. 44 is a diagram, in the time domain, of modulated envelope waveforms and a complex modulated envelope waveform that are obtained after modulation is performed by using a Hann envelope waveform as an initial envelope waveform in an OvHDM system according to a fourth embodiment of the present invention.
Figure 45:
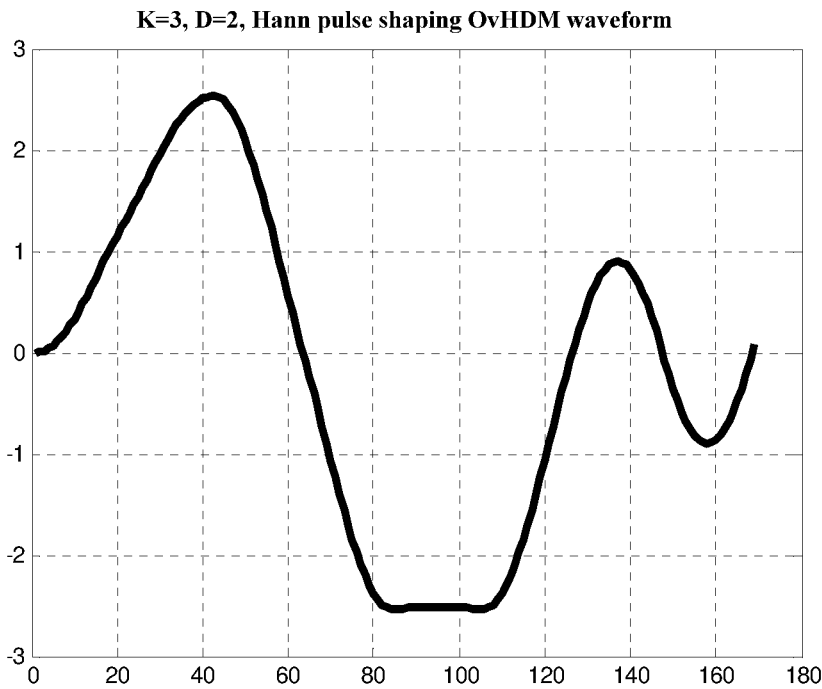
FIG. 45 is a diagram, in the time domain, of a time-frequency complex modulated envelope waveform obtained after modulation is performed by using a Hann envelope waveform as an initial envelope waveform in an OvHDM system according to a fourth embodiment of the present invention.

Referring to FIG. 43, FIG. 43(a) is a diagram of the envelope waveform of the Hann window function in the time domain when a window length is 63, and FIG. 43(b) is a diagram of the envelope waveform of a normalized Hann window function in the frequency domain. It can be learned from the figure that the envelope waveform of the Hann window function starts from 0 in the time domain, and has side lobe attenuation in the frequency domain that is close to 80 dB. Therefore, the envelope waveform of the Hann window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 44, dashed lines in different patterns represent several modulated envelope waveforms in the time domain, and a solid line represents a complex modulated envelope waveform. FIG. 45 is a diagram of a time-frequency complex modulated envelope waveform finally obtained after modulation in the OvHDM system.

10. the Initial Envelope Waveform is the Envelope Waveform of a Kaiser Window Function.

Figure 46:
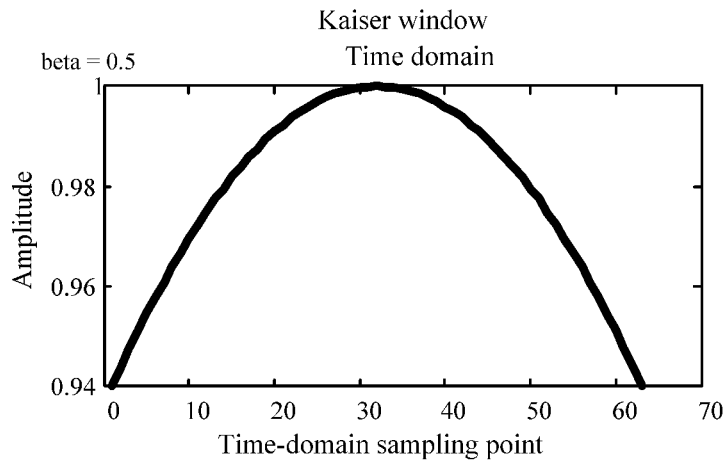
FIG. 46(a), (c), and (e) are waveform diagrams of a Kaiser envelope waveform in the time domain when a beta parameter is respectively 0.5, 2, and 5 according to a fourth embodiment of the present invention.
FIG. 46(b), (d), and (f) are waveform diagrams of a Kaiser envelope waveform switched from time domain to frequency domain when a beta parameter is respectively 0.5, 2, and 5 according to a fourth embodiment of the present invention.
Figure 46:
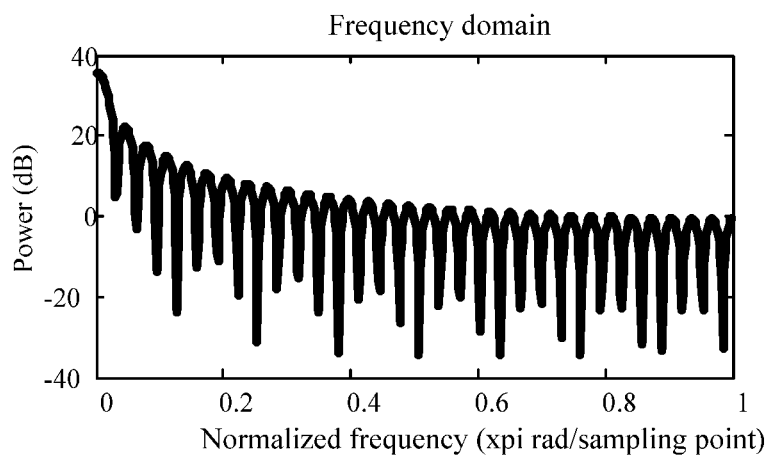
Figure 46:
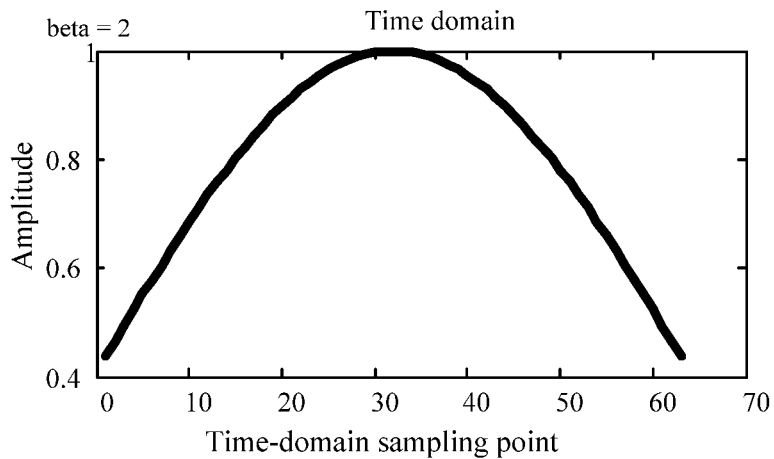
Figure 46:
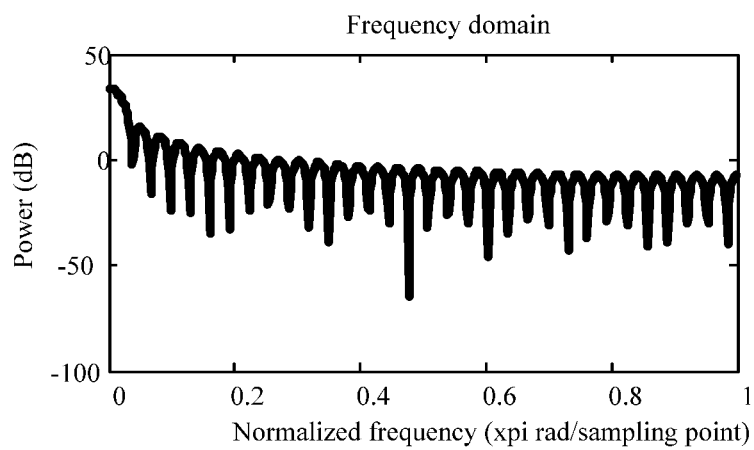
Figure 46:
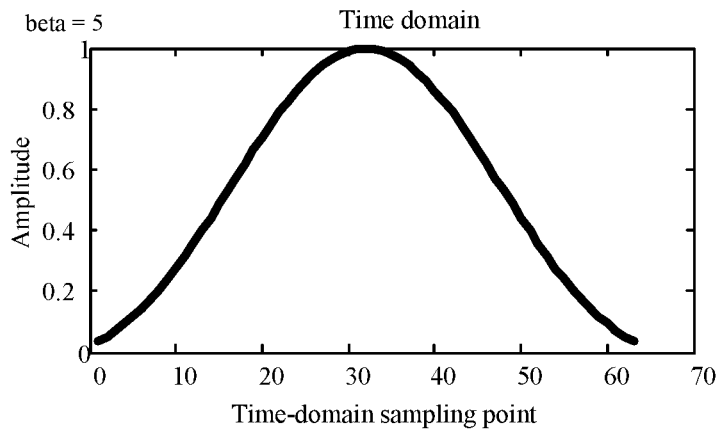
Figure 46:
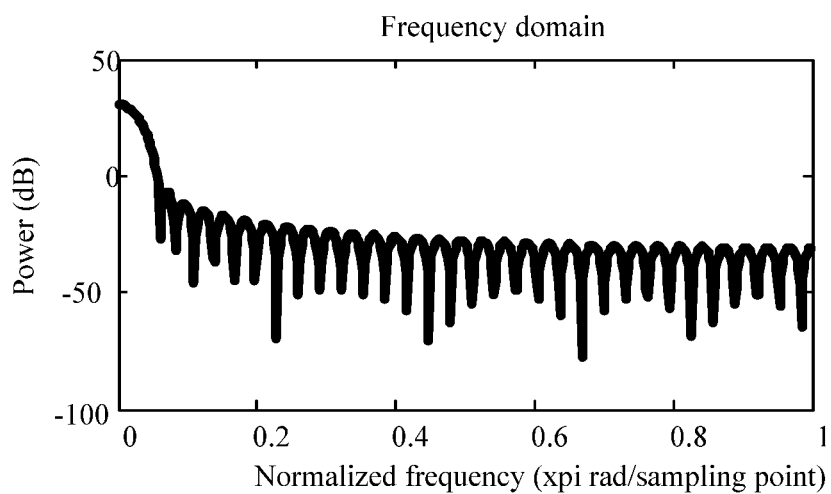
Figure 47A:
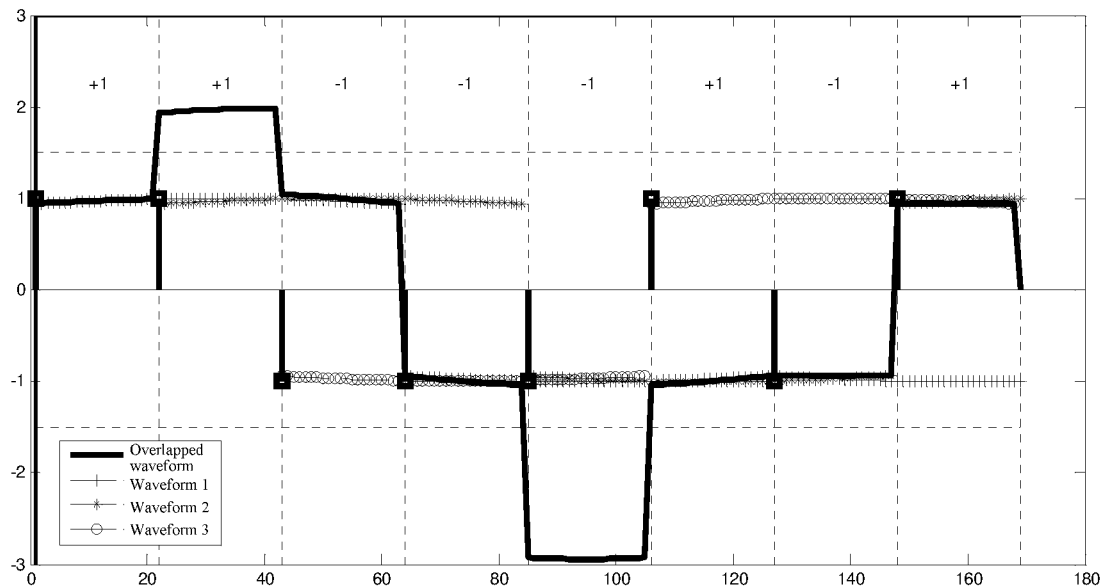
FIG. 47(a), (b), and (c) are waveform diagrams, in the time domain, of modulated envelope waveforms and complex modulated envelope waveforms that are obtained after modulation is performed by using a Kaiser envelope waveform as an initial envelope waveform when a beta parameter is respectively 0.5, 2, and 5 in an OvHDM system according to a fourth embodiment of the present invention.
Figure 47B:
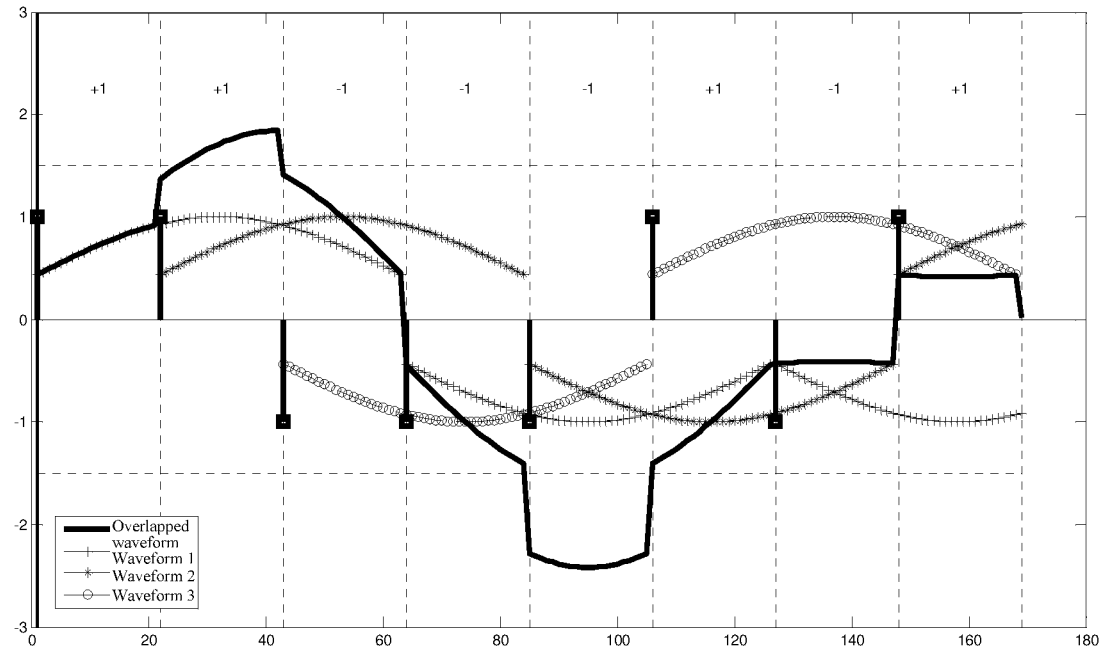
Figure 47C:
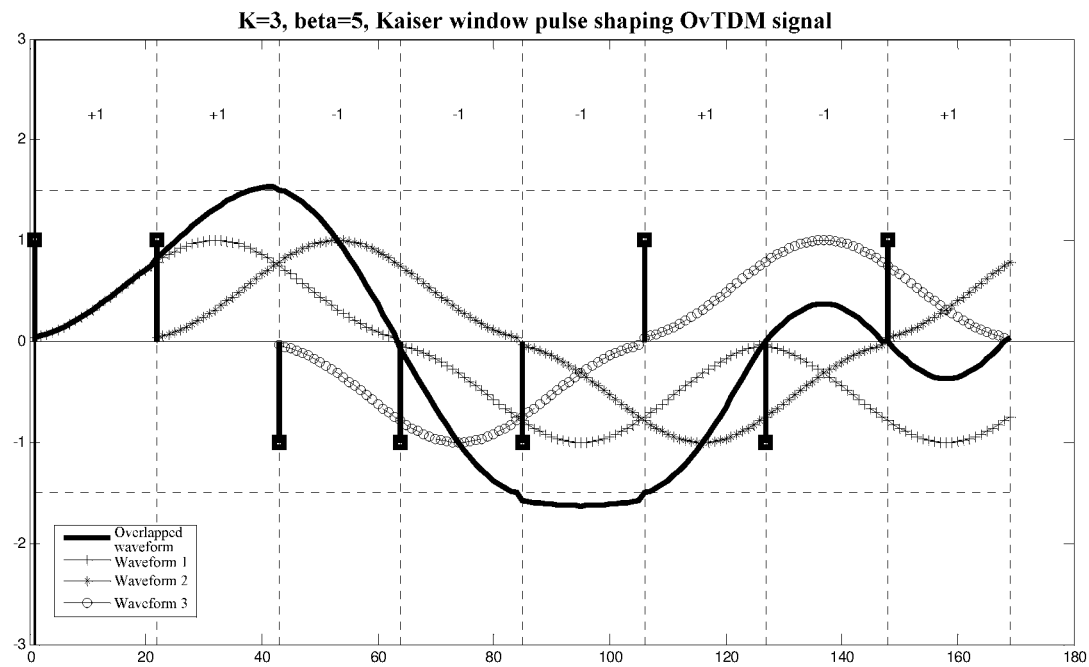
Figure 48A:
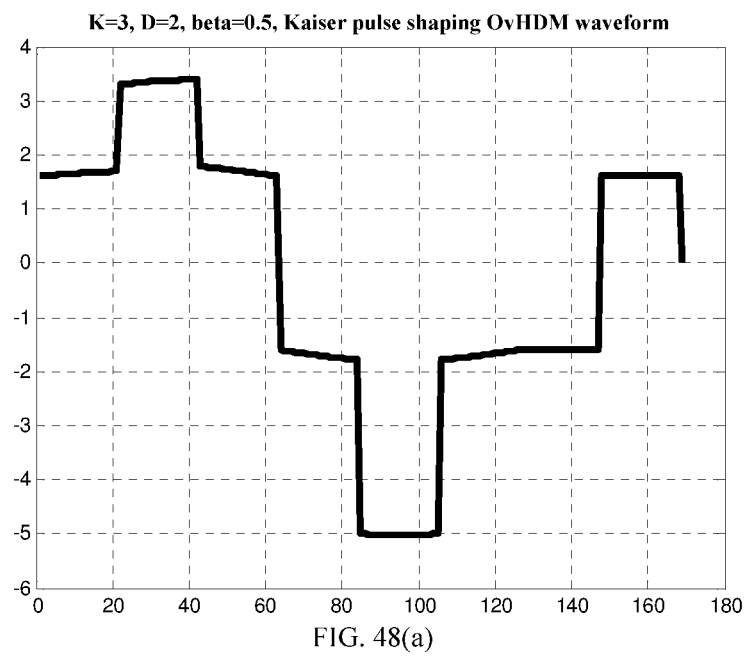
FIG. 48(a), (b), and (c) are waveform diagrams, in the time domain, of time-frequency complex modulated envelope waveforms obtained after modulation is performed by using a Kaiser envelope waveform as an initial envelope waveform when a beta parameter is respectively 0.5, 2, and 5 in an OvHDM system according to a fourth embodiment of the present invention.
Figure 48B:
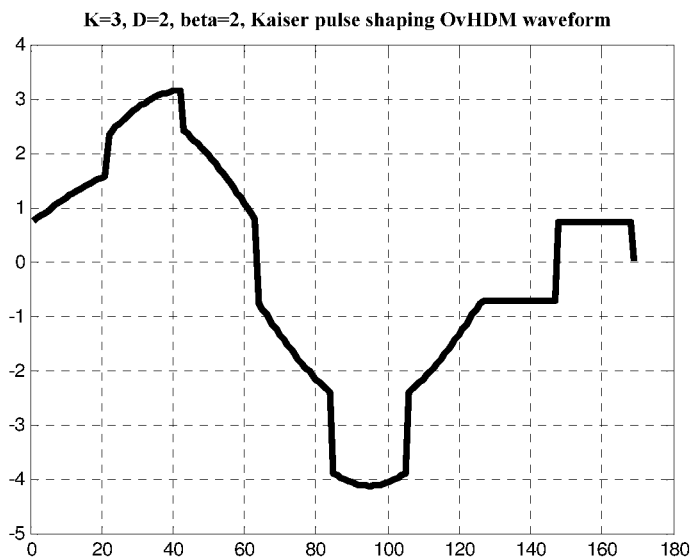
Figure 48C:
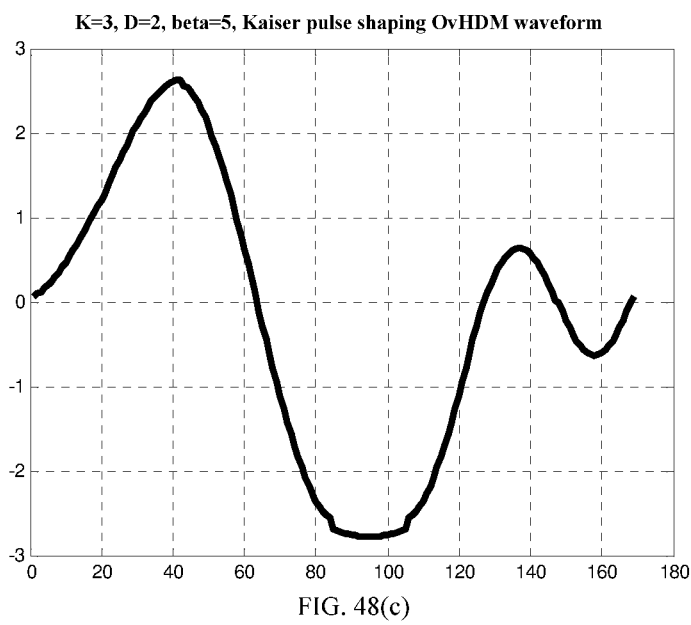

Referring to FIG. 46, FIG. 46(a) is a diagram of the envelope waveform of the Kaiser window function in the time domain when a window length is 63, and a beta parameter is 0.5; FIG. 46(b) is a diagram of the envelope waveform of a normalized Kaiser window function in the frequency domain; FIG. 46(c) is a diagram of the envelope waveform of the Kaiser window function in the time domain when a window length is 63, and a beta parameter is 2; FIG. 46(d) is a diagram of the envelope waveform of the normalized Kaiser window function in the frequency domain; FIG. 46(e) is a diagram of the envelope waveform of the Kaiser window function in the time domain when a window length is 63, and a beta parameter is 5; and FIG. 46(f) is a diagram of the envelope waveform of the normalized Kaiser window function in the frequency domain. It can be learned from the figure that as the beta parameter increases, a start point of the waveform in the time domain gradually approaches 0, the waveform becomes more smooth, and side lobe attenuation of the waveform in the frequency domain is faster. Therefore, better performance is achieved after superimposition. When beta=0.5, the envelope waveform of the Kaiser window function starts from 0.94 in the time domain, the waveform obtained after superimposition in OvHDM is more smooth than a rectangular wave, has side lobe attenuation in the frequency domain which is faster than that of the rectangular wave; and has relatively wide bandwidth in the frequency domain. Therefore, spectral efficiency of the waveform obtained after superimposition is relatively high, and a transmit power required for sending a signal is relatively low. In addition, a beta value of the Kaiser window function may be designed based on system performance indicators. As beta increases, the waveform obtained after superimposition becomes more smooth, a power required for transmitting a signal in an actual system becomes smaller, and an encoding/decoding capability is improved. A design is more flexible than that of a the rectangular wave. FIG. 47(a), (b), and (c) show modulated envelope waveforms and complex modulated envelope waveforms that are obtained after the Kaiser envelope waveform is modulated when beta is respectively 0.5, 2, and 5. Dashed lines in different patterns represent several modulated envelope waveforms in the time domain, and a solid line represents the complex modulated envelope waveform. FIG. 48(a), (b), and (c) are waveform diagrams, in the time domain, of a time-frequency complex modulated envelope waveform finally obtained after the Kaiser envelope waveform is modulated in the OvHDM system when beta is respectively 0.5, 2, and 5.

11. the Initial Envelope Waveform is the Envelope Waveform of a Nuttall Window Function.

Figure 49:
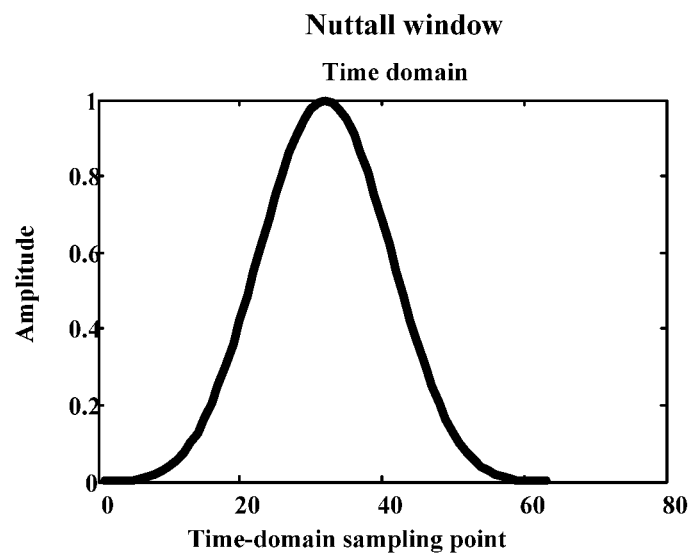
FIG. 49(a) is a diagram of a Nuttall envelope waveform in the time domain according to a fourth embodiment of the present invention.
FIG. 49(b) is a diagram of a Nuttall envelope waveform switched from time domain to frequency domain according to a fourth embodiment of the present invention.
Figure 49:
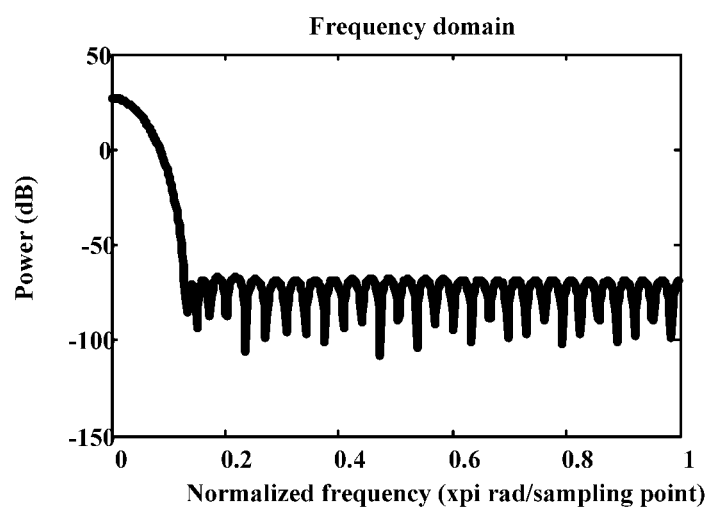
Figure 50:
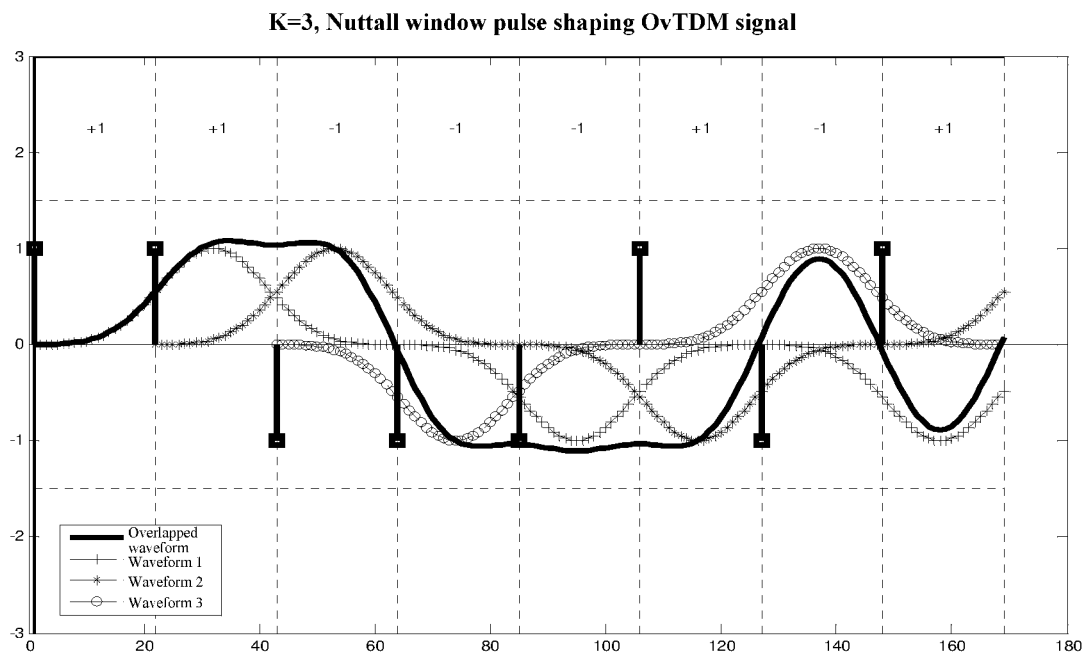
FIG. 50 is a diagram, in the time domain, of modulated envelope waveforms and a complex modulated envelope waveform that are obtained after modulation is performed by using a Nuttall envelope waveform as an initial envelope waveform in an OvHDM system according to a fourth embodiment of the present invention.
Figure 51:
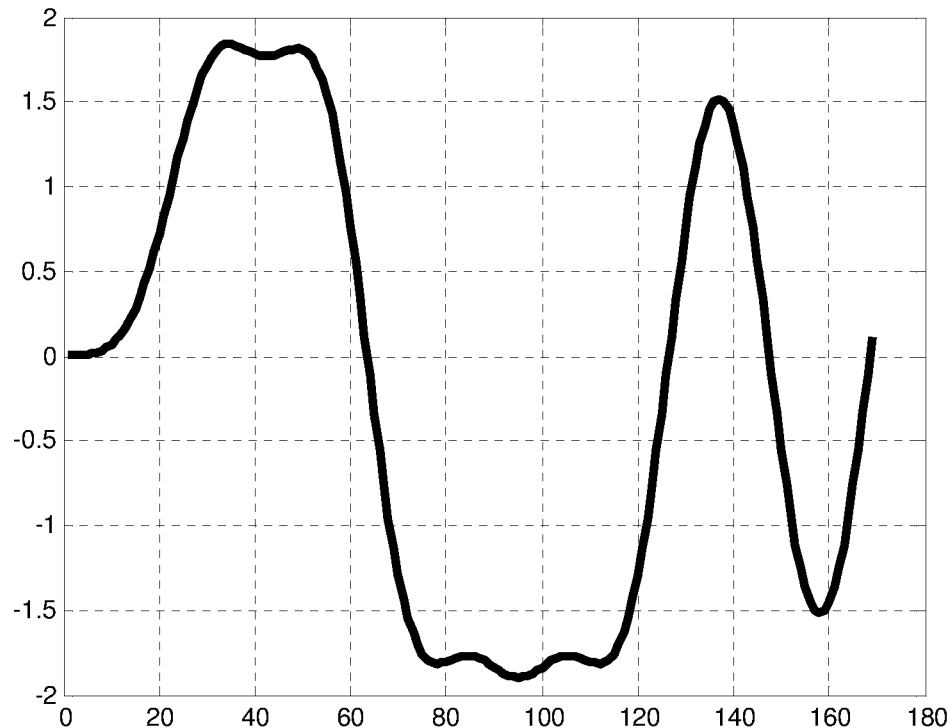
FIG. 51 is a diagram, in the time domain, of a time-frequency complex modulated envelope waveform obtained after modulation is performed by using a Nuttall envelope waveform as an initial envelope waveform in an OvHDM system according to a fourth embodiment of the present invention.

Referring to FIG. 49, FIG. 49(a) is a diagram of the envelope waveform of the Nuttall window function in the time domain when a window length is 63, and FIG. 49(b) is a diagram of the envelope waveform of a normalized Nuttall window function in the frequency domain. It can be learned from the figure that the envelope waveform of the Nuttall window function starts from 0 in the time domain, and has side lobe attenuation in the frequency domain that is close to 100 dB. Therefore, the envelope waveform of the Nuttall window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 50, dashed lines in different patterns represent several modulated envelope waveforms in the time domain, and a solid line represents a complex modulated envelope waveform. FIG. 51 is a diagram of a time-frequency complex modulated envelope waveform finally obtained after modulation in the OvHDM system.

12. the Initial Envelope Waveform is the Envelope Waveform of a Flat Top Window Function.

Figure 52:
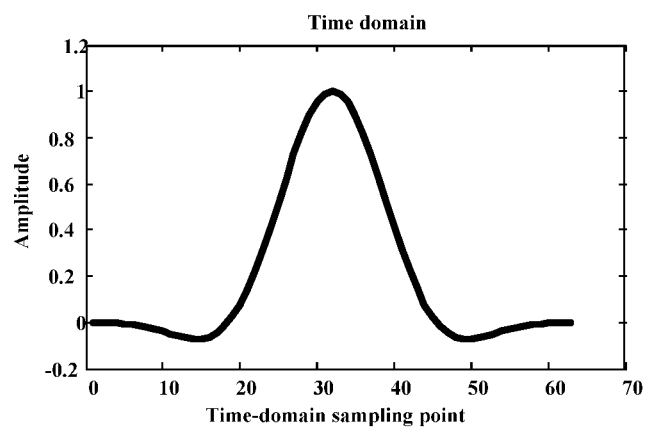
FIG. 52(a) is a diagram of a flat top envelope waveform in the time domain according to a fourth embodiment of the present invention.
FIG. 52(b) is a diagram of a flat top envelope waveform switched from time domain to frequency domain according to a fourth embodiment of the present invention.
Figure 52:
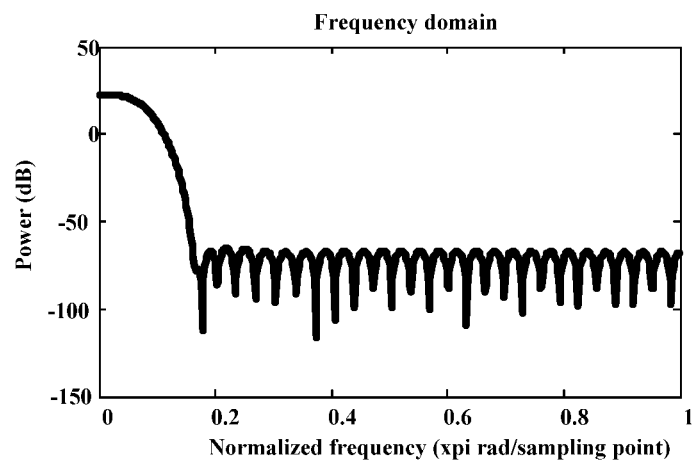
Figure 53:
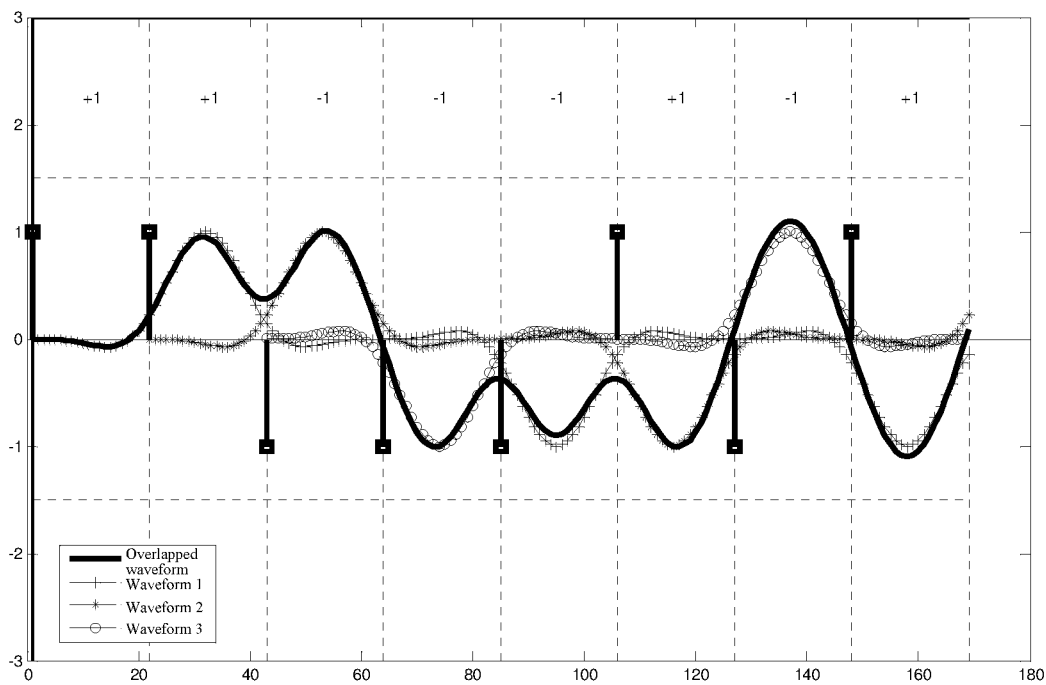
FIG. 53 is a diagram, in the time domain, of modulated envelope waveforms and a complex modulated envelope waveform that are obtained after modulation is performed by using a flat top envelope waveform as an initial envelope waveform in an OvHDM system according to a fourth embodiment of the present invention.
Figure 54:
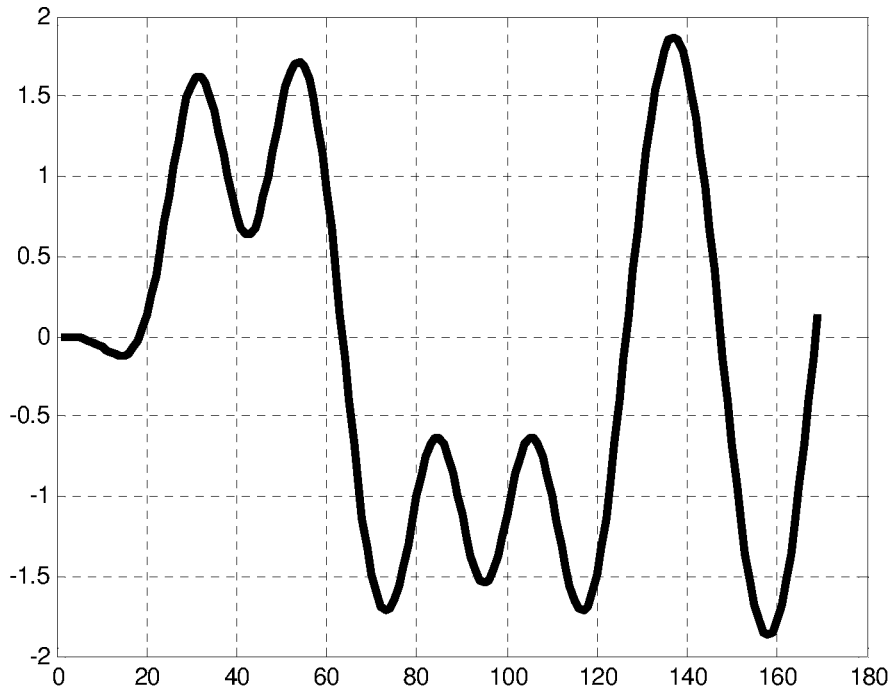
FIG. 54 is a diagram, in the time domain, of a time-frequency complex modulated envelope waveform obtained after modulation is performed by using a flat top envelope waveform as an initial envelope waveform in an OvHDM system according to a fourth embodiment of the present invention.

Referring to FIG. 52, FIG. 52(a) is a diagram of the envelope waveform of the Flat Top window function in the time domain when a window length is 63, and FIG. 52(b) is a diagram of the envelope waveform of a normalized Flat Top window function in the frequency domain. It can be learned from the figure that the envelope waveform of the Flat Top window function starts from approximately 0 (−0.0004) in the time domain, and has side lobe attenuation in the frequency domain that is close to 100 dB. Therefore, the envelope waveform of the Flat Top window function starts from approximately 0 (−0.0004) in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 53, dashed lines in different patterns represent several modulated envelope waveforms in the time domain, and a solid line represents a complex modulated envelope waveform. FIG. 54 is a diagram of a time-frequency complex modulated envelope waveform finally obtained after modulation in the OvHDM system.

13. the Initial Envelope Waveform is the Envelope Waveform of a Chebyshev Window Function.

Figure 55:
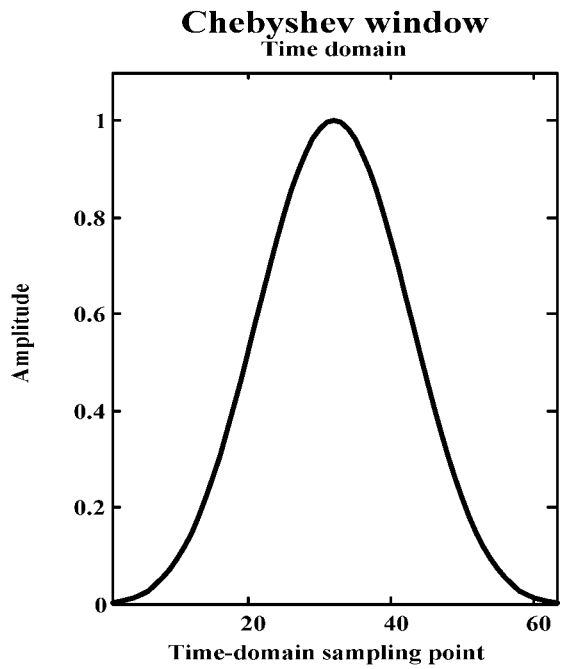
FIG. 55(a) is a diagram of a Chebyshev envelope waveform in the time domain according to a fourth embodiment of the present invention.
FIG. 55(b) is a diagram of a Chebyshev envelope waveform switched from time domain to frequency domain according to a fourth embodiment of the present invention.
Figure 55:
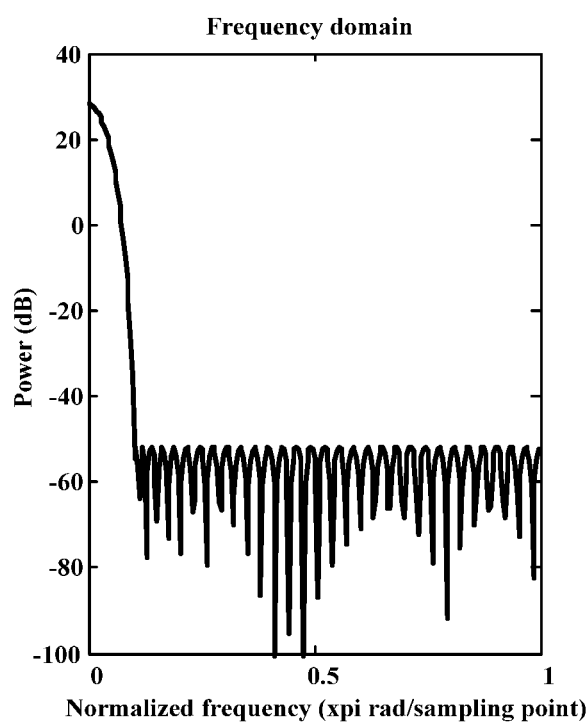
Figure 56:
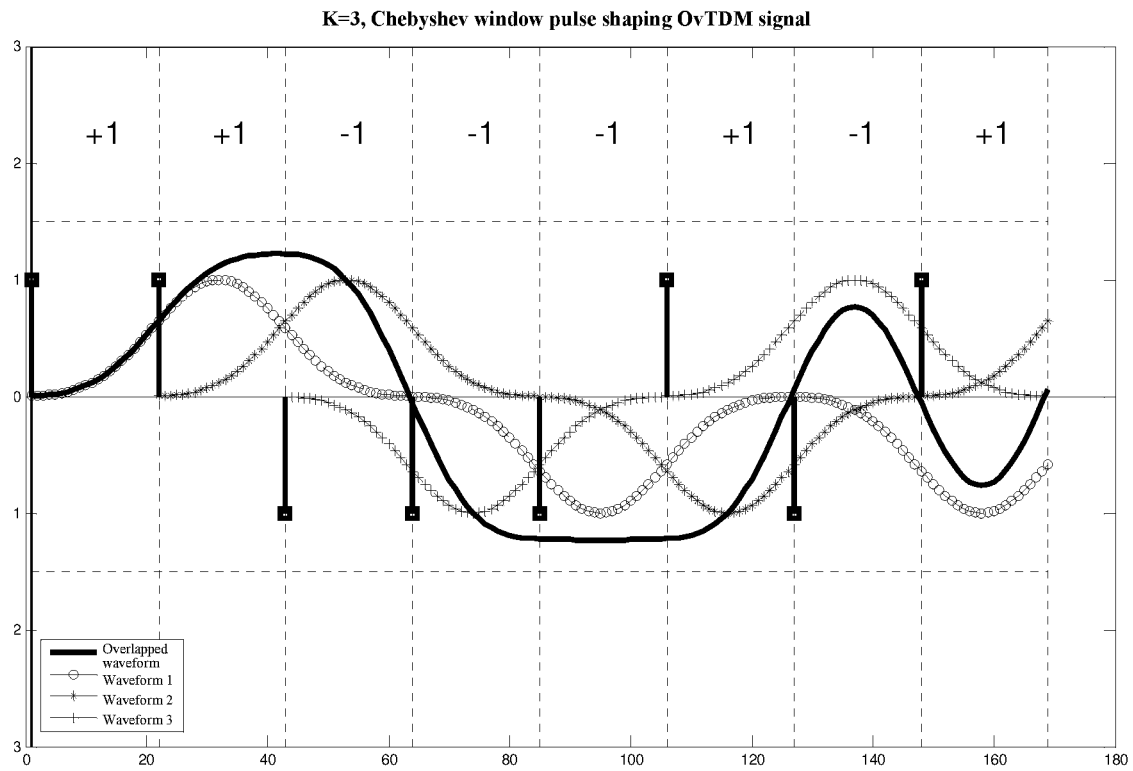
FIG. 56 is a diagram, in the time domain, of modulated envelope waveforms and a complex modulated envelope waveform that are obtained after modulation is performed by using a Chebyshev envelope waveform as an initial envelope waveform in an OvHDM system according to a fourth embodiment of the present invention.
Figure 57:
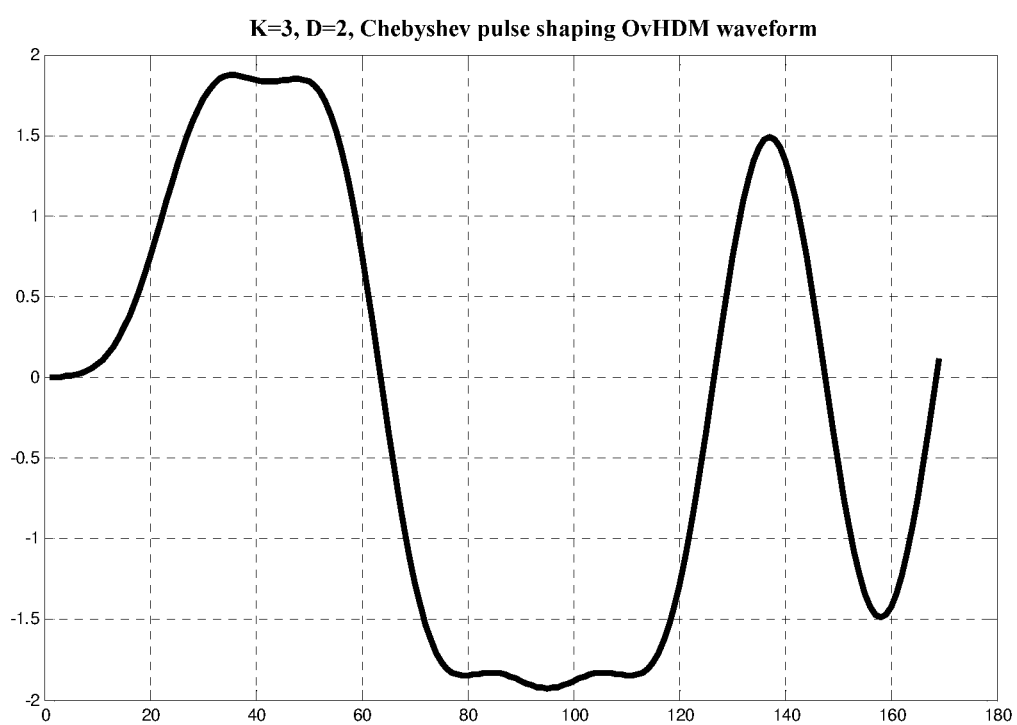
FIG. 57 is a diagram, in the time domain, of a time-frequency complex modulated envelope waveform obtained after modulation is performed by using a Chebyshev envelope waveform as an initial envelope waveform in an OvHDM system according to a fourth embodiment of the present invention.

Referring to FIG. 55, FIG. 55(a) is a diagram of the envelope waveform of the Chebyshev window function in the time domain when a window length is 63, and FIG. 55(b) is a diagram of the envelope waveform of a normalized Chebyshev window function in the frequency domain. It can be learned from the figure that the envelope waveform of the Chebyshev window function starts from approximately 0 in the time domain, and has side lobe attenuation in the frequency domain that is close to 80 dB. Therefore, the envelope waveform of the Chebyshev window function starts from approximately 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 56, dashed lines in different patterns represent several modulated envelope waveforms in the time domain, and a solid line represents a complex modulated envelope waveform. FIG. 57 is a diagram of a time-frequency complex modulated envelope waveform finally obtained after modulation in the OvHDM system.

14. the Initial Envelope Waveform is the Envelope Waveform of a Triangular Window Function.

Figure 58:
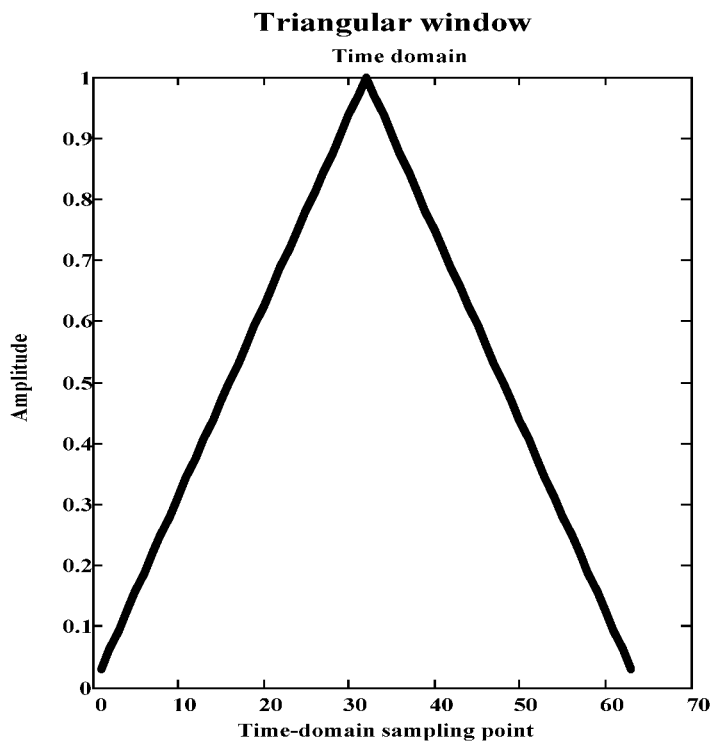
FIG. 58(a) is a diagram of a triangular envelope waveform in the time domain according to a fourth embodiment of the present invention.
FIG. 58(b) is a diagram of a triangular envelope waveform switched from time domain to frequency domain according to a fourth embodiment of the present invention.
Figure 58:
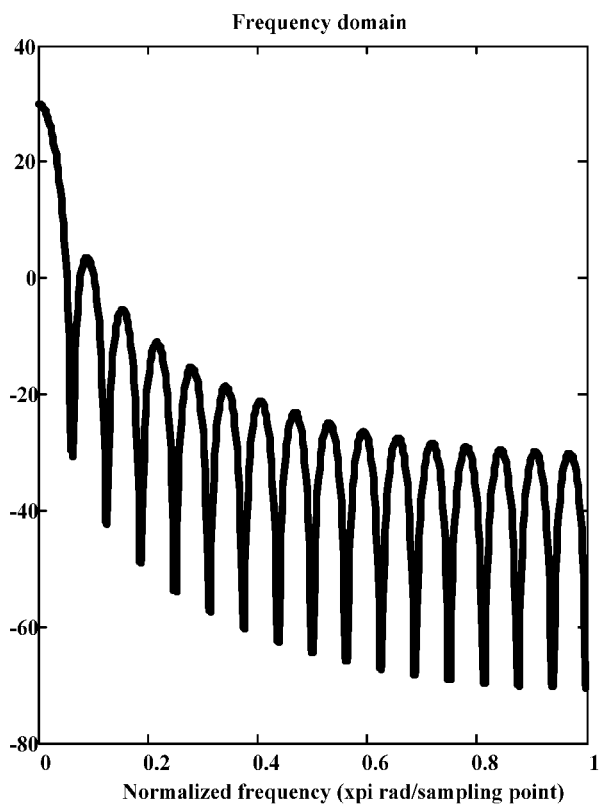
Figure 59:
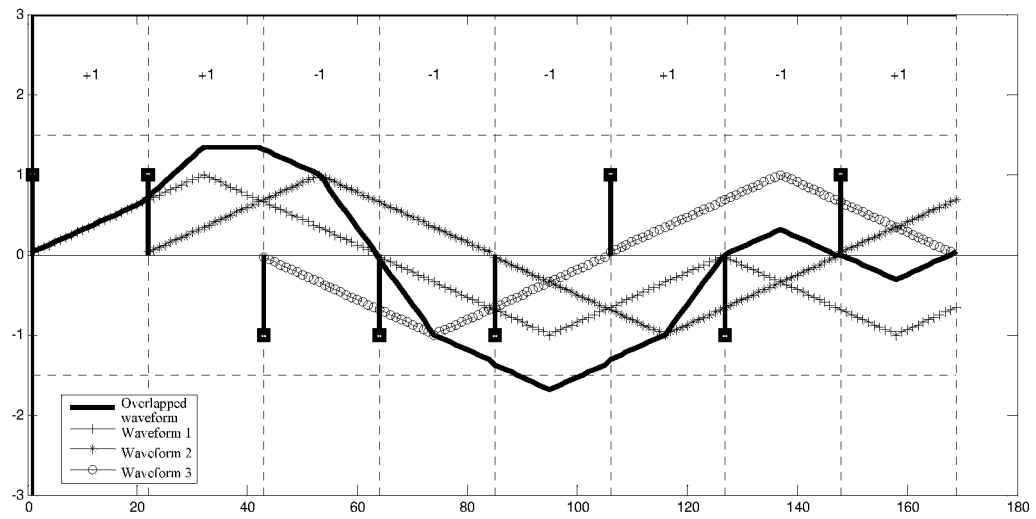
FIG. 59 is a diagram, in the time domain, of modulated envelope waveforms and a complex modulated envelope waveform that are obtained after modulation is performed by using a triangular envelope waveform as an initial envelope waveform in an OvHDM system according to a fourth embodiment of the present invention.
Figure 60:
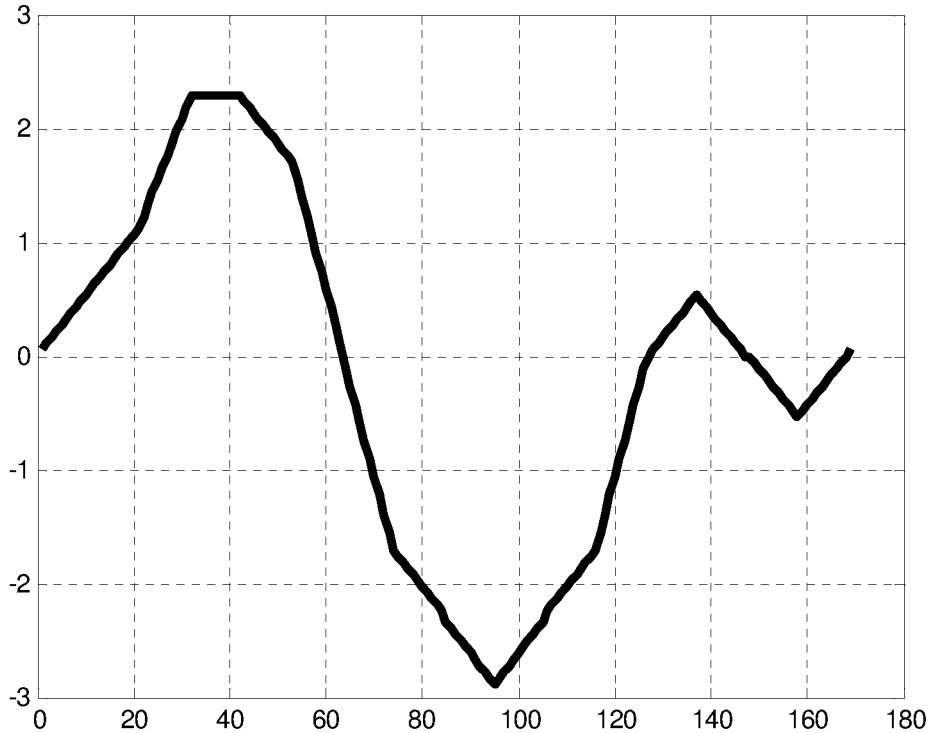
FIG. 60 is a diagram, in the time domain, of a time-frequency complex modulated envelope waveform obtained after modulation is performed by using a triangular envelope waveform as an initial envelope waveform in an OvHDM system according to a fourth embodiment of the present invention.

Referring to FIG. 58, FIG. 58(*a*) is a diagram of the envelope waveform of the Triangular window function in the time domain when a window length is 63, and FIG. 58(*b*) is a diagram of the envelope waveform of a normalized Triangular window function in the frequency domain. It can be learned from the figure that the envelope waveform of the Triangular window function starts from 0 in the time domain, and has side lobe attenuation in the frequency domain that is close to 30 dB. Therefore, the envelope waveform of the Triangular window function starts from 0 in the time domain, the waveform obtained after superimposition is relatively smooth, has relatively fast side lobe attenuation, and has relatively wide bandwidth in the frequency domain. This improves accuracy of a waveform cutting process and an error correction capability of an encoding/decoding process, and reduces a signal transmit power. Therefore, when spectrum efficiency is kept unchanged, a very high transmission rate can be achieved with a relatively low transmit power. In FIG. 59, dashed lines in different patterns represent several modulated envelope waveforms in the time domain, and a solid line represents a complex modulated envelope waveform. FIG. 60 is a diagram of a time-frequency complex modulated envelope waveform finally obtained after modulation in the OvHDM system.

15. the Initial Envelope Waveform is the Envelope Waveform of a Taylor Window Function.

Figure 61:
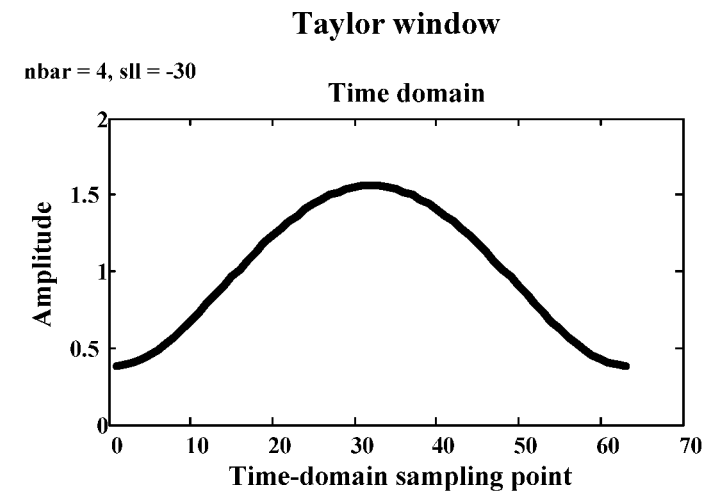
FIG. 61(a), (c), and (e) are a diagram of a Taylor envelope waveform in the time domain when nbar=4 and sll=−30, a diagram of a Taylor envelope waveform in the time domain when nbar=6 and sll=−50, and a diagram of a Taylor envelope waveform in the time domain when nbar=8 and sll=−80 according to a fourth embodiment of the present invention.
FIG. 61(b), (d), and (f) are a diagram of a Taylor envelope waveform switched from time domain to frequency domain when nbar=4 and sll=−30, a diagram of a Taylor envelope waveform switched from time domain to frequency domain when nbar=6 and sll=−50, and a diagram of a Taylor envelope waveform switched from time domain to frequency domain when nbar=8 and sll=−80 according to a fourth embodiment of the present invention.
Figure 61:
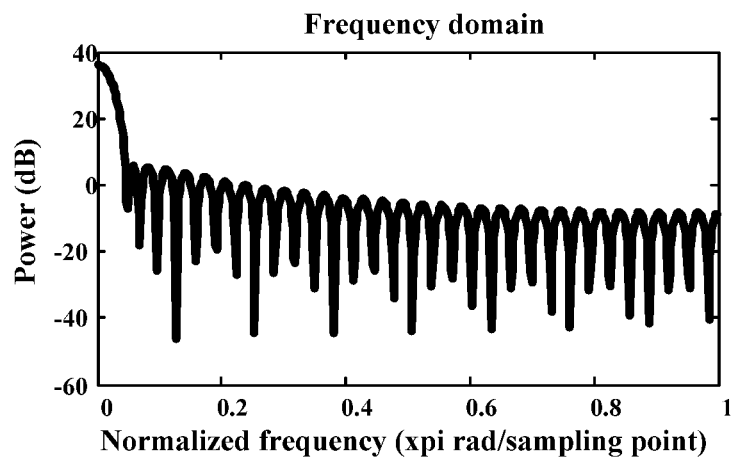
Figure 61:
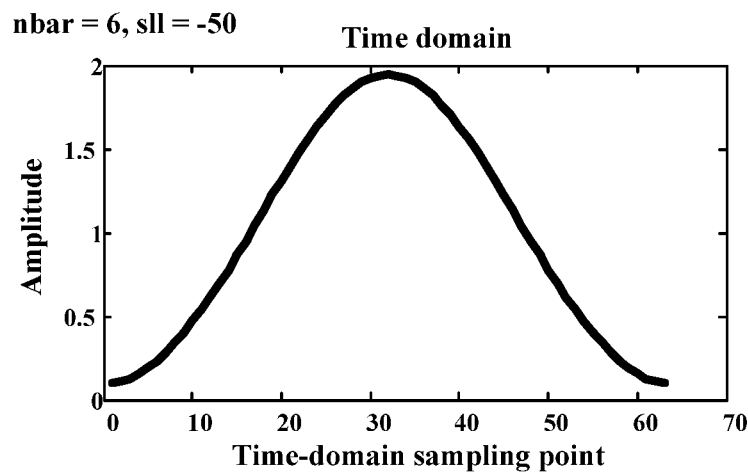
Figure 61:
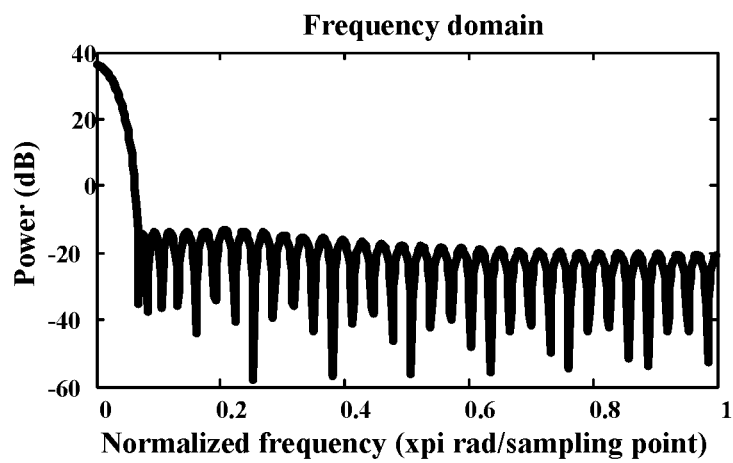
Figure 61:
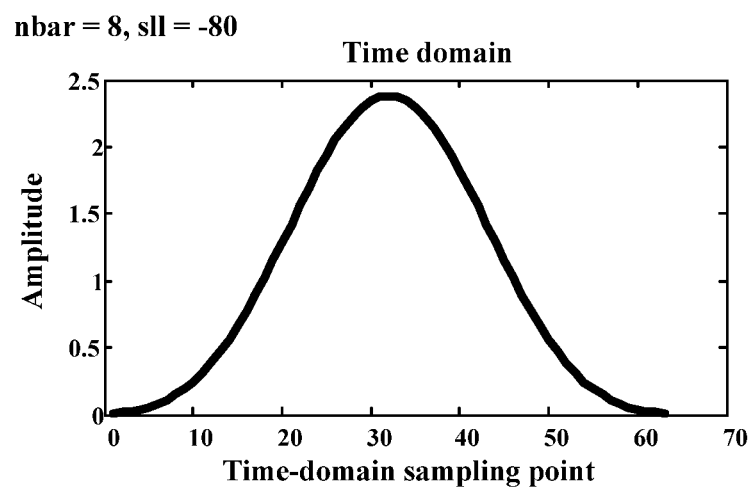
Figure 61:
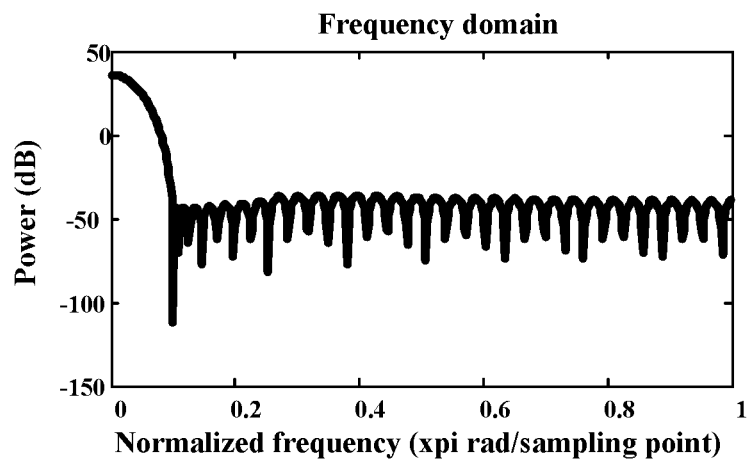
Figure 62A:
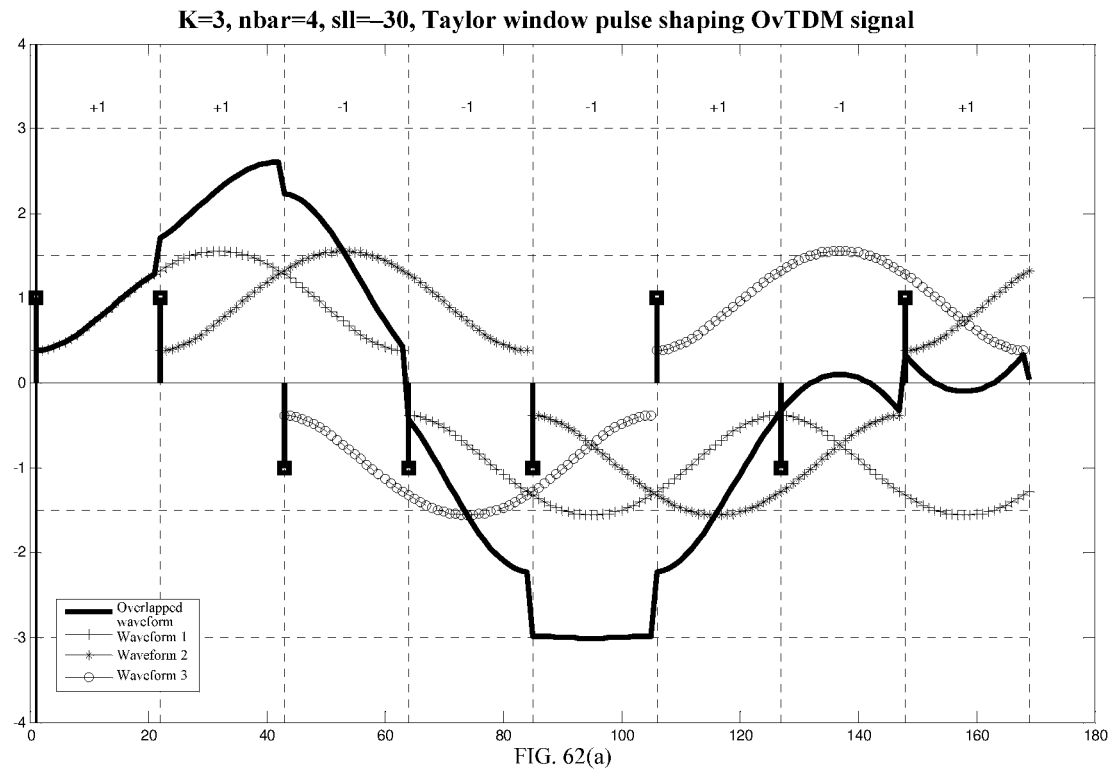
FIG. 62(a), (b), and (c) are waveform diagrams, in the time domain, of modulated envelope waveforms and complex modulated envelope waveforms that are obtained after modulation is performed by using a Taylor envelope waveform with nbar=4 and sll=−30, a Taylor envelope waveform with nbar=6 and sll=−50, and a Taylor envelope waveform with nbar=8 and sll=−80 as initial envelope waveforms in an OvHDM system according to a fourth embodiment of the present invention.
Figure 62B:
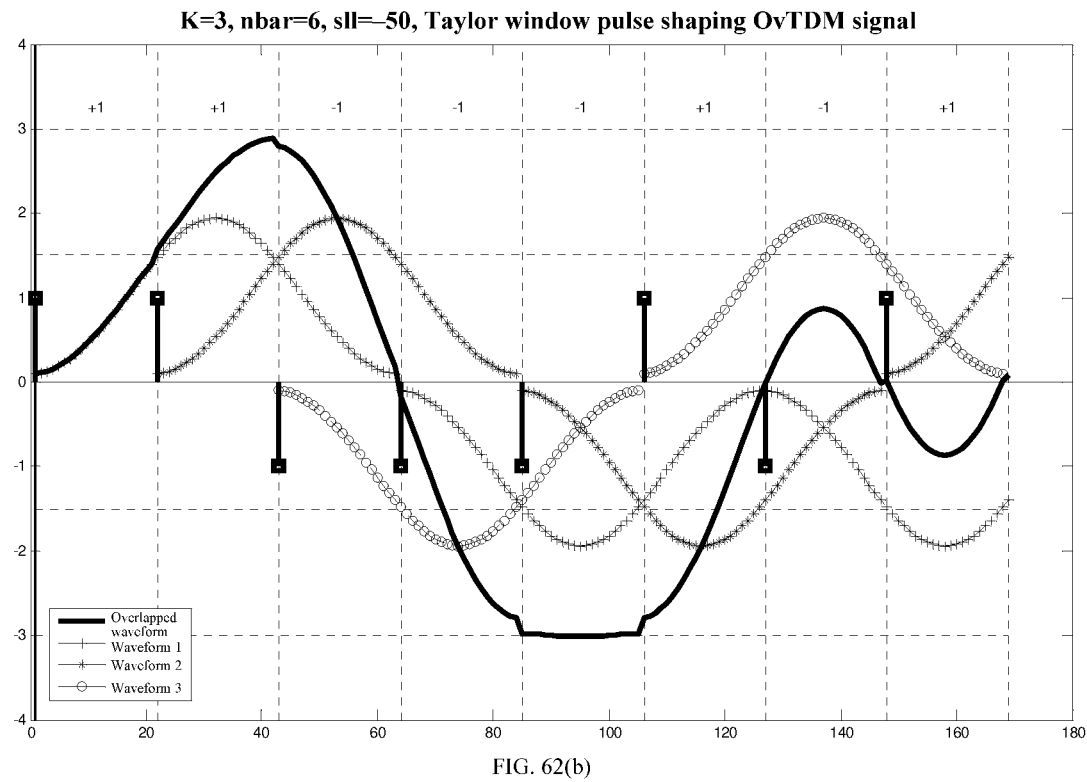
Figure 62C:
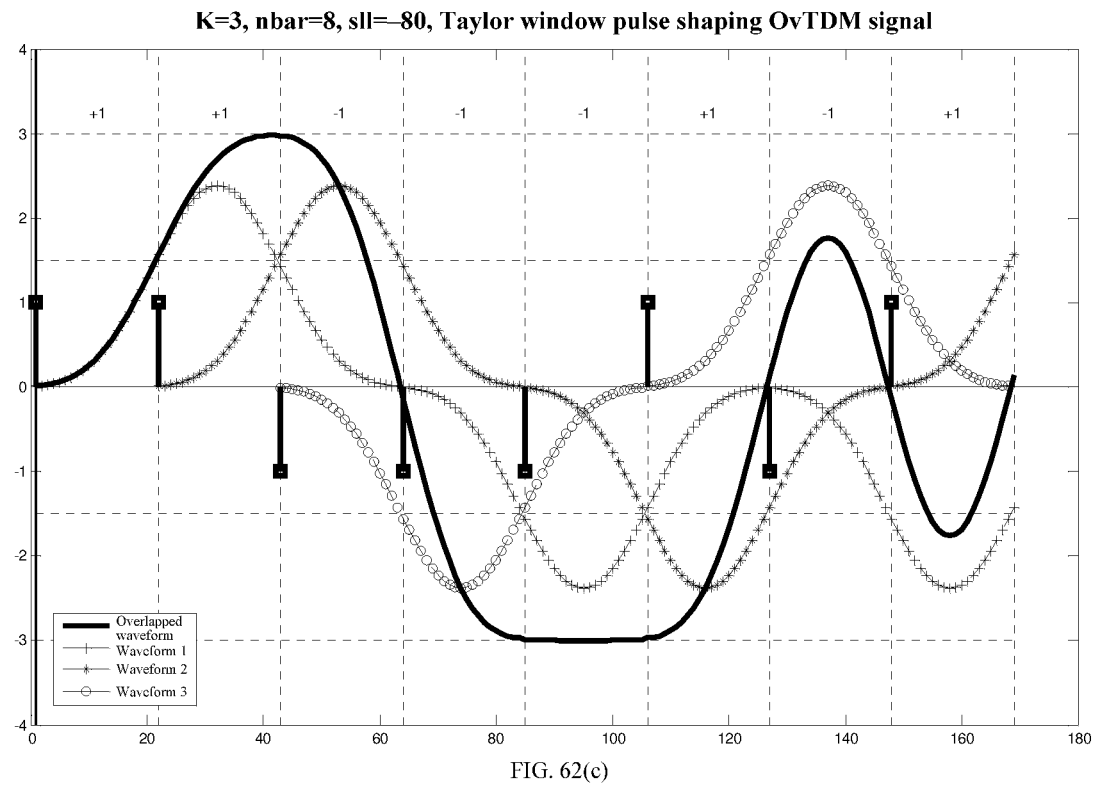
Figure 63A:
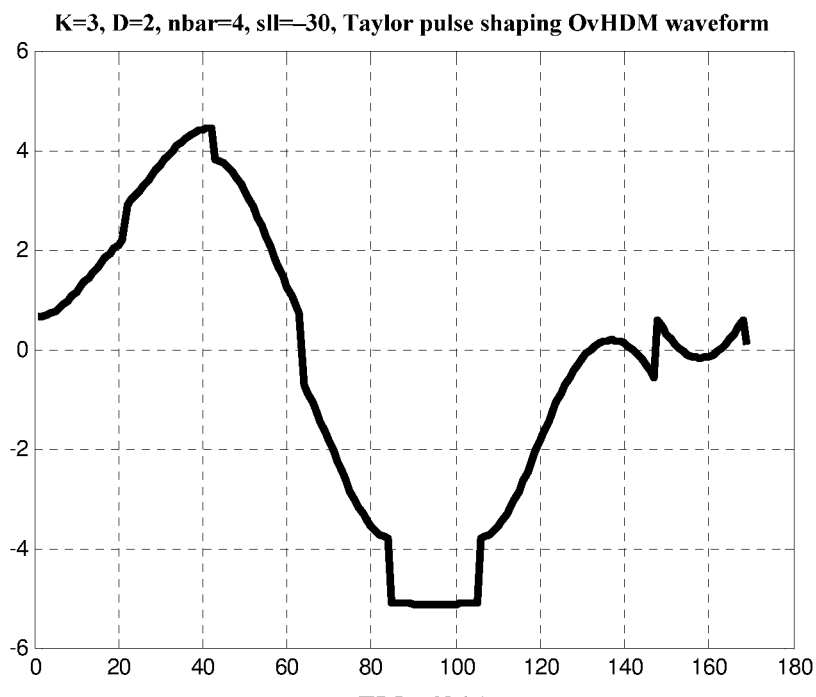
FIG. 63(a), (b), and (c) are waveform diagrams, in the time domain, of time-frequency complex modulated envelope waveforms obtained after modulation is performed by using a Taylor envelope waveform with nbar=4 and sll=−30, a Taylor envelope waveform with nbar=6 and sll=−50, and a Taylor envelope waveform with nbar=8 and sll=−80 as initial envelope waveforms in an OvHDM system according to a fourth embodiment of the present invention.
Figure 63B:
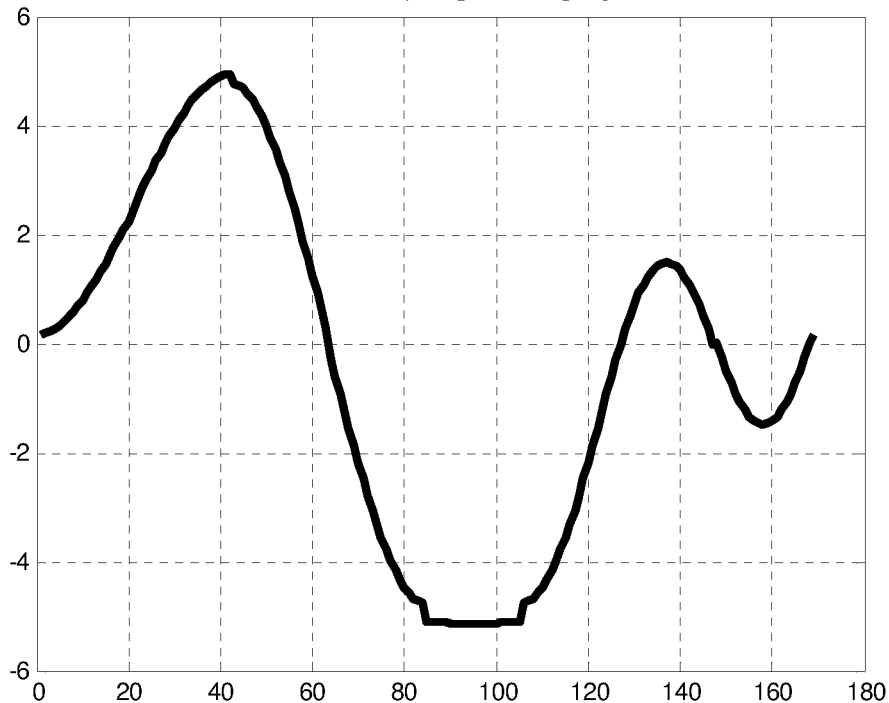
Figure 63C:
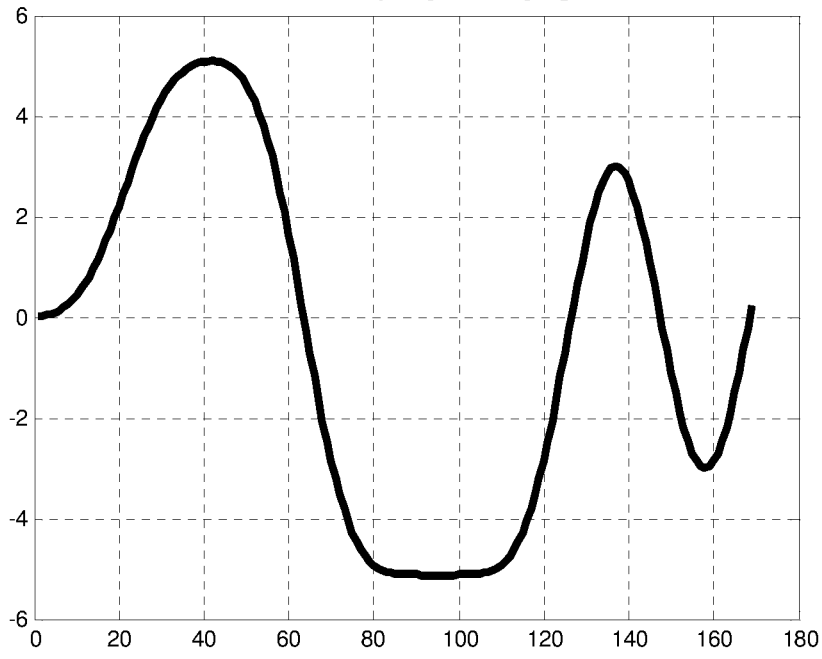

Referring to FIG. 61, FIG. 61(*a*) is a diagram of the envelope waveform of the Taylor window function in the time domain when a window length is 63, nbar=4, and sll=−30; FIG. 61(*b*) is a diagram of the envelope waveform of a normalized Taylor window function in the frequency domain; FIG. 61(*c*) is a diagram of the envelope waveform of the Taylor window function in the time domain when a window length is 63, nbar=6, and sll=−50; FIG. 61(*d*) is a diagram of the envelope waveform of the normalized Taylor window function in the frequency domain; FIG. 61(*e*) is a diagram of the envelope waveform of the Taylor window function in the time domain when a window length is 63, nbar=8, and sll=−80; and FIG. 61(*f*) is a diagram of the envelope waveform of the normalized Taylor window function in the frequency domain. It can be learned from the figure that side lobe attenuation of the Taylor envelope waveform in the frequency domain is an opposite value of sll. For example, side lobe attenuation of the Taylor envelope waveform obtained when a window length is 63, nbar=4, and sll=−30 is 30 dB; side lobe attenuation of the Taylor envelope waveform obtained when a window length is 63, nbar=6, and sll=−50 is 50 dB; and side lobe attenuation of the Taylor envelope waveform obtained when a window length is 63, nbar=8, and sll=−80 is 80 dB. In addition, it can be learned from the figure that, as nbar increases, a start point of the waveform in the time domain is closer to 0, a peak value increases, and the waveform becomes more smooth. Therefore, better performance is achieved after superimposition. FIG. 62(*a*), (b), and (c) show modulated envelope waveforms and complex modulated envelope waveforms that are obtained after the Taylor envelope waveform obtained when nbar=4 and sll=−30, the Taylor envelope waveform obtained when nbar=6 and sll=−50, and the Taylor envelope waveform obtained when nbar=8 and sll=−80 are modulated. Dashed lines in different patterns represent several modulated envelope waveforms in the time domain, and a solid line represents the complex modulated envelope waveform. FIG. 63(*a*), (*b*), and (*c*) are waveform diagrams, in the time domain, of time-frequency complex modulated envelope waveforms finally obtained after the Taylor envelope waveform of which nbar=4 and sll=−30, the Taylor envelope waveform of which nbar=6 and sll=−50, and the Taylor envelope waveform of which nbar=8 and sll=−80 are modulated in the OvHDM system.

16. the Initial Envelope Waveform is the Envelope Waveform of a Tukey Window Function.

In a Tukey window function, a parameter R is a ratio of a taper area to a constant value, and ranges from 0 to 1. When R is an extremum, the Tukey window function evolves to another common window function. When R=1, the Tukey window function is equivalent to a Hann window function. When R=0, the Tukey window function is equivalent to a rectangular window function.

Figure 64:
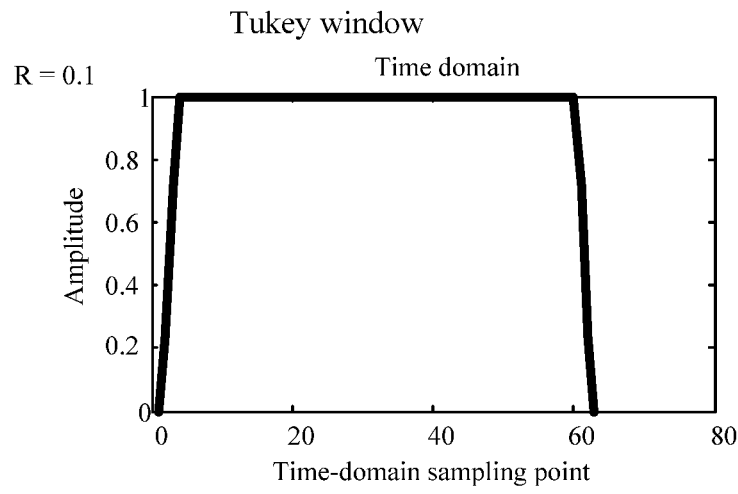
FIG. 64(a), (c), and (e) are waveform diagrams of a Kaiser envelope waveform in the time domain when a parameter R is respectively 0.1, 0.5, and 0.9 according to a fourth embodiment of the present invention.
FIG. 64(b), (d), and (f) are waveform diagrams of a Kaiser envelope waveform switched from time domain to frequency domain when a parameter R is respectively 0.1, 0.5, and 0.9 according to a fourth embodiment of the present invention.
Figure 64:
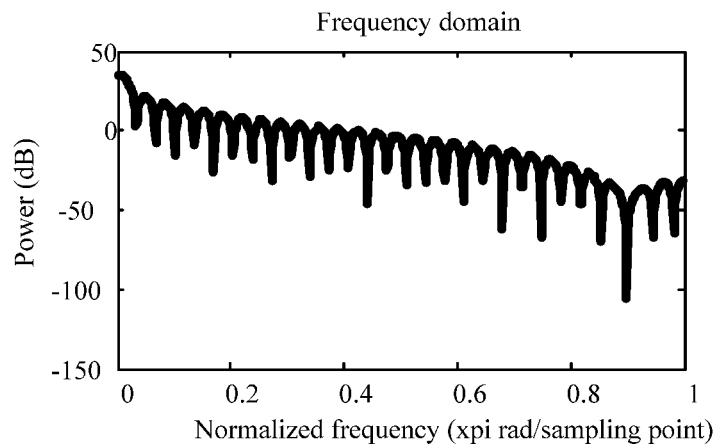
Figure 64:
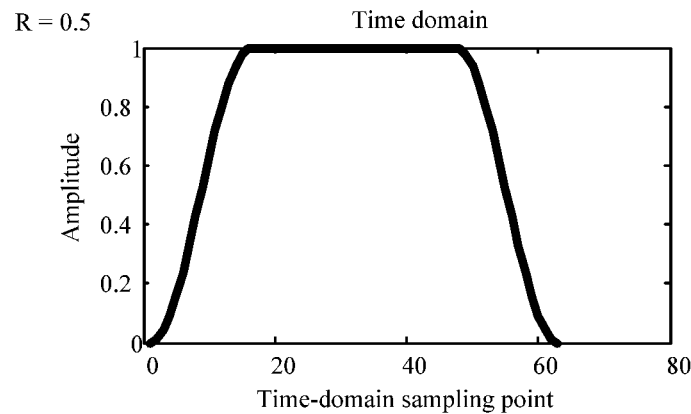
Figure 64:
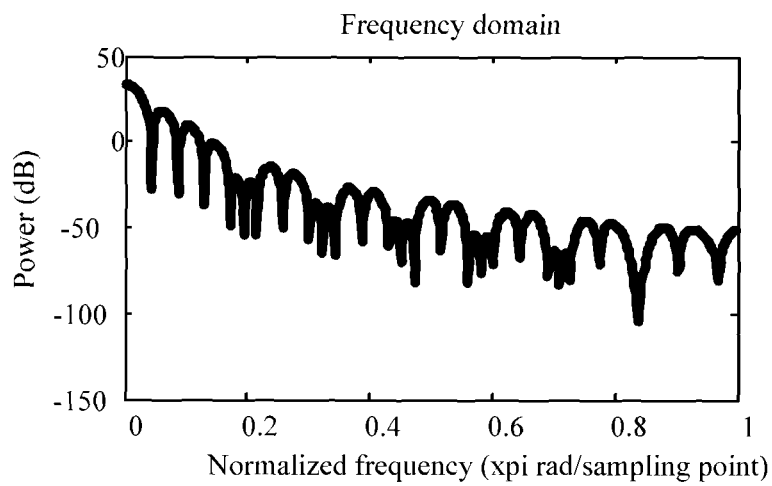
Figure 64:
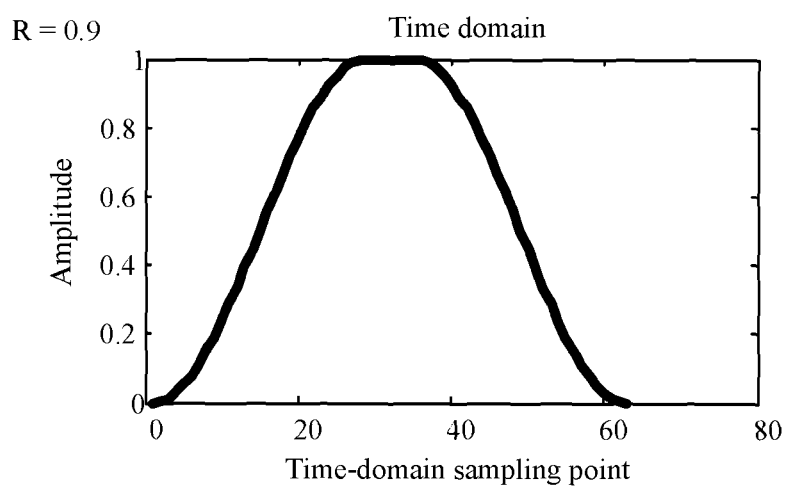
Figure 64:
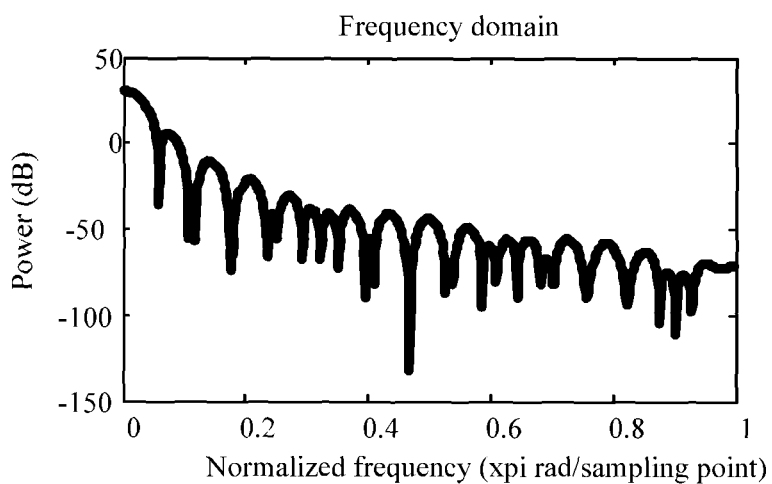
Figure 65A:
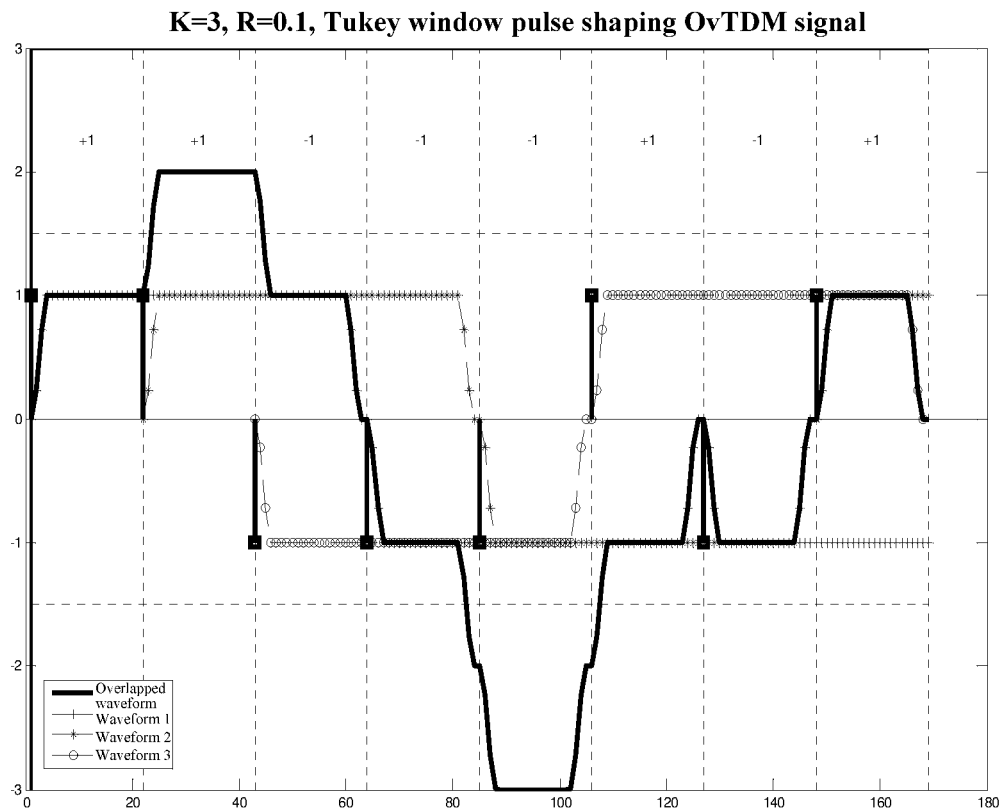
FIG. 65(a), (b), and (c) are waveform diagrams, in the time domain, of modulated envelope waveforms and complex modulated envelope waveforms that are obtained after modulation is performed by using a Kaiser envelope waveform as an initial envelope waveform when a parameter R is respectively 0.1, 0.5, and 0.9 in an OvHDM according to a fourth embodiment of the present invention.
Figure 65B:
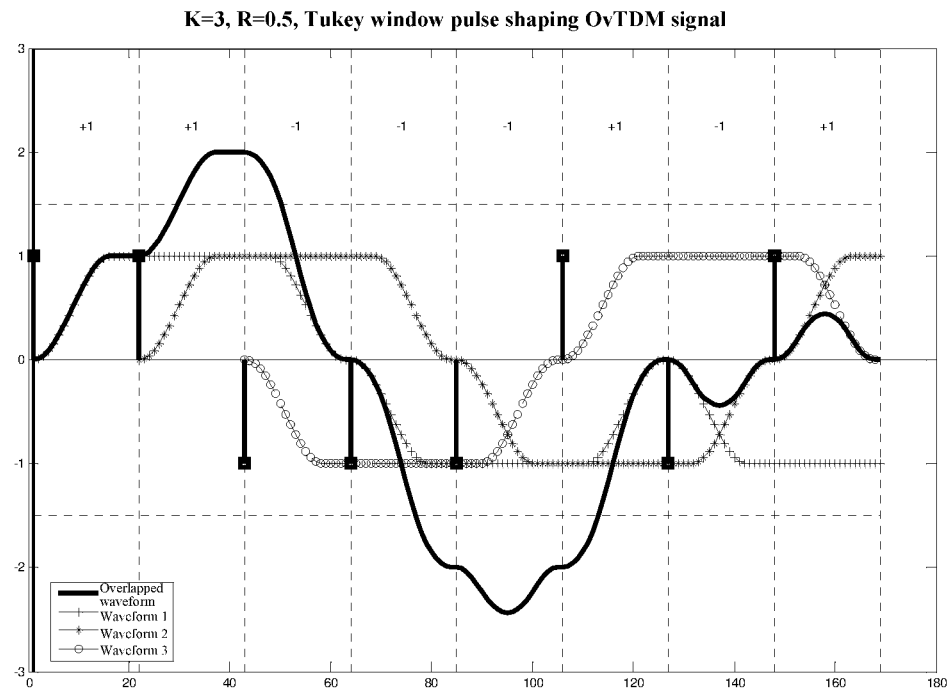
Figure 65C:
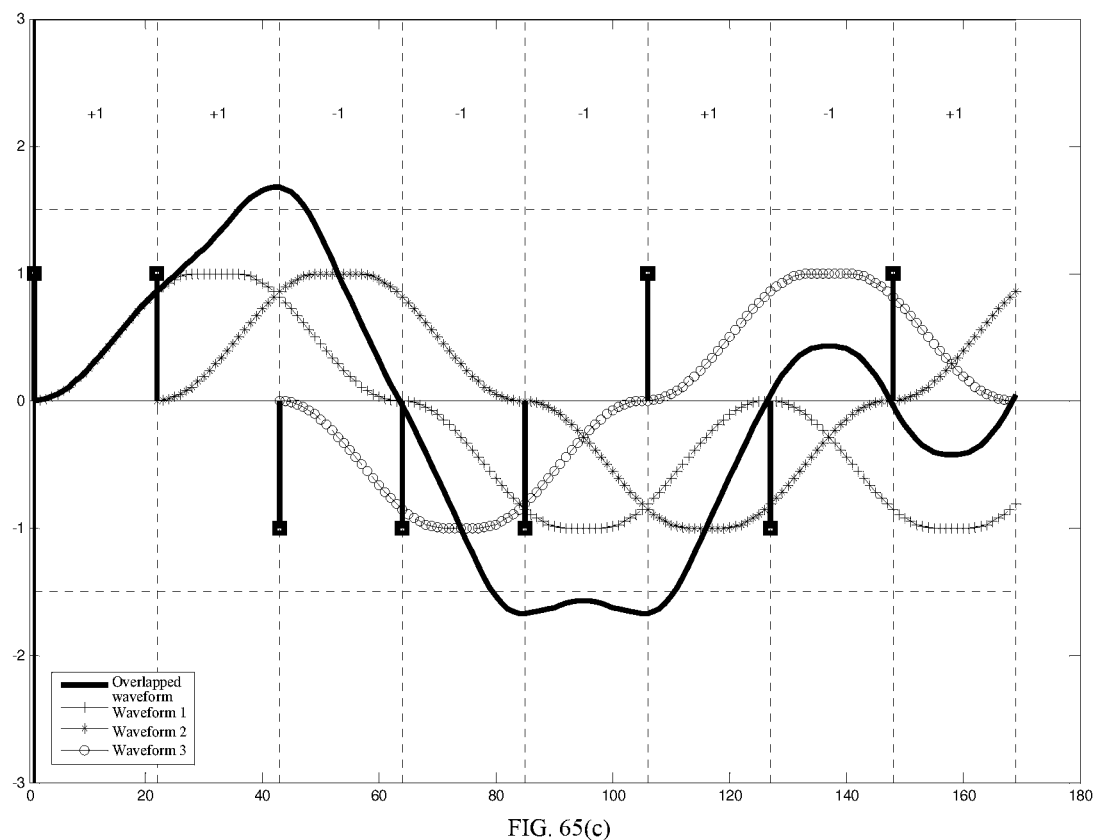
Figure 66A:
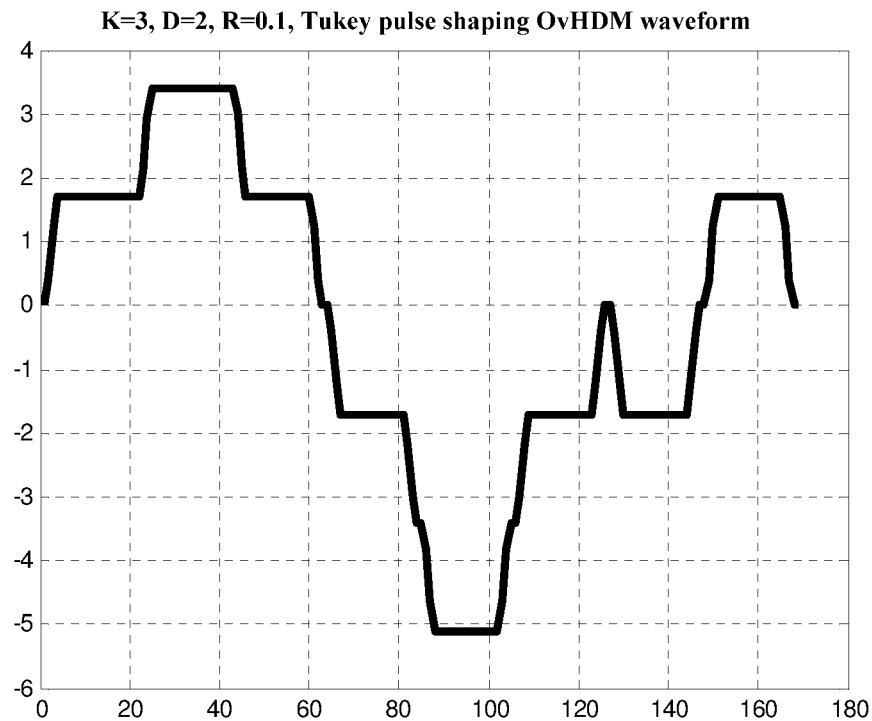
FIG. 66(a), (b), and (c) are waveform diagrams, in the time domain, of time-frequency complex modulated envelope waveforms obtained after modulation is performed by using a Kaiser envelope waveform as an initial envelope waveform when a parameter R is respectively 0.1, 0.5, and 0.9 in an OvHDM system according to a fourth embodiment of the present invention.
Figure 66B:
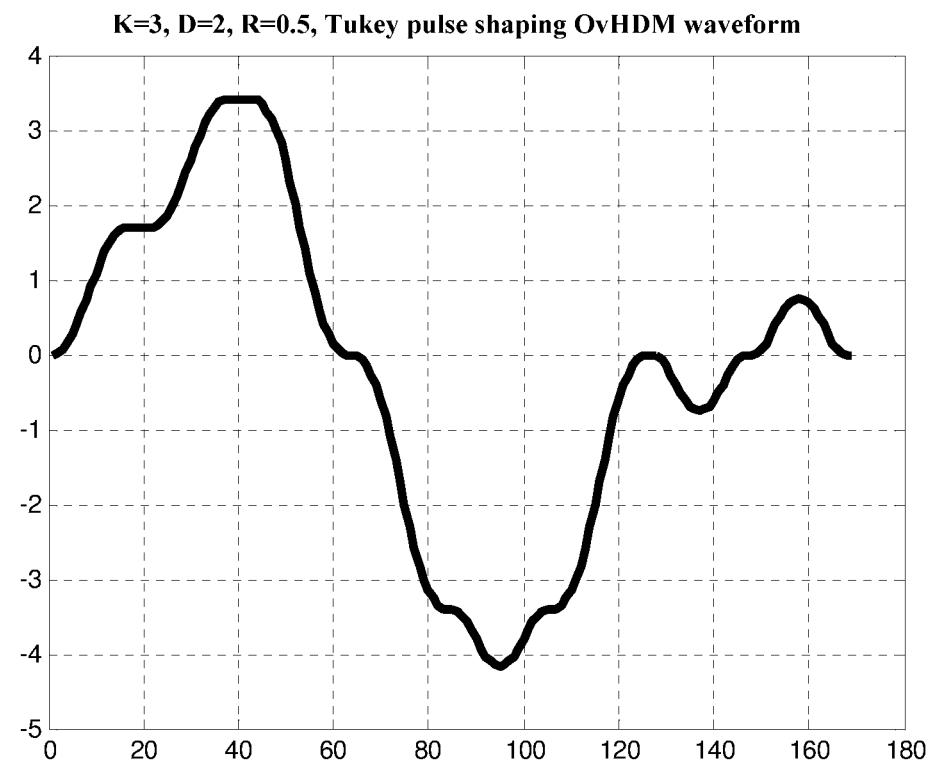
Figure 66C:
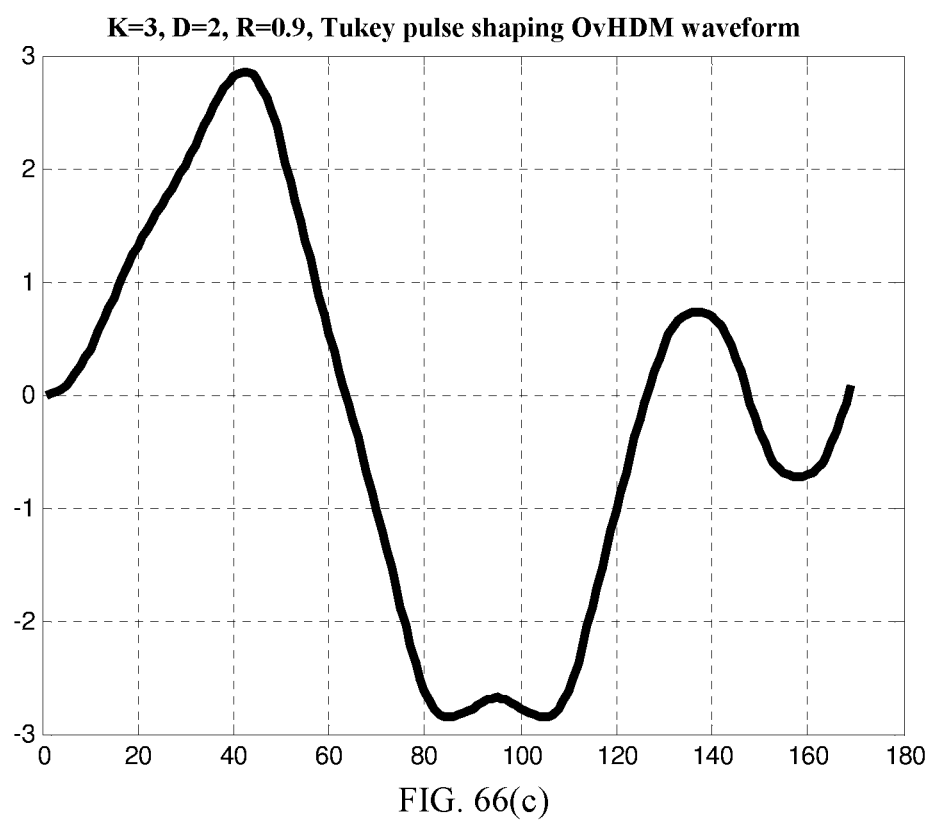

Referring to FIG. 64, FIG. 64(*a*) is a diagram of the envelope waveform of the Tukey window function in the time domain when a window length is 63 and R=0.1; FIG. 64(*b*) is a diagram of the envelope waveform of a normalized Tukey window function in the frequency domain; FIG. 64(*c*) is a diagram of the envelope waveform of the Tukey window function in the time domain when a window length is 63 and R=0.5; FIG. 64(*d*) is a diagram of the envelope waveform of the normalized Tukey window function in the frequency domain; FIG. 64(*e*) is a diagram of the envelope waveform of the Tukey window function in the time domain when a window length is 63 and R=0.9; and FIG. 64(*f*) is a diagram of the envelope waveform of the normalized Tukey window function in the frequency domain. It can be learned from the figure that the envelope waveform of the Tukey window function starts from 0 in the time domain; and as the parameter R increases, the taper area expands, the waveform becomes more smooth, and side lobe attenuation of the waveform in the frequency domain is faster. Therefore, better performance is achieved after superimposition. FIG. 65(*a*), (*b*), and (*c*) each show a modulated envelope waveform and a complex modulated envelope waveform that are obtained after the Tukey envelope waveform is modulated when R is respectively 0.1, 0.5, and 0.9. Dashed lines in different patterns represent several modulated envelope waveforms in the time domain, and a solid line represents the complex modulated envelope waveform. FIG. 66(*a*), (*b*), and (*c*) are waveform diagrams, in the time domain, of a time-frequency complex modulated envelope waveform finally obtained after the Tukey envelope waveform is modulated in the OvHDM system when R is respectively 0.5, 0.1, and 0.9.

The aforementioned content is a further detailed description of the present invention with reference to specific embodiments, and it should not be considered that specific implementation of the present invention is limited only to the description. A person of ordinary skill in the technical field to which the present invention belongs may further make simple derivations or replacements without departing from the inventive concept of the present invention.

What is claimed is:

1. A modulation method applicable to an Overlapped X Division Multiplexing (OvXDM) system, and comprising the following steps:
generating an initial envelope waveform in a modulation domain based on design parameters;
subtracting a tail length of the initial envelope waveform from a width of the initial envelope waveform in the modulation domain, to obtain a virtual cutoff width of the initial envelope waveform;
dividing the virtual cutoff width of the initial envelope waveform by a first quantity of times of overlapped multiplexing, to obtain a modulation-domain shift interval;
shifting the initial envelope waveform by the modulation-domain shift interval in the modulation domain based on the first quantity of times of overlapped multiplexing, to obtain offset envelope waveforms in the modulation domain;
multiplying symbols in a to-be-modulated sequence by the offset envelope waveforms that are respectively corresponding to the symbols, to obtain modulated envelope waveforms in the modulation domain; and
superimposing the modulated envelope waveforms in the modulation domain, to obtain a complex modulated envelope waveform in the modulation domain.

2. The modulation method applicable to an OvXDM system according to claim 1, and further comprising a step of determining the tail length of the initial envelope waveform which includes the following steps:
converting an amplitude of the initial envelope waveform to a power in the modulation domain, comparing the power with a signal-to-noise ratio threshold of the system, and determining a modulation-domain part of the initial envelope waveform corresponding to the power that is smaller than the signal-to-noise ratio threshold as tailing.

3. The modulation method applicable to an OvXDM system according to claim 1, wherein the OvXDM system is an Overlapped Frequency Division Multiplexing (OvFDM) system, an Overlapped Time Division Multiplexing (OvTDM) system, an Overlapped Hybrid Division Multiplexing (OvHDM) system, an Overlapped Code Division Multiplexing (OvCDM) system, or an Overlapped Space Division Multiplexing (OvSDM) system.

4. The modulation method applicable to an OvXDM system according to claim 3, wherein the modulation domain is a frequency domain when the OvXDM system is the OvFDM system; or the modulation domain is a time domain when the OvXDM system is the OvTDM system.

5. The modulation method applicable to an OvXDM system according to claim 3, wherein when the OvXDM system is the OvHDM system, the virtual cutoff modulating method further comprises the following steps:
obtaining a plurality of complex modulated envelope waveforms in the modulation domain, wherein the modulation domain is a time domain;
adding, based on a second quantity of times of overlapped multiplexing, the complex modulated envelope waveforms in the time domain to corresponding subcarriers, and performing shifting and overlapping operations on the subcarriers in a frequency domain, to obtain complex modulated envelope waveforms of the subcarriers; and
superimposing the complex modulated envelope waveforms of the subcarriers in the frequency domain, to obtain a time-frequency complex modulated envelope waveform.

6. The modulation method applicable to an OvXDM system according to claim 1, wherein the initial envelope waveform is smooth in the modulation domain.

7. The modulation method applicable to an OvXDM system according to claim 6, wherein the initial envelope waveform is:
an envelope waveform of a Parzen window function or an envelope waveform of a derived window function of the Parzen window function; or
an envelope waveform of a Bartlett window function or an envelope waveform of a derived window function of the Bartlett window function; or
an envelope waveform of a Bartlett-Hanning window function or an envelope waveform of a derived window function of the Bartlett-Hanning window function; or
an envelope waveform of a Bohman window function or an envelope waveform of a derived window function of the Bohman window function; or
an envelope waveform of a Blackman window function or an envelope waveform of a derived window function of the Blackman window function; or
an envelope waveform of a Blackman-Harris window function or an envelope waveform of a derived window function of the Blackman-Harris window function; or
an envelope waveform of a Gaussian window function or an envelope waveform of a derived window function of the Gaussian window function; or
an envelope waveform of a Hamming window function or an envelope waveform of a derived window function of the Hamming window function; or
an envelope waveform of a Hanning window function or an envelope waveform of a derived window function of the Hanning window function; or
an envelope waveform of a Kaiser window function or an envelope waveform of a derived window function of the Kaiser window function; or
an envelope waveform of a Nuttall window function or an envelope waveform of a derived window function of the Nuttall window function; or
an envelope waveform of a flat top window function or an envelope waveform of a derived window function of the flat top window function; or
an envelope waveform of a Chebyshev window function or an envelope waveform of a derived window function of the Chebyshev window function; or
an envelope waveform of a triangular window function or an envelope waveform of a derived window function of the triangular window function; or
an envelope waveform of a Taylor window function or an envelope waveform of a derived window function of the Taylor window function; or
an envelope waveform of a Tukey window function or an envelope waveform of a derived window function of the Tukey window function.

8. A modulation apparatus applicable to an Overlapped X Division Multiplexing (OvXDM) system, and comprising:
a hardware processor,
a waveform generation module, configured for generating an initial envelope waveform in a modulation domain based on design parameters;

a virtual cutoff module, which is a program module and is executed by the hardware processor to subtract a tail length of the initial envelope waveform from a width of the initial envelope waveform in the modulation domain, to obtain a virtual cutoff width of the initial envelope waveform;

a modulation-domain shift interval calculating module, which is a program module and is executed by the hardware processor to divide the virtual cutoff width of the initial envelope waveform by a first quantity of times of overlapped multiplexing, to obtain a modulation-domain shift interval;

a first shift module, configured for shifting the initial envelope waveform by the modulation-domain shift interval in the modulation domain based on the first quantity of times of overlapped multiplexing, to obtain offset envelope waveforms in the modulation domain;

a multiplication module, configured for multiplying symbols in a to-be-modulated sequence by the offset envelope waveforms that are respectively corresponding to the symbols, to obtain modulated envelope waveforms in the modulation domain; and a first superimposition module, configured for superimposing the modulated envelope waveforms in the modulation domain, to obtain a complex modulated envelope waveform in the modulation domain.

9. The modulation apparatus applicable to an OvXDM system according to claim 8, and further comprising a tailing determining module, which is a program module and is executed by the hardware processor to: convert an amplitude of the initial envelope waveform to a power in the modulation domain, compare the power with a signal-to-noise ratio threshold of the system, and determine a modulation-domain part of the initial envelope waveform corresponding to the power that is smaller than the signal-to-noise ratio threshold as tailing.

10. The modulation apparatus applicable to an OvXDM system according to claim 8, wherein the modulation domain is a frequency domain when the OvXDM system is an Overlapped Frequency Division Multiplexing (OvFDM) system; or the modulation domain is a time domain when the OvXDM system is an Overlapped Time Division Multiplexing (OvTDM) system.

11. The modulation apparatus applicable to an OvXDM system according to claim 8, wherein when the OvXDM system is an Overlapped Hybrid Division Multiplexing (OvHDM) system, the modulation apparatus further comprises:

a second shift module, configured for: adding, based on a second quantity of times of overlapped multiplexing, a plurality of complex modulated envelope waveforms in the time domain obtained by the first superimposition module to corresponding subcarriers, and perform shifting and overlapping operations on the subcarriers in the frequency domain, to obtain complex modulated envelope waveforms of the subcarriers; and a second superimposition module, configured for superimposing the complex modulated envelope waveforms of the subcarriers in the frequency domain, to obtain a time-frequency complex modulated envelope waveform.

12. The modulation apparatus applicable to an OvXDM system according to claim 8, wherein the initial envelope waveform generated by the waveform generation module is smooth in the modulation domain.

13. The modulation apparatus applicable to an OvXDM system according to claim 12, wherein the initial envelope waveform generated by the waveform generation module is:

an envelope waveform of a Parzen window function or an envelope waveform of a derived window function of the Parzen window function; or an envelope waveform of a Bartlett window function or an envelope waveform of a derived window function of the Bartlett window function; or an envelope waveform of a Bartlett-Hanning window function or an envelope waveform of a derived window function of the Bartlett-Hanning window function; or an envelope waveform of a Bohman window function or an envelope waveform of a derived window function of the Bohman window function; or an envelope waveform of a Blackman window function or an envelope waveform of a derived window function of the Blackman window function; or an envelope waveform of a Blackman-Harris window function or an envelope waveform of a derived window function of the Blackman-Harris window function; or an envelope waveform of a Gaussian window function or an envelope waveform of a derived window function of the Gaussian window function; or an envelope waveform of a Hamming window function or an envelope waveform of a derived window function of the Hamming window function; or an envelope waveform of a Hanning window function or an envelope waveform of a derived window function of the Hanning window function; or an envelope waveform of a Kaiser window function or an envelope waveform of a derived window function of the Kaiser window function; or an envelope waveform of a Nuttall window function or an envelope waveform of a derived window function of the Nuttall window function; or an envelope waveform of a flat top window function or an envelope waveform of a derived window function of the flat top window function; or an envelope waveform of a Chebyshev window function or an envelope waveform of a derived window function of the Chebyshev window function; or an envelope waveform of a triangular window function or an envelope waveform of a derived window function of the triangular window function; or an envelope waveform of a Taylor window function or an envelope waveform of a derived window function of the Taylor window function; or an envelope waveform of a Tukey window function or an envelope waveform of a derived window function of the Tukey window function.

14. An Overlapped X Division Multiplexing (OvXDM) system, comprising the modulation apparatus applicable to the OvXDM system, wherein the modulation apparatus comprises:

a hardware processor, a waveform generation module, configured for generating an initial envelope waveform in a modulation domain based on design parameters;

a virtual cutoff module, which is a program module and is executed by the hardware processor to subtract a tail length of the initial envelope waveform from a width of the initial envelope waveform in the modulation domain, to obtain a virtual cutoff width of the initial envelope waveform;

a modulation-domain shift interval calculating module, which is a program module and is executed by the hardware processor to divide the virtual cutoff width of the initial envelope waveform by a first quantity of times of overlapped multiplexing, to obtain a modulation-domain shift interval;

a first shift module, configured for shifting the initial envelope waveform by the modulation-domain shift interval in the modulation domain based on the first quantity of times of overlapped multiplexing, to obtain offset envelope waveforms in the modulation domain;

a multiplication module, configured for multiplying symbols in a to-be-modulated sequence by the offset envelope waveforms that are respectively corresponding to the symbols, to obtain modulated envelope waveforms in the modulation domain; and a first superimposition module, configured for superimposing the modulated envelope waveforms in the modulation domain, to obtain a complex modulated envelope waveform in the modulation domain.

15. The OvXDM system according to claim 14, wherein the modulation apparatus further comprises:

a tailing determining module, which is a program module and is executed by the hardware processor to convert an amplitude of the initial envelope waveform to a power in the modulation domain, compare the power with a signal-to-noise ratio threshold of the system, and determine a modulation-domain part of the initial envelope waveform corresponding to the power that is smaller than the signal-to-noise ratio threshold as tailing.

16. The OvXDM system according to claim 14, wherein the modulation domain is a frequency domain when the OvXDM system is an Overlapped Frequency Division Multiplexing (OvFDM) system; or the modulation domain is a time domain when the OvXDM system is an Overlapped Time Division Multiplexing (OvTDM) system.

17. The OvXDM system according to claim 14, wherein when the OvXDM system is an Overlapped Hybrid Division Multiplexing (OvHDM) system, the modulation apparatus further comprises:

a second shift module, configured for: adding, based on a second quantity of times of overlapped multiplexing, a plurality of complex modulated envelope waveforms in the time domain obtained by the first superimposition module to corresponding subcarriers, and perform shifting and overlapping operations on the subcarriers in the frequency domain, to obtain complex modulated envelope waveforms of the subcarriers; and a second superimposition module, configured for superimposing the complex modulated envelope waveforms of the subcarriers in the frequency domain, to obtain a time-frequency complex modulated envelope waveform.

18. The OvXDM system according to claim 14, wherein the initial envelope waveform generated by the waveform generation module is smooth in the modulation domain.

19. The OvXDM system according to claim 14, wherein the initial envelope waveform generated by the waveform generation module is:

an envelope waveform of a Parzen window function or an envelope waveform of a derived window function of the Parzen window function; or an envelope waveform of a Bartlett window function or an envelope waveform of a derived window function of the Bartlett window function; or an envelope waveform of a Bartlett-Hanning window function or an envelope waveform of a derived window function of the Bartlett-Hanning window function; or an envelope waveform of a Bohman window function or an envelope waveform of a derived window function of the Bohman window function; or an envelope waveform of a Blackman window function or an envelope waveform of a derived window function of the Blackman window function; or an envelope waveform of a Blackman-Harris window function or an envelope waveform of a derived window function of the Blackman-Harris window function; or an envelope waveform of a Gaussian window function or an envelope waveform of a derived window function of the Gaussian window function; or an envelope waveform of a Hamming window function or an envelope waveform of a derived window function of the Hamming window function; or an envelope waveform of a Hanning window function or an envelope waveform of a derived window function of the Hanning window function; or an envelope waveform of a Kaiser window function or an envelope waveform of a derived window function of the Kaiser window function; or an envelope waveform of a Nuttall window function or an envelope waveform of a derived window function of the Nuttall window function; or an envelope waveform of a flat top window function or an envelope waveform of a derived window function of the flat top window function; or an envelope waveform of a Chebyshev window function or an envelope waveform of a derived window function of the Chebyshev window function; or an envelope waveform of a triangular window function or an envelope waveform of a derived window function of the triangular window function; or an envelope waveform of a Taylor window function or an envelope waveform of a derived window function of the Taylor window function; or an envelope waveform of a Tukey window function or an envelope waveform of a derived window function of the Tukey window function.

20. The modulation apparatus applicable to an OvXDM system according to claim 8, wherein the OvXDM system is an Overlapped Frequency Division Multiplexing (OvFDM) system, an Overlapped Time Division Multiplexing (OvTDM) system, an Overlapped Hybrid Division Multiplexing (OvHDM) system, an Overlapped Code Division Multiplexing (OvCDM) system, or an Overlapped Space Division Multiplexing (OvSDM) system.

* * * * *

UNITED STATES PATENT AND TRADEMARK OFFICE
CERTIFICATE OF CORRECTION

PATENT NO. : 10,715,304 B2
APPLICATION NO. : 16/254553
DATED : July 14, 2020
INVENTOR(S) : Ruopeng Liu et al.

Page 1 of 1

It is certified that error appears in the above-identified patent and that said Letters Patent is hereby corrected as shown below:

On the Title Page

Item (73) should be corrected to read:
SHEN ZHEN KUANG-CHI HEZHONG TECHNOLOGY LTD Signed and Sealed this
Twenty-second Day of September, 2020

Andrei Iancu
*Director of the United States Patent and Trademark Office*